United States Patent [19]

Heitman et al.

[11] 3,828,323

[45] Aug. 6, 1974

[54] DATA RECORDING AND PRINTING APPARATUS

[75] Inventors: Richard E. Heitman, Acton; Genio R. Arciprete, Lexington; Peter G. Martin, Arlington; Richard C. Norris, Belmont; Richard A. Brisk, Somerville, all of Mass.

[73] Assignee: Arthur D. Little, Inc., Cambridge, Mass.

[22] Filed: May 18, 1972

[21] Appl. No.: 254,727

[52] U.S. Cl. .......... 340/172.5
[51] Int. Cl. .......... G11c 9/00, G11c 21/00
[58] Field of Search .......... 340/172.5

[56] References Cited

UNITED STATES PATENTS

| | | | |
|---|---|---|---|
| 3,017,610 | 1/1962 | Averbach et al. | 340/172.5 |
| 3,260,340 | 7/1966 | Licklar et al. | 197/19 |
| 3,274,566 | 9/1966 | Locklar | 340/172.5 |
| 3,297,124 | 1/1967 | Sims | 197/19 |
| 3,351,917 | 11/1967 | Shimabukuro | 340/172.5 |
| 3,490,004 | 1/1970 | Ross | 340/172.5 |
| 3,501,746 | 3/1970 | Vosbury | 340/172.5 |
| 3,528,063 | 9/1970 | Kolpek | 340/172.5 |

*Primary Examiner*—Paul J. Henon
*Assistant Examiner*—Paul R. Woods
*Attorney, Agent, or Firm*—Schiller & Pandiscio

[57] ABSTRACT

A word processing system having an input/output electric typewriter, a magnetic tape recorder/player and a shift register buffer memory. A subsidiary memory in the form of a pair of series-connected single character registers are provided to form a feedback loop around the main shift register. Clocking and controls are provided for selectively connecting the output of the buffer to its input through the feedback loop, or to an input of the recorder/player, or to an input of the typewriter; and are provided for selectively connecting the input of the buffer to the output of the recorder/player, or to the output of the typewriter.

33 Claims, 20 Drawing Figures

DATA RECORDING AND PRINTING APPARATUS

This invention relates to data processing, recording and printing apparatus, and more particularly to electronically controlled data recording and printing systems employing a typewriter as in input/output terminal.

A large number of systems are known in which data entered on a keyboard-operated printer are encoded and stored on a record storage medium, the process being reversible so that the information stored on the record medium can be decoded and printed by the printer. It is also known to record the coded data on a wide variety of recording media such as magnetic tape or cards, punched tape and the like. The system enjoying the widest use, perhaps due to its versatility, is the type described, for example, in U.S. Pat. Nos. 3,297,124, 3,260,340, and 2,217,150 among many others. This latter system is particularly adapted for use with printers of the type disclosed in U.S, Pat. No. 2,919,002 issued to L. E. Palmer.

The Palmer patent describes a device including a single element printing head having all of the characters of a type font, each being positioned at a unique location on a globular surface of a single printing head. The head is mounted for movement in a path parallel to a platen which can only rotate in a direction perpendicular to the path of motion of the head. The Palmer device selects a character by tilting and rotating the globular element so that a selected character is positioned directly opposite the platen, the selection of the character being responsive to the depression of one of a plurality of keys on a keyboard.

The Palmer-type printer is particularly suited for the input/output terminal of an electronically-controlled data recording and printing system. While the prior art word processing systems incorporating this printer have been commercially successful, they suffer from certain limitations. Among these limitations is the relative high cost of equipment, due at least in part to the use of special printers of the Palmer type. This approach precludes the adaptation of a previously purchased typewriter of the Palmer type. Another important limitation of the prior art devices lies in the fact that it is difficult to use the systems efficiently in some ordinary areas of application. This is particularly true in the editing of a recorded document, as, for instance, it is often not possible to insert new data without disturbing data already recorded. Additional limitations lie in undesirable right-hand margin quality when playing out a document with the automatic right-hand control mechanism in operation; and in the lack of an ability to search for and locate any desired line of a document stored in a mass storage means, for editing or other purposes.

It will therefore be apparent that it would be desirable to have available a data processing system, and more particularly a word processing system, using an adapted Palmer-type typewriter as the input/output control, which incorporates extended editing capability including insertions and deletions, which has a better automatic right-hand margin control and which possesses ready search and retrieval capabilities.

It is therefore a primary object of this invention to provide an improved data processing system, and particularly an improved word processor which is less expensive and which is readily coupled to an existing Palmer-type typewriter.

It is another primary object of this invention to provide an improved word processor of the character described which possesses greater versatility in operation than exhibited by the prior art devices. This versatility includes the ability to insert and/or delete relatively large quantities of data without disturbing data already recorded.

It is still another primary object of this invention to provide a word processing system, the operation of which is simpler, more quickly mastered and free from misleading or confusing control legends. Finally, another object is the provision of a word processor which is capable of improving the quality of the final copy produced and of producing essentially error-free typewritten texts.

Other objects of the invention will in part be obvious and will in part be apparent hereinafter.

The data processing system of this invention which is described in terms of a word processor has two basic operating modes referred to hereinafter as the Draft Mode and the Final Mode. The Draft Mode is used for generating an initial recording of a document and for making any necessary editing changes or other modifications in the document; and the Final Mode is used for generating one or more final copies of the document with a right-hand margin control feature in operation.

When generating the original draft of a document, the characters forming each line are stored in a buffer memory and when each line is terminated by typing a Carrier Return, the contents of the buffer memory are written in a mass storage means, typically a magnetic tape. Each line recorded in this way constitutes a data block or record; and associated with each data block is a unique address number which is displayed in a window on the console control panel. Optionally, while the typist is generating a draft of the document, the typist can cause the address number associated with each data block (normally a line) to be printed out automatically by the typewriter on the paper. This assists the operator in locating and retrieving a given data block at a later time so that the contents of that block can be edited or otherwise processed.

The word processing system of this invention has a wide range of editing capabilities which include (1) the ability to move left or "back space" the typewriter and the buffer memory in synchronization so that characters typed erroneously can be corrected by overtyping; (2) the ability to delete superfluous characters and "close up" the gap in the data block created by the deletion; and (3) the ability to insert data up to a predetermined limit at any point in a recorded line without disturbing the data in the line.

Once an error-free recording of a document has been recorded in the mass storage means the operator can generate final copy of the document by playing the recorded data in the Final Mode. In this operational mode the automatic right-hand margin control feature rearranges the line format to compensate for changes in the recorded line lengths caused by editing and to cause printing between established left and right hand margin limits. Controls are provided for playing a character, a word or a line at a time, or for playing continuously until some stopping condition is met. Also while operating in the Final Mode the operator has the ability to skip data on a character, word or line basis without affecting the recorded data. This feature is particularly useful in generating an individualized form letter.

In brief, the apparatus of this invention for processing data includes a printing device adapted for the formation of characters and the performance of certain functions, means for interconverting the formation of the characters and the performance of functions into data signals, mass storage means in the form of signal recording and playback means, a primary buffer memory for storing a plurality of coded character and function signals, a subsidiary buffer memory connected to the primary buffer memory, gating means to connect the output of the subsidiary buffer memory, the output of the mass storage means and the output of the interconverting means to the input of the primary buffer memory, and means for selectively coupling the output of the primary buffer memory to the input of the mass storage means, to the input of the printer, or to the input of the interconverting means.

Additional features of the data processing apparatus of this invention include means to operate in a Draft Mode which includes both data storage and data display and in a Final Mode, for data display under the influence of a right-hand margin adjust mechanism with a "look ahead" capability; means for printing out address numbers associated with data blocks and means to search out or locate desired data blocks in the mass storage means using the printed address numbers; and means to insert data at any point in the mass storage means or to delete data and close up gaps left by such deletion.

The invention accordingly comprises the features of construction, combinations of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings in which.

Figure 1:
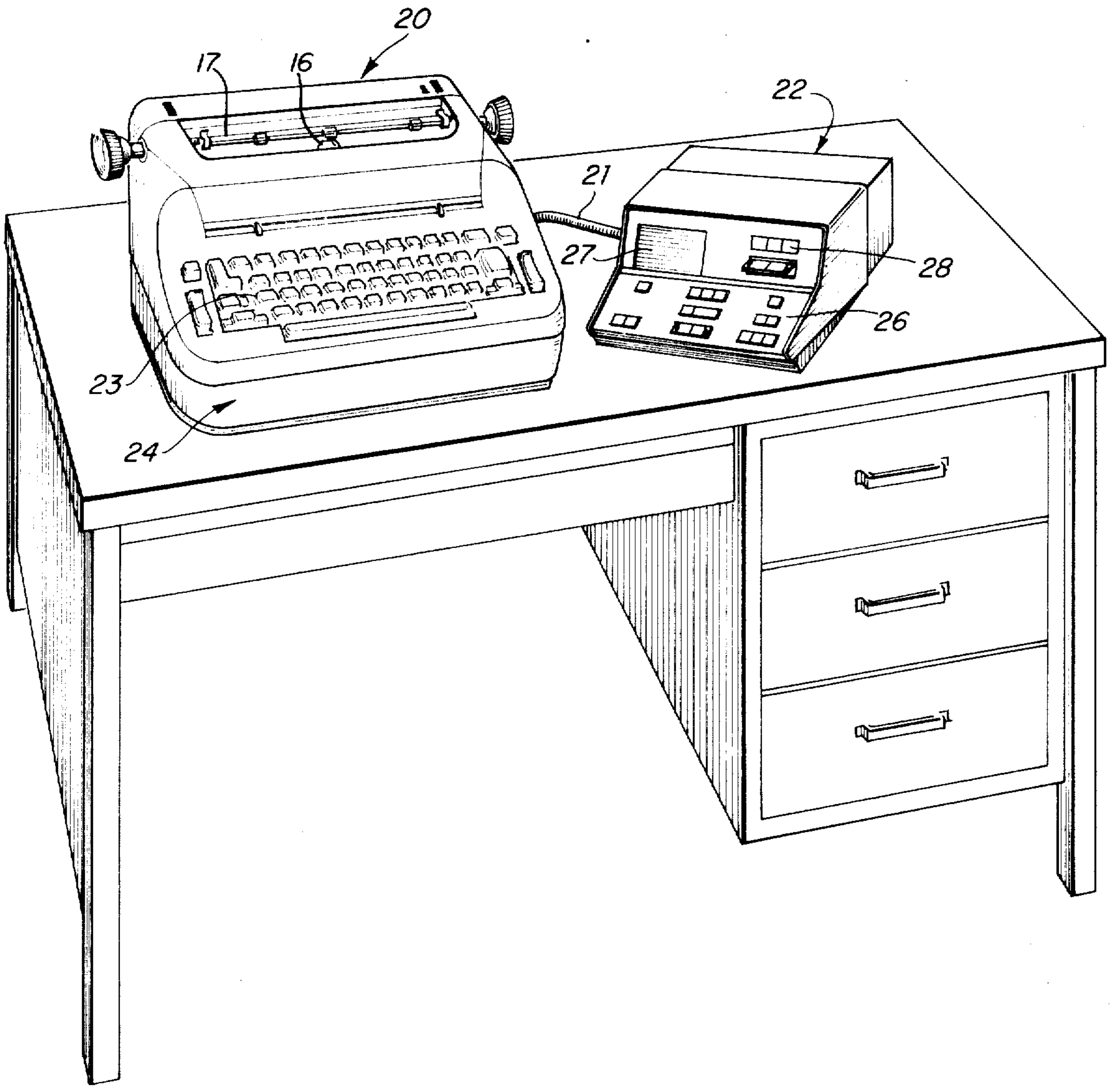
FIG. 1 is a perspective illustration of a typewriter and coupled console embodying the principles of the present invention.
Figure 3:
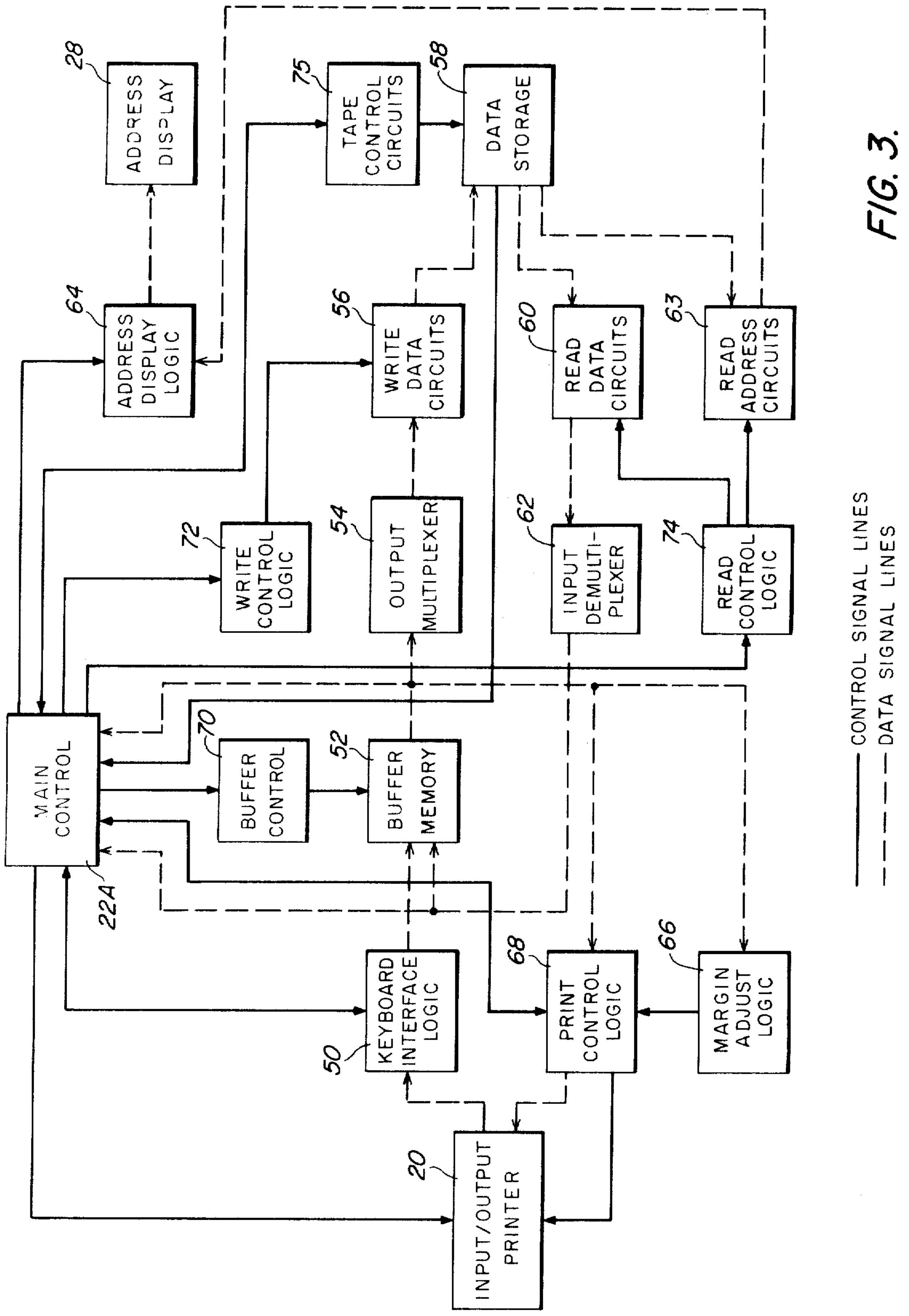
FIG. 3 is a block diagram illustrating the organization of the invention.
Figure 6:
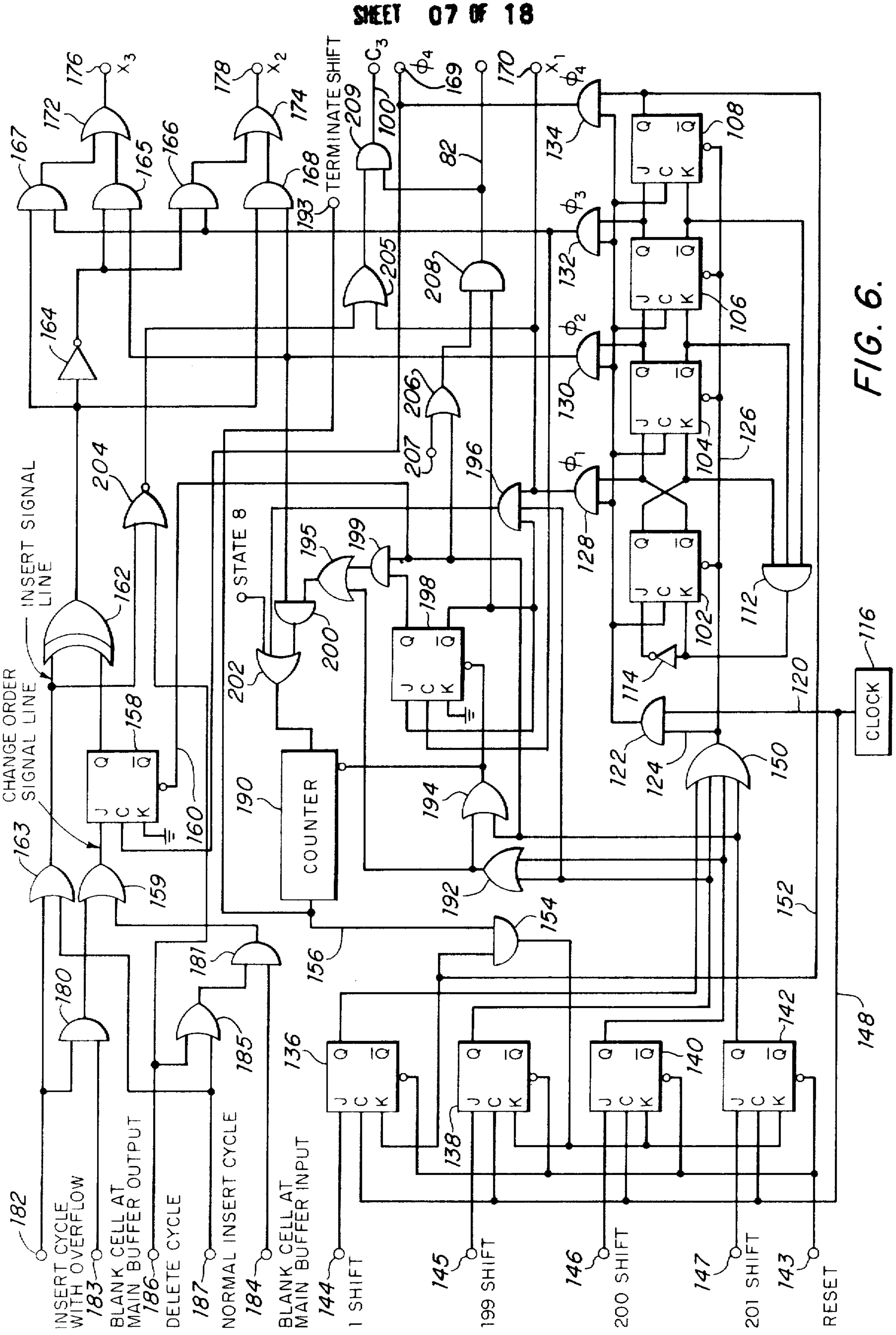
FIG. 6 is a logic diagram partly in block form illustrating a clocking control system forming part of the buffer control of FIG. 3.
Figure 7:
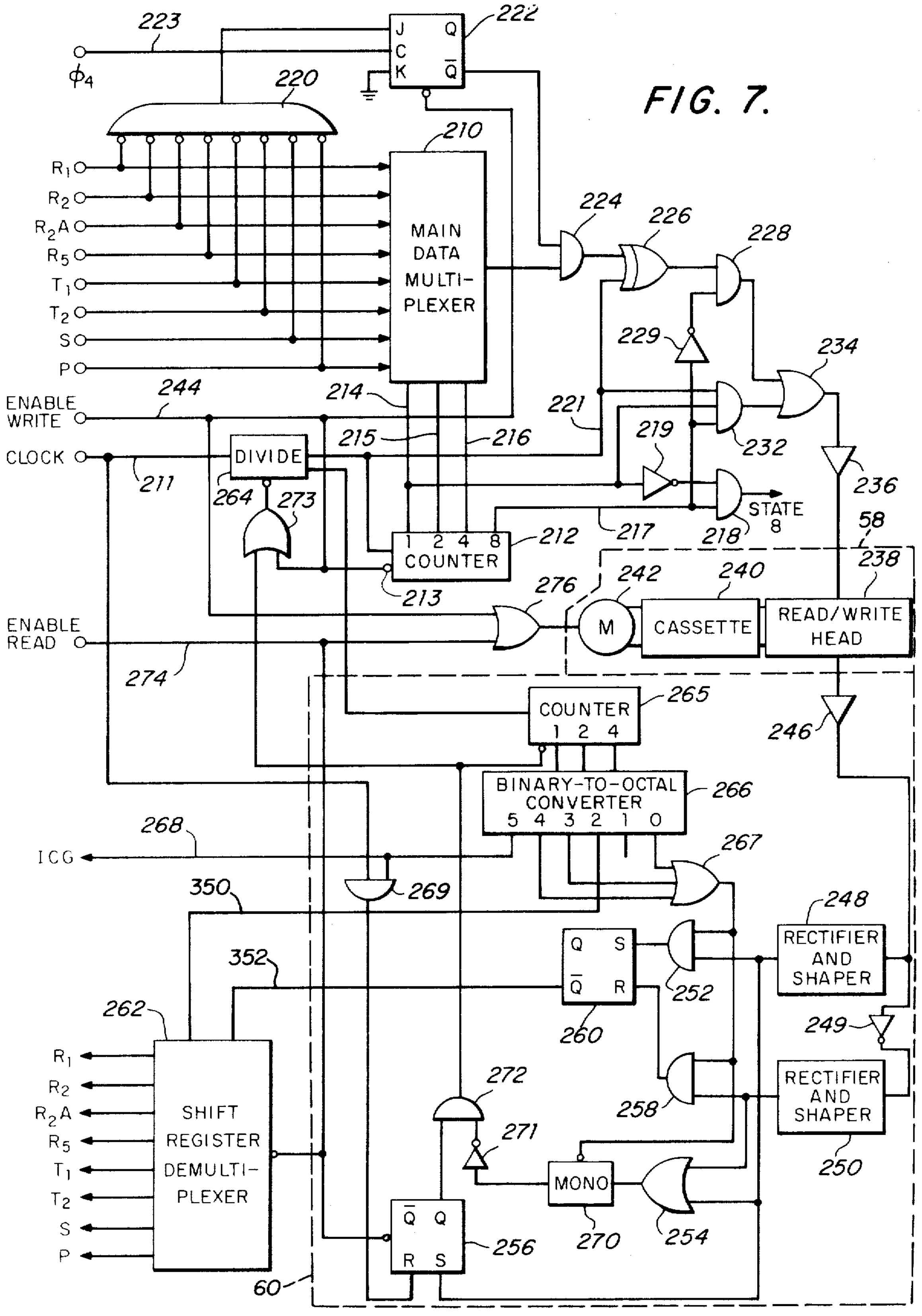
Figure 8:
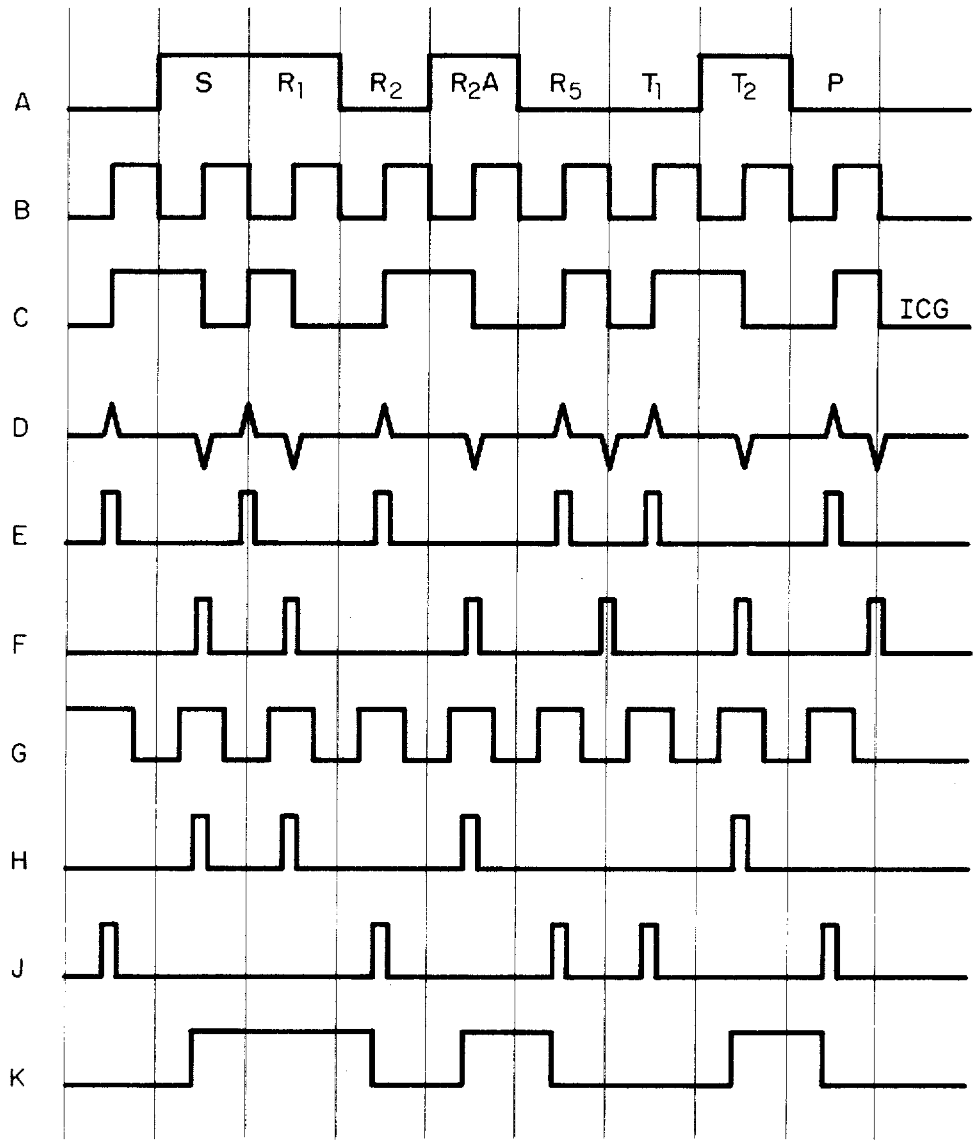
Figure 9:
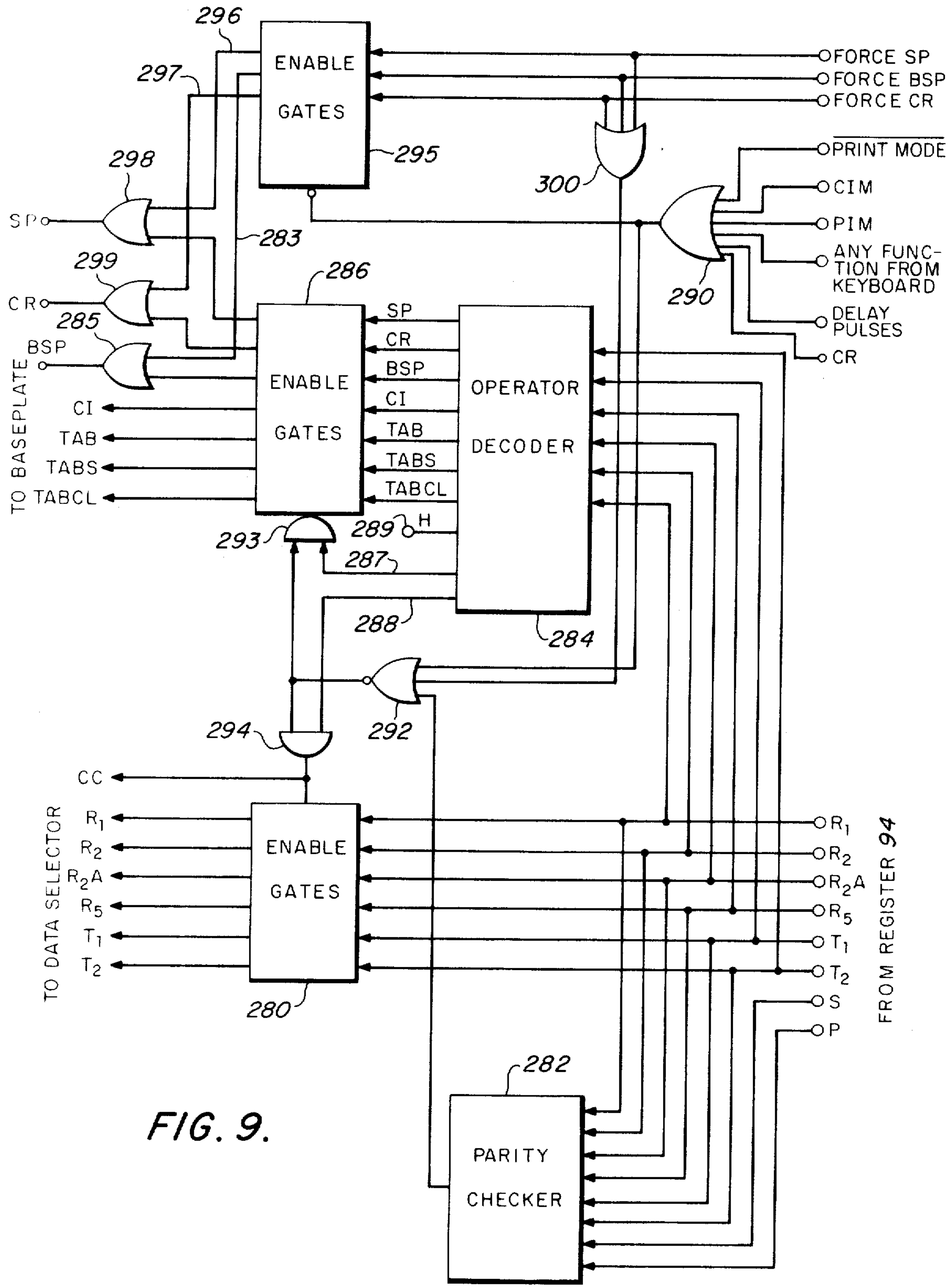
Figure 10:
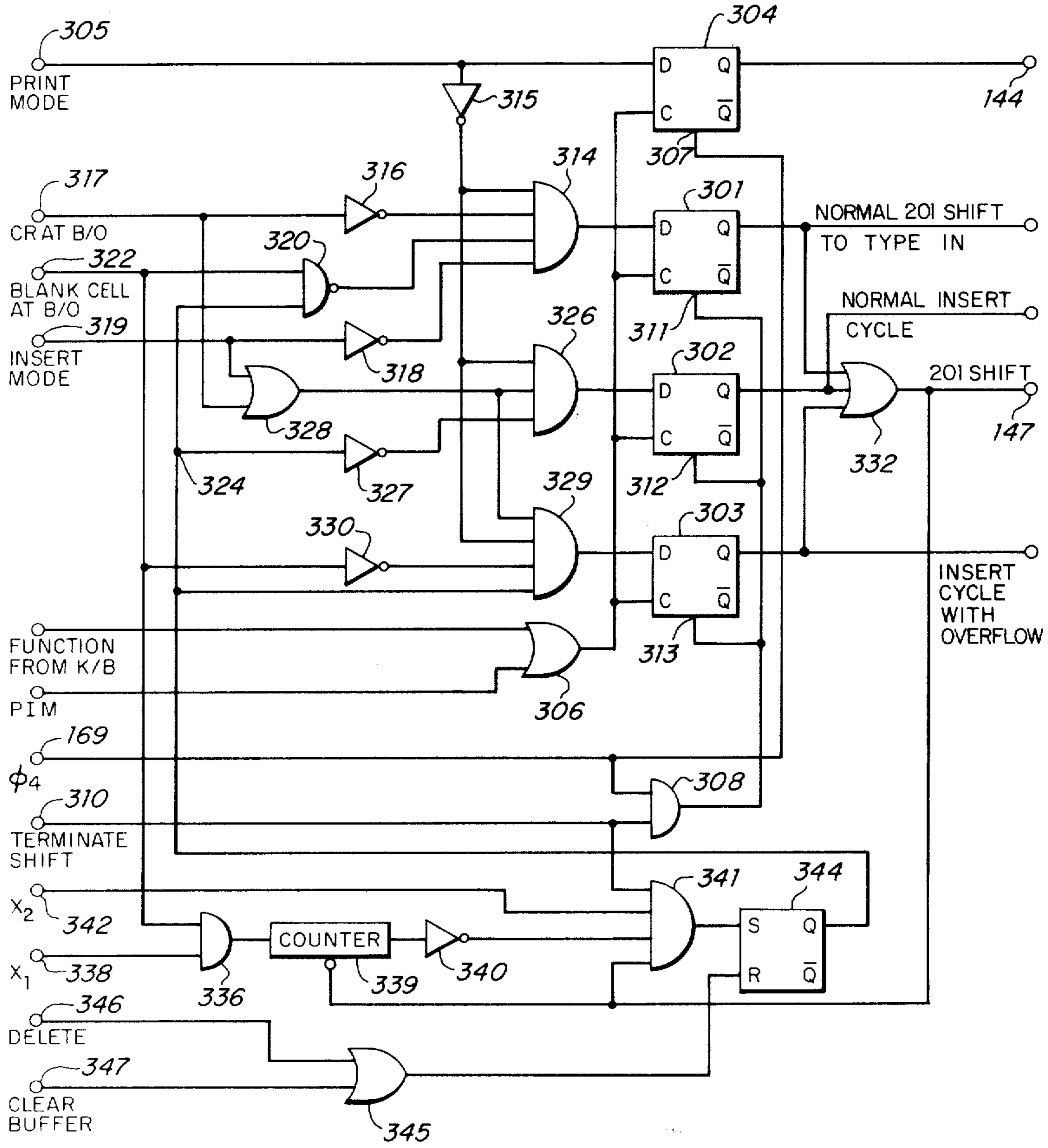
Figure 11:
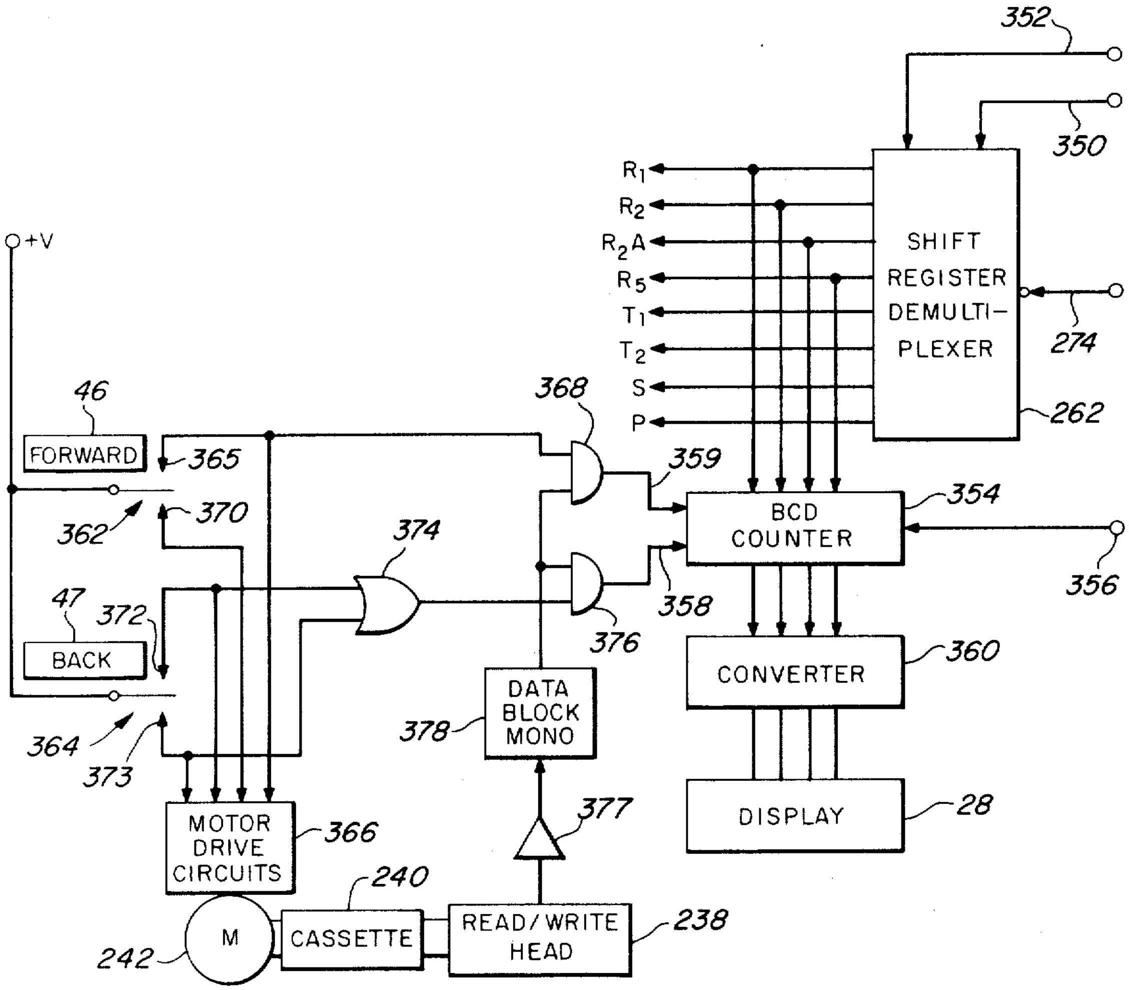
Figure 12:
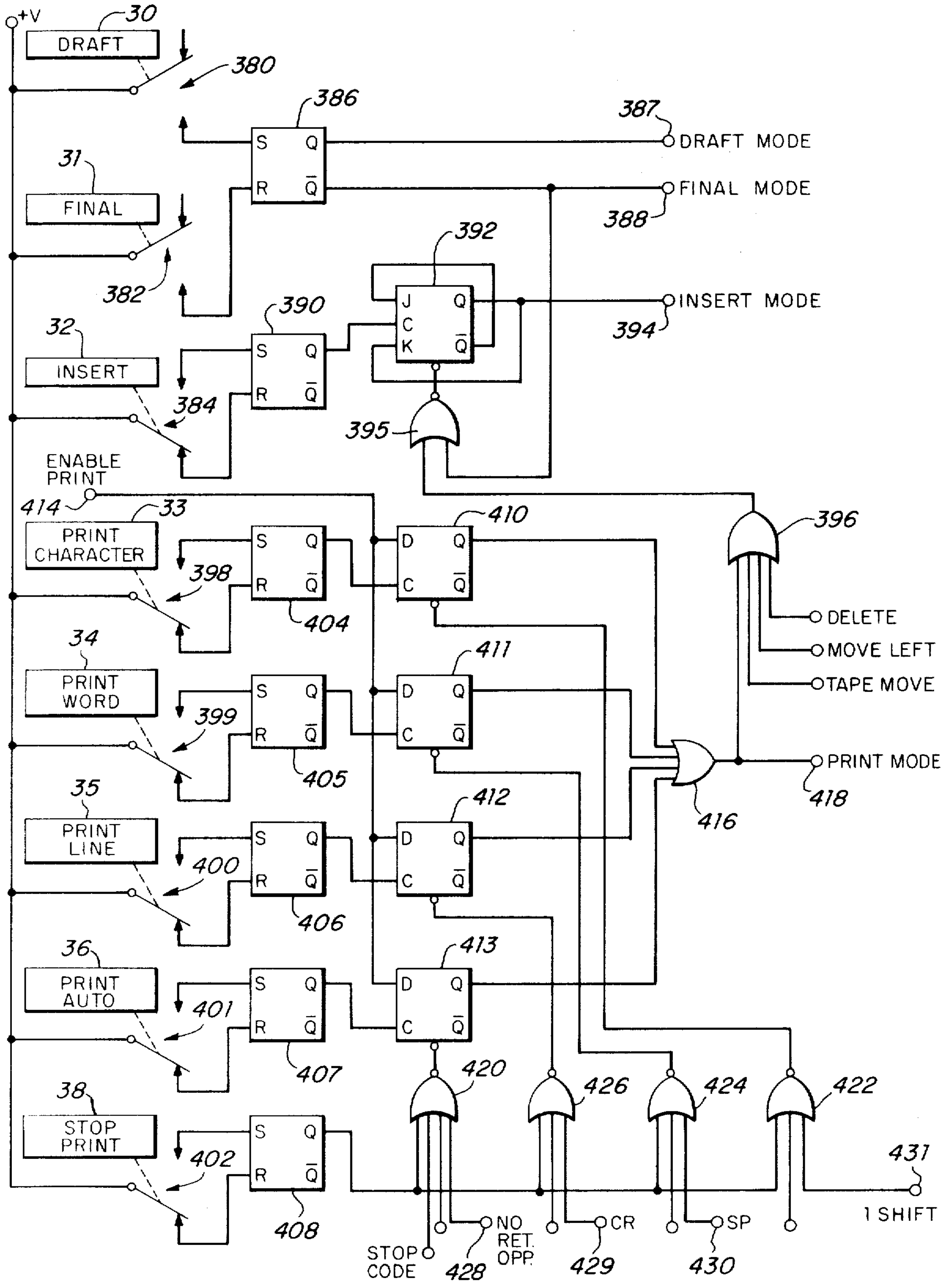
Figure 13:
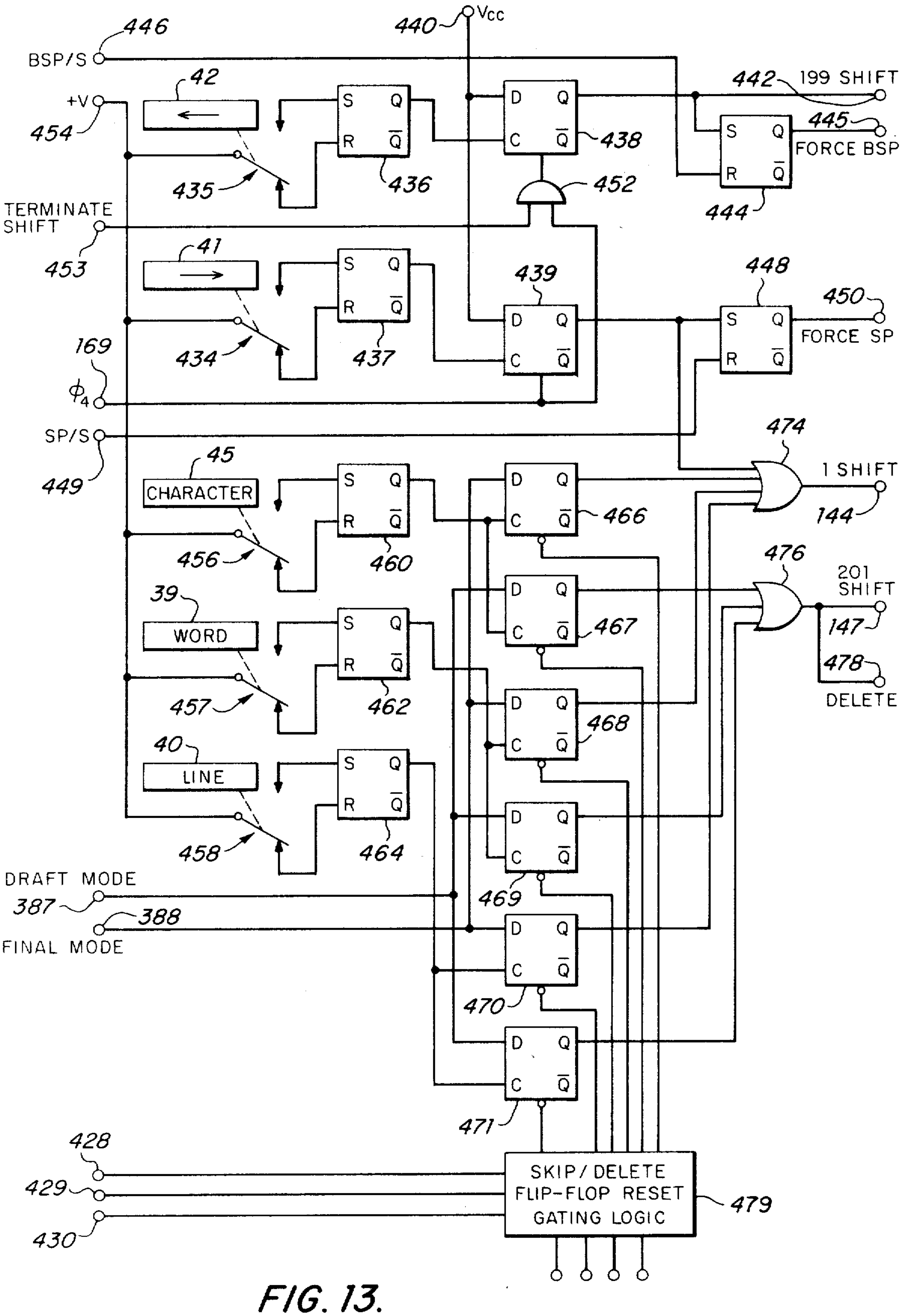
Figure 14:
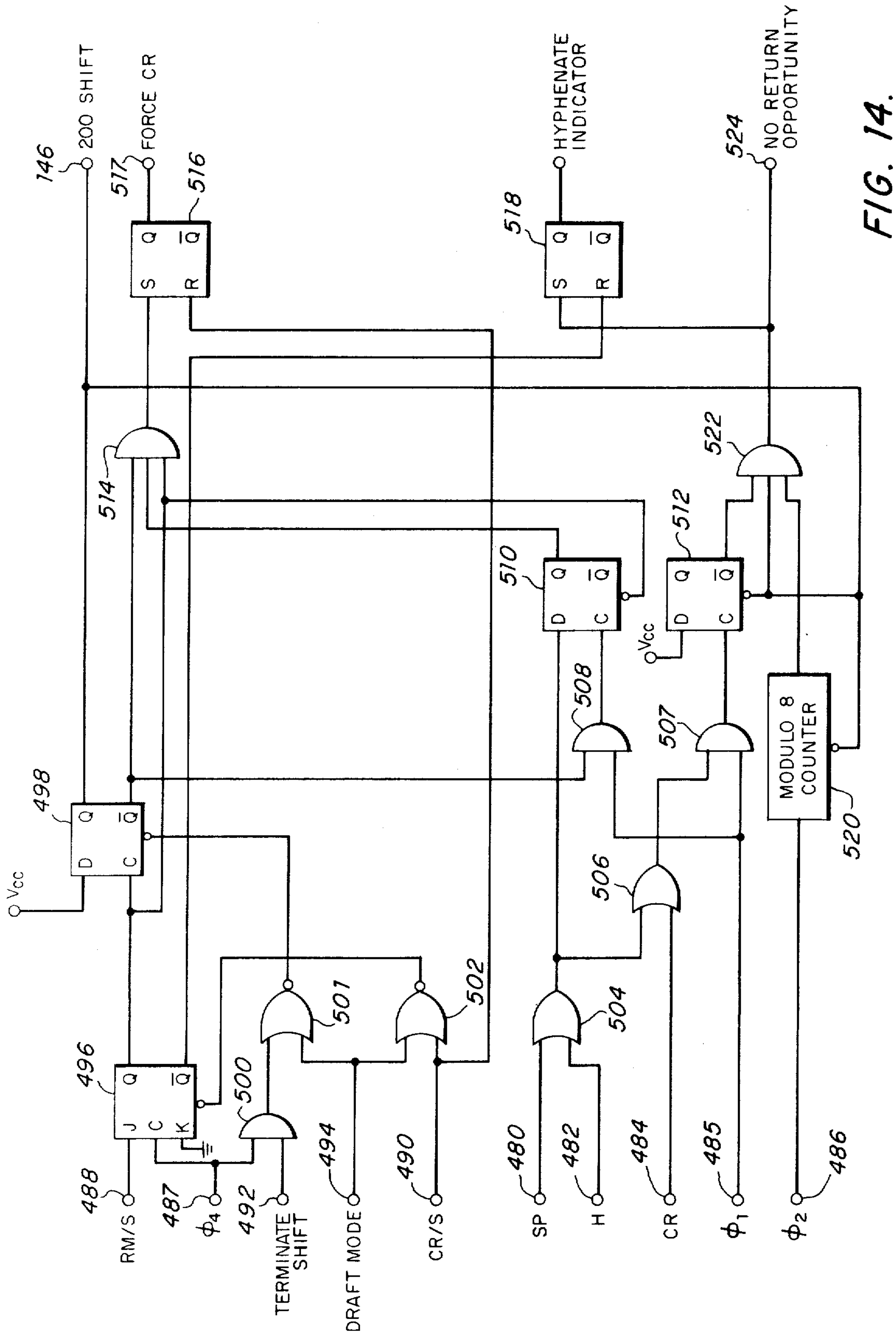
Figure 15:
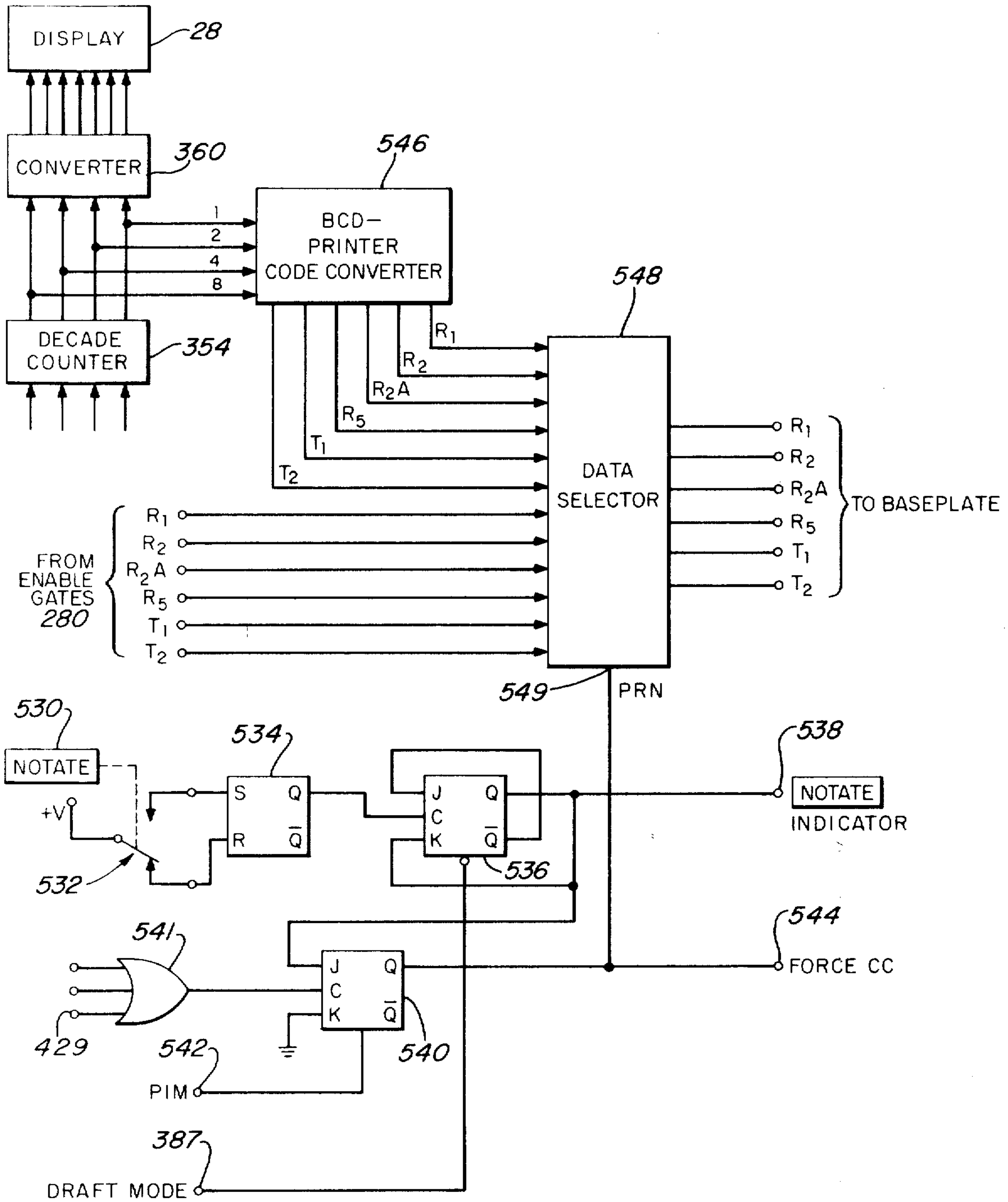

FIGS. 6A to 6D inclusive illustrate, as timing diagrams on a common time base, operation of the clocking control system of FIG. 6;

FIG. 7 is logic diagram partly in block form illustrating output multiplexer, input demultiplexer and read-and-write circuits shown in FIG. 3;

FIG. 8 is a timing diagram illustrating the operation of elements of FIG. 7;

FIG. 9 is a logic diagram, partly in block form, showing the print control logic system of FIG 3;

FIG. 10 is a diagram illustrating some logic employed in the main control of FIG. 3 for controlling clocking of the buffer memory;

FIG. 11 is a diagram, partly in block form showing address display logic coupled with the control console;

FIG. 12 is a diagram illustrating logic in the main control of FIG. 3;

FIG. 13 is an additional logic diagram illustrating the main control of FIG. 3;

FIG. 14 is a logic diagram, partly in block form, showing the margin adjust logic of FIG. 3; and FIG. 15 is a diagram, partly in block, showing the circuits for controlling the line numbering of the printout of the typewriter of FIG. 1.

Referring now to the drawings, there is shown in FIG. 1 a preferred arrangement of equipment in which the invention is incorporated. The apparatus of the invention includes an input/output printer 20 interconnected by an electrically conductive cable 21 to a control console unit 22 for controlling recording, reproducing, and editing. Printer 20 typically includes a manually operable keyboard 23 for controlling a single head printer of the Palmer-type which has been adapted (for example by being emplaced on a baseplate 24 which is capable of detecting the condition of the latch and cycle shaft switches in the printer and also having solenoids capable of driving the latches and cycle shaft of the printer) for producing an output indicative of the condition of those switches. Such a baseplate is described in U.S. Pat. Nos. 3,452,851 and 3,453,379 issued to L. Holmes, Jr. In printers of the Palmer type each character is automatically encoded when typed. When such a printer is combined with a Holmes type baseplate the combination will be capable of translating or interconverting formation of typed characters and performance of printing functions with corresponding coded character and function signals.

Figure 2:
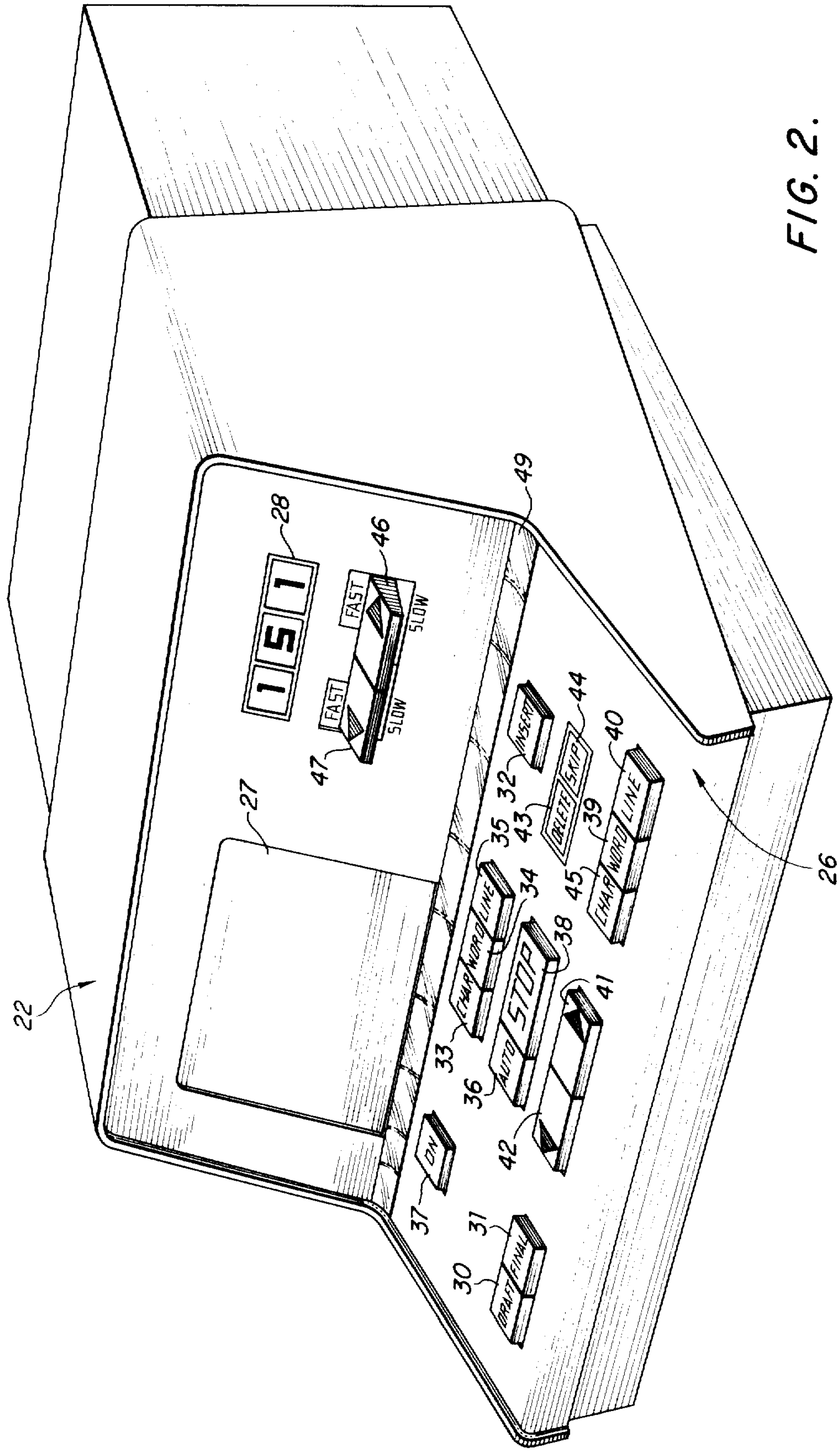
FIG. 2 is an enlarged view of the console of FIG. 1 showing various control buttons, displays and other elements.
Figure 2A:
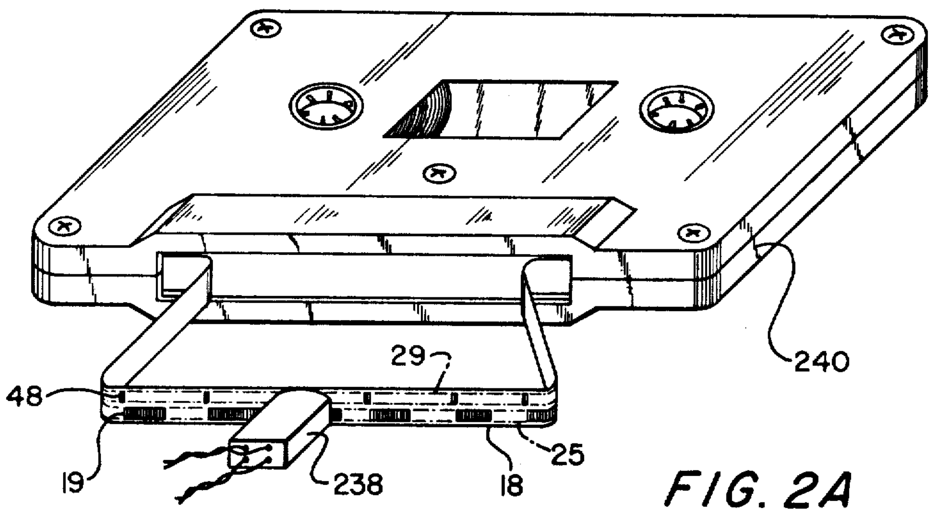
FIG. 2A is a perspective view of a standard tape cassette illustrating in phantom, the organization of information on the tape according to the principles of the present invention

Unit 22 has a control panel 26 shown in more detail in FIG. 2, the panel including a spring-loaded, normally closed cassette door 27 which is moveable so that a magnetic tape cassette 240 (shown in more detail in FIG. 2A) can be loaded into a tape transport mechanism located behind the door. Adjacent door 27 is a display 28 for indicating a record number corresponding to the position of a data location on the tape 18 in a cassette 240 which may be loaded into the machine. On control panel 26 are also a number of keys or buttons and display lights associated with data entry, editing and playback. The system of the invention is intended to have three basic operating modes, a draft mode, a final mode and an insert mode. To provide for selection of the mode of operation of this system there are provided a Draft button 30, a Final button 31, and an Insert button 32. To provide for control of printing out onto the printer of a character, word, or line from storage, either while the system is in draft or final mode, there are included a Character button 33, a Word button 34, and a Line button 35, plus an Automatic button 36 for allowing the system to print continuously. An On button 37 is also provided for starting the system. Stop button 38 is included for stopping any printing operation by the machine. The deleting or skipping of characters, words and lines respectively is provided by manipulation of Character, Word and Line bottons 45, 39 and 40.

A brief description of the functional consequences of the operation of the various buttons on control panel 26 will be helpful in understanding the detailed structural description of the device. It is intended that the system be capable of both recording data onto a cassette 240 or playing data from a cassette 240 onto printer 20 when operating in the draft mode. Specifically, it is intended during draft mode operation that any data entered by manipulation of keyboard 23 of printer 20 should be stored in a magnetic storage or record in the system with any previously recorded characters being overwritten by new data being stored at the same data locations. In order to accomplish this end one need merely start the system, select the record location, press Draft button 30 and proceed to type in data on the keyboard. To cause the data thus stored to actuate printer 20 and therefore to be typed out, it is only necessary to return to the beginning of the stored data to push Character button 33 to obtain print out of a single character, to push Word button 34 to obtain a single word, to push Line button 35 to obtain a single line, or to push Automatic button 36 to permit the entire stored data to be reproduced on printer 20.

If one should now press Final button 31, the system is conditioned so that no storage of data manually typed or entered on printer 20 can occur, but that only the data stored in the machine can be played out on printer 20. When playing in the Final mode it will be later seen that an automatic right margin control system operates. The Draft and Final modes of operation are mutually exclusive and the system provides that if either the Draft or Final buttons are pushed, the machine is switched from the one to the other mode of operation.

Depression of Insert button 32 while the system is in the Final mode will be ineffective, i.e., will not in any sense allow the machine to operate other than in normal Final Mode operation. On the other hand, if the Insert button 32 is depressed while the system is in the Draft mode, the system switches to an Insert Mode of operation, and if desired, visual indication can be given that the machine is in an Insert Mode, as by lighting Insert button 32 or the like. The Insert Mode is intended to provide an operation such that data entered on printer 20 by manual operation of the keyboard 23 will be inserted into storage, up to a limit, without overwriting or otherwise destroying previously stored data. Only typing and recording can take place while in the Insert Mode since pushing any other buttons (except the Draft or Final buttons) on the control panel will cause the machine to trip out of the Insert mode and revert to the Draft mode. If Insert button 32 is pushed again, the system will switch out of the Insert Mode back to the Draft Mode and, of course, any visual indication of Insert Mode operation will terminate. If Final button 31 is pressed, the system will switch to Final mode operation.

The play or print buttons 33, 34, 35, 36 or 38 control the extent to which data will be read out of storage, either in Draft or Final mode operation, and displayed on printer 20. Each time Character button 33 is pushed, the next character in storage will be read out on printer 20. Similarly, depression of Word button 34 on Line button 35 will cause the next word or line in storage to be read out on the printer. When the Automatic button 36 is pushed, the system will cause the printer 20 to type out the data in storage continuously until some stopping command occurs. The latter can be obtained by pressing Stop button 38, or by certain special conditions which will be described hereinafter.

Step Right and Step Left buttons 41 and 42 control the shifting of data in storage. Each time either is pushed the data in storage is shifted by one character in the appropriate direction and the single print head 16 or carrier on the printer 20 similarly steps. In this respect buttons 41 and 42 actuate the print head 16 to move in the same manner as the space bar and backspace key on the printer keyboard 23, with certain exceptions as will be explained later. Preferably, if one of the buttons 41 and 42 is held down, repetitive action is initiated so that the system steps sequentially character by character.

As described, there are three delete/skip buttons 45, 39 and 40. When the system is in Draft mode depression of these buttons will serve to delete a recorded character, word or line from storage. When the system instead is in the Final mode, these buttons act as skip buttons which cause the system to skip the appropriate character, word or line in storage without overwriting or otherwise destroying the skipped data. Because the functioning of these buttons to cause either deletion or skipping depends upon the mode in which the system is then operating, means are provided in the form of visual indicating lights 43 and 44 which respectively light up to indicate the nature of the function of the buttons, i.e., delete or skip as the case may be.

There are two buttons for controlling tape motion, a Tape Forward button 46 and a Tape Back button 47. These are preferably of the spring-loaded type and each has a first or up position and a second or down position. Pushing either of the tape buttons 46 or 47 to its down position causes the system to move the tape 18 either back or forward (as the case may be) to the beginning of the next of a number of predetermined data blocks 19 or stations on the tape 18. This motion from predetermined station to predetermined station on the tape 18 will continue as a smooth sequence until the appropriate button is released. After release of the button, the motion of the tape 18 in the cassette 240 will continue until the next predetermined station on the tape 18 is reached, at which time the motion of the tape 18 is stopped. Similarly pushing either buttons 46 or 47 to their up position causes the system to shift to a fast forward or fast rewind movement (as the case may be) during which the tape winds continuously. Fast winding due to pushing the Tape Back button 47 to its up position will continue until the button 47 is released, at which point the system then shifts to slow forward speed and continues to move the tape until the next predetermined station on the tape is located. A similar operation in the opposite direction is effected by manipulation of the Tape Forward button.

In the preferred embodiment the cassette tape is at least a two track (25 and 29) tape, and two read/write heads, one for each of tracks 25 and 29, (or a single two-channel head such as head 238) are incorporated into the system. One of the tracks, 25, of the tape is for the data to be stored. The other tape track 29 is intended to contain data addresses 48, preferably in the form of coded conversions of sequentially numbered three decimal digits, each data address 48 being physically located substantially adjacent the beginning of a data block 19 on track 25. Thus, when the tape is moved either forward or back in the cassette, circuitry associated with the address read/write head and the record number display 28 will cause the latter to be appropriately indexed each time an address corresponding to a data block 19 or record moves past the read head. If desired, one can provide an erase mechanism associated with the tape transport mechanism and the control panel so as to erase selectively all data from the tape 18, and also if desired to regenerate the addresses on the tape 18.

Also in the preferred embodiment, associated with the control panel are a number of visual indicators or special lights 49 in addition to the delete/skip light and insert indicator light discussed earlier. These additional lights will be described later hereinafter. Similarly, a number of audio signal devices to indicate certain conditions of the apparatus can also be provided and will be described hereinafter.

The operation of the device thus described can be advantageously described in connection with a typewriter as an example of the printer. There are three basic situations to be described:

1. Basic entering of data through the typewriter keyboard, i.e., recording an initial draft;
2. Insertion, deletion and other operations made on data after entry of the latter, i.e., editing; and
3. Data retrieval, i.e., typing of final copy.

In order to record data initially, the operator will first activate the typewriter and also will depress button 37 to turn on the remainder of the system. The operator should first set margins and tabs on the typewriter as desired although one or more embodiments of the invention may include the ability to set and clear tabs on the basis of prior stored information. Then a magnetic tape cassette 240 is placed in the carrier behind door 27 and the operator then depresses button 30 to place the system in the draft mode of operation. The position of the tape 18 in the cassette 240 will be indicated by the address displayed at display 28. If the cassette 240 is not rewound and it is desired to start from the beginning of the cassette, the latter can be rewound by pushing Tape Back button 47 to its up position and waiting until rewind is completed. If the operator wishes to start beyond previously recorded material that is to be preserved, the tape 18 can be moved with buttons 46 and 47 until the appropriate address is noticed at display 28.

Hereafter, recording in the Draft mode is accomplished automatically merely by typing the desired information on the typewriter keyboard 23. Each time the operator types a Carrier Return, the data associated with the preceding typed line is then transferred from the buffer memory of the system onto magnetic tape 18. If the operator observes that a wrong key has been struck, correction can be made by depressing the Step Left button 42 which causes the typewriter to automatically backspace. When the typewriter has been backspaced to the error, the operator can strike over the error with the correct character key. To get back to the point where recording had been interrupted, the Step Right button 41 can be depressed, or as will appear later, one can play out the intervening material which has been recorded, or lastly one can retype the intervening material and rerecord it.

If the operator wishes to underscore a word upon entry, the word can be typed and then, using the regular backspace key on the typewriter keyboard which will provide a recorded backspace, the typewriter should be backed up to the beginning of the word. The word can then be underscored, the underscoring being recorded also.

When the operator has completed the draft, a Stop Code should be entered. The Stop Code is generated by depressing the shift key and striking Stop button 38 on the control panel.

Editing of a draft can be done in three basic ways:

1. A new draft can be generated in the Draft mode of operation, combining the desired parts of the old draft with typed and recorded corrections;
2. Only specific lines requiring editing can be modified; or
3. A final copy can be generated in the Final mode of operation with corrections being entered on the copy as the document is printed, without recording the corrections.

Normally, the first approach would be used especially if further author revisions are anticipated. The third approach is appropriate if only final, minor corrections are to be made and a final copy is desired.

In generating a new draft, the following situations are likely to be encountered. First, one can edit simple typographical errors by playing back the tape 18 in the Draft mode, by first striking any one of buttons 33, 34, 35 or 36. This will cause the material recorded on the cassette to be played back on the typewriter, assuming of course that the cassette 240 has been rewound to the appropriate starting position. The material is then played up to but not through the error and the error is corrected by overstriking. Overstriking using the keyboard 23 will automatically erase the erroneous material from the system and substitute the corrected material in the appropriate place.

If the error in the draft is surplusage of material such as an extra letter or the like, it can be corrected by playing the material out on the printer 20 up to but not through the extra matter. The latter can now be deleted by simply pressing the appropriately selected one of Delete/Skip buttons 45, 39 or 40 inasmuch as these buttons generate signals to place the system in condition to delete the material when the system is also in the Draft mode.

If the error in the Draft mode is due to missing material, the latter can be added by playing out the recorded material (in the Draft mode) up to the appoopriate position, pushing Insert Button 32 and typing on keyboard 23 the missing characters or words. The machine can then be taken out of the Insert mode simply by pushing any of the buttons 33 to 36 inclusive, all of which when actuated switch the system back to the Draft mode of operation.

Final copy can be typed in either the Draft or Final mode. In typing out copy, the basic difference in operation between the two modes is simply that in the Draft mode the system will execute each carrier return signal that has been recorded whereas, in the Final mode the carrier returns may or may not be executed depending upon the operation of an automatic right margin control feature.

If no further editing is required, the operator merely inserts paper into the printer, sets the tabs and margins of the latter, puts the cassette 240 into the machine, and moves it to the beginning of the document with buttons 46 and 47. The machine then is placed in automatic play by striking Automatic button 36. The material or text stored in the machine will now be played out on the printer 20 on a substantially continuous basis until the printing is stopped by either striking Stop button 38 or because the operator has preferably recorded an appropriate Stop Code at the end of each page of text. If manual entry of certain material such as the name and address of the person to whom a letter is to be sent is to be inserted on the final copy, a Stop Code should have been recorded when the original draft was recorded so that automatic printing stops at the point where the special material is to be manually entered. In order to prevent a recording of the manually entered material if the system is not operating in the Final mode, the system should then be switched temporarily so that mode of operation by depressing button 31.

If the final copy is being printed out in the Final mode of operation, the system will stop printing whenever it detects that it cannot automatically find a carrier return opportunity such as a recorded Carrier Return or Space or Hyphen signal in a predetermined return zone adjacent the right margin of the printed text. When this occurs, the operator may use key 33 to cause machine printing, character by character, up to the point where a Hyphen and a carrier Return can be manually entered on the keyboard 23 after which automatic typing can then be reinitiated, e.g. by again depressing the Automatic key 36. Normally, this manually entered Hyphen and Carrier Return will not be recorded so that any reruns from the same tape will encounter the same stopping conditions. If, however, the operator wishes to record the Hyphen and Carrier Return, this may be done by pressing Draft button 30 and Insert button 32, typing the Hyphen and Carrier Return, then pushing Final button 31 to switch the system operation back to Final mode, and finally pushing one of the buttons 33-36 inclusive to resume printing. As long as no further changes are made in the paragraph up to this point, subsequent reruns will always find the Carrier Return and hyphen when needed and will continue playing without automatically stopping.

In typing final copy, it may be necessary to make some minor corrections in the recorded material. As long as these changes need not be recorded on the tape, the procedure is simple while operating in the Final mode. Simply by depressing any of the Delete/Skip buttons, 39,40 and 45, one may cause the system to skip over unwanted characters, words, or lines in the material being played back and additional material may be manually typed in.

Before describing some of the more complex editing operations, it will be advantageous to describe briefly the general organization of the system embodying printer 20, baseplate 24 and control console unit 22. With reference particularly to FIG. 3, there is shown a block diagram of the organization of a system in simplified form. In order to clarify the diagram, all of the control connections are shown as solid lines whereas all of the data carrying lines are shown as dashed lines. The embodiment of FIG. 3 includes input/output printer 20 which, as previously described is connected via base plate 24 to the control console. Data flow from the printer 20, in the form of electrical signals, is applied to keyboard interface logic 50. The latter primarily serves to encode electrical signals from the printer 20.

The output of the interface logic 50 is then fed along an appropriate connection to the input of a buffer memory 52. As will be described later, the buffer memory 52 is preferably in the form of a shift register capable of storing, for example, 200 characters each of eight bits.

It will be appreciated that one may however employ a random access type memory such as a core array as memory 52, but because a random access memory might involve complex addressing logic, a shift register type of memory is preferred. The output of the buffer memory 52 in turn is connected to means such as a multiplexer 54 for converting the eight parallel bit per character format of the data organization in the buffer memory 52 to a serial train of data bits. The output of multiplexer 54 is then in turn fed to the input of write-data circuitry 56 which conditions the data and places it in single-channel format for storage, such as on the tape 18 in a cassette 240 mounted in a magnetic recording apparatus indicated as data storage 58.

Alternatively, if one employs an eight-track tape with corresponding read-write channels, data need not be multiplexed but can be read out directly from buffer storage to tape.

The organization shown in FIG. 3 also includes a return path for reading data out of data storage 58 so that it can be printed out by printer 20. To this end, data storage 58 is connected to read-data circuits 60 and to read-address circuits 63. The latter is intended to read the address track 29 on the two-channel tape 18 and provides an output which is connected to address-display logic 64 which serves to actuate address-display 28. Read-data circuits 60 are intended to read the data stored in serial form on the other track 25 of the tape 18. The output of read-data circuits 60 is fed to means, such as input demultiplexer 62, for converting the serial form of the data into an eight parallel bit per character code, suitable for injection into the buffer memory. To that end the output of demultiplexer 62 is coupled to the input of buffer memory 52. The output of buffer memory 52 is also connected as an input to both margin-adjust logic 66 and print-control logic 68. Margin-adjust logic 66 serves to examine the contents of buffer memory 52 so as to decide if, within a predetermined printing zone along the right hand margin of the carrier travel set on printer 20, a Hyphen, Space or Carrier Return code will occur, thereby providing the basis for a right hand margin adjustment system. Print-control logic 68 is primarily employed to control printer 20 in accordance with the character and functional signals received from the buffer memory and the signals received from margin-adjust logic 66. Additionally, print-control logic 68 is intended to decode the contents of buffer memory 52 into a form suitable for actuating printer 20.

Console unit 22 and the controls contained therein are shown as main control block 22A which is connected for controlling the operation of printer 20. Main control block 22A is interconnected with the keyboard interface logic for controlling the sum of the encoding functions of the latter and is also in turn connected to receive signals from the keyboard interface logic for use else where in the system. Similarly, control block 22A is connected so as to view the data flowing both into buffer memory 52 and out of buffer memory 52. Print-control logic 68 includes preferably a parity check system whereby it examines data flowing out of buffer memory 52 for odd parity and provides a control signal to main control block 22A to indicate if parity is or is not correct. Buffer memory 52 is connected so as to be controlled by a buffer control system 70 which in turn is under the control of main control block 22A. The system also includes write-control logic 72 which is connected so as to be responsive to main control block 22A and is also coupled to control write-data circuits 56. Similarly, the system includes read-control logic 74 which is connected to be responsive to main control block 22A and serves to control both read-data circuits 60 and read-address circuits 63. The system also includes tape control circuits 75 which are responsive to main control block 22A and serve to control operation of mechanisms for transporting the data storage record or tape.

For convenience, the form of encoding employed in the system of the invention is based to a large extent upon the nature of the basic structure of a printer of the Palmer-type and a base plate of the Holmes-type. Thus, the print or informational characters can be defined in binary form according to the following Table I, wherein the eight data lines carrying each bit are respectively identified as R1, R2, R2A, R5, T1, T2, P (parity) and S (case), all collectively referred to hereafter as the data lines.

TABLE I

| BIT POSITION | 1<br>R1 | 2<br>R2 | 3<br>R2a | 4<br>R5 | 5<br>T1 | 6<br>T2 | PARITY | CASE |
|---|---|---|---|---|---|---|---|---|
| Character: | | | | | | | | |
| a | 0 | 0 | 1 | 1 | 1 | 0 | 0 | 0 |
| b | 0 | 0 | 0 | 0 | 0 | 1 | 0 | 0 |
| c | 0 | 0 | 1 | 1 | 0 | 1 | 0 | 0 |
| d | 1 | 0 | 1 | 1 | 0 | 1 | 1 | 0 |
| e | 1 | 0 | 1 | 0 | 0 | 1 | 0 | 0 |
| f | 0 | 1 | 1 | 1 | 0 | 0 | 0 | 0 |
| g | 1 | 1 | 1 | 1 | 0 | 0 | 1 | 0 |
| h | 1 | 0 | 0 | 0 | 0 | 1 | 1 | 0 |
| i | 0 | 0 | 1 | 0 | 1 | 0 | 1 | 0 |
| j | 1 | 1 | 1 | 0 | 0 | 0 | 0 | 0 |
| k | 0 | 0 | 1 | 0 | 0 | 1 | 1 | 0 |
| l | 1 | 0 | 0 | 1 | 0 | 1 | 0 | 0 |
| m | 1 | 1 | 1 | 1 | 1 | 0 | 0 | 0 |
| n | 0 | 1 | 1 | 0 | 0 | 1 | 0 | 0 |
| o | 1 | 0 | 0 | 1 | 1 | 0 | 0 | 0 |
| p | 1 | 0 | 1 | 0 | 0 | 0 | 1 | 0 |
| q | 0 | 0 | 1 | 0 | 0 | 0 | 0 | 0 |
| r | 1 | 0 | 1 | 1 | 1 | 0 | 1 | 0 |
| s | 1 | 0 | 0 | 0 | 1 | 0 | 1 | 0 |
| t | 1 | 1 | 1 | 0 | 0 | 1 | 1 | 0 |
| u | 0 | 1 | 1 | 1 | 0 | 1 | 1 | 0 |
| v | 0 | 1 | 1 | 1 | 1 | 0 | 1 | 0 |
| w | 0 | 0 | 0 | 0 | 1 | 0 | 0 | 0 |
| x | 1 | 1 | 1 | 1 | 0 | 1 | 0 | 0 |
| y | 1 | 0 | 0 | 0 | 0 | 0 | 0 | 0 |
| z | 1 | 1 | 1 | 0 | 1 | 1 | 0 | 0 |
| 1 | 1 | 1 | 1 | 1 | 1 | 1 | 1 | 0 |
| 2 | 0 | 1 | 1 | 0 | 1 | 1 | 1 | 0 |
| 3 | 0 | 1 | 1 | 1 | 1 | 1 | 0 | 0 |
| 4 | 1 | 0 | 0 | 1 | 1 | 1 | 1 | 0 |
| 5 | 1 | 0 | 1 | 0 | 1 | 1 | 1 | 0 |
| 6 | 0 | 0 | 1 | 0 | 1 | 1 | 0 | 0 |
| 7 | 1 | 0 | 1 | 1 | 1 | 1 | 0 | 0 |
| 8 | 0 | 0 | 1 | 1 | 1 | 1 | 1 | 0 |
| 9 | 0 | 0 | 0 | 0 | 1 | 1 | 1 | 0 |
| 0 | 1 | 0 | 0 | 0 | 1 | 1 | 0 | 0 |
| ; | 1 | 0 | 1 | 1 | 0 | 0 | 1 | 0 |
| , | 0 | 0 | 1 | 1 | 0 | 0 | 1 | 0 |
| . | 0 | 1 | 1 | 0 | 1 | 0 | 0 | 0 |
| ' | 1 | 0 | 1 | 0 | 1 | 0 | 0 | 0 |
| / | 1 | 0 | 0 | 1 | 0 | 0 | 1 | 0 |
| = | 0 | 1 | 1 | 0 | 0 | 0 | 1 | 0 |
| + | 1 | 1 | 1 | 1 | 1 | 1 | 1 | 0 |
| Hyphen | 0 | 0 | 0 | 0 | 0 | 0 | 1 | 0 |

Upper case characters, of course, use a 1 bit in place of the case bit in each instance, and also for upper case characters the parity bit is the complement of the parity bit for the lower case character, in order to maintain odd parity. It will be appreciated that other encoding systems can be used, but the foregoing is the more convenient.

Figure 4:
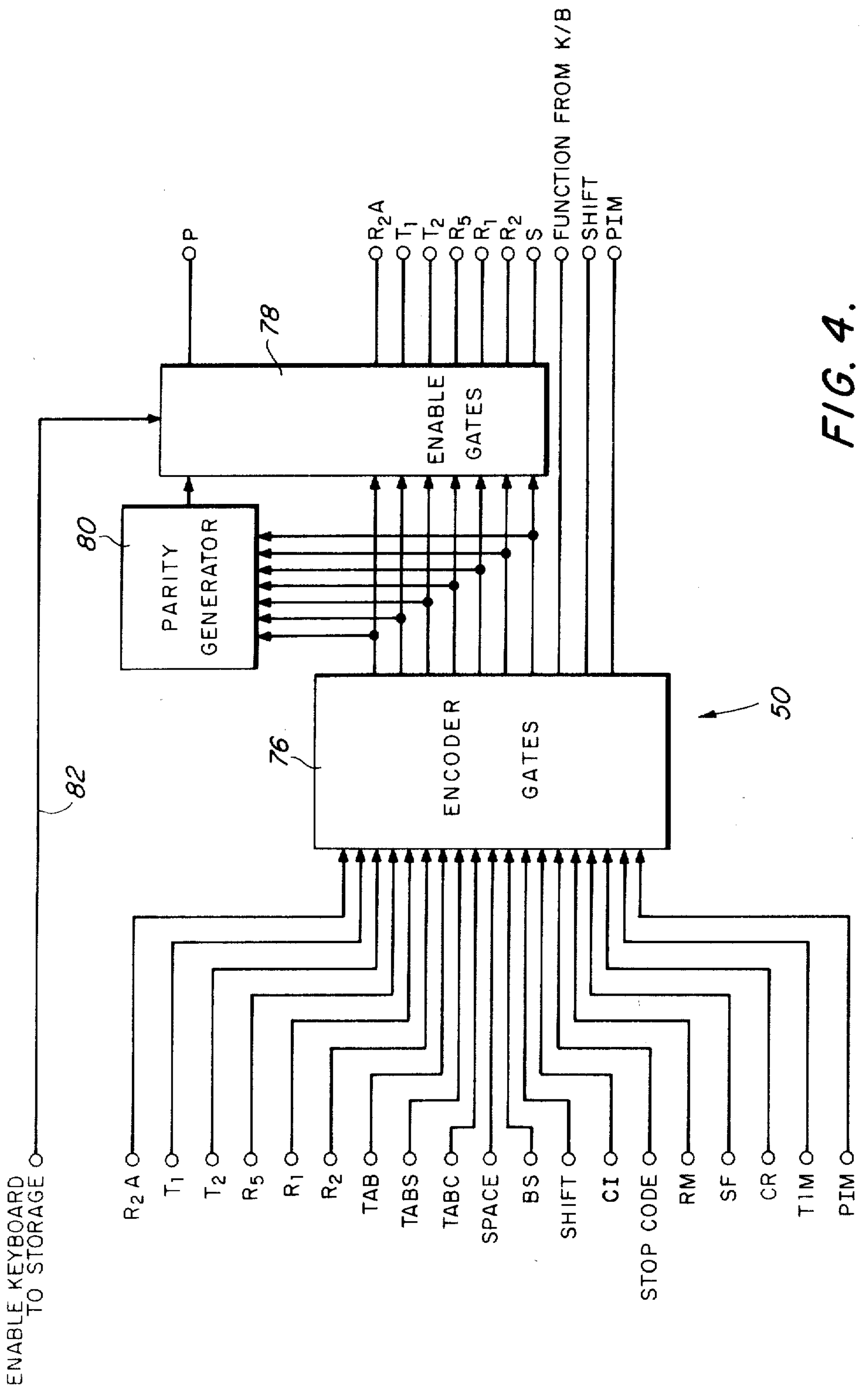
FIG. 4 is a block diagram showing details of the keyboard interface logic of FIG. 3.

As known, base plate 24 has six output data lines on which appear information character signals identified as R1, R2, R2*a*, R5, T1, and T2 (see FIG. 4). Each information character generated by the printer in response to operation of the keyboard is partially encoded in the form of combination of bits represented by these information character signals. These signals are direct outputs of the base plate.

Additionally, other signals representing operation of the functional keys of the printer are produced by the base plate as uncoded or simple signals. These signals are Tab (TAB), Tab Set (TABS), Tab Clear (TABC), Backspace (BS), Line Feed or Carrier Index (CI), Space (SP), Shift (SH) and Carrier Return (CR). Still another output obtained directly from baseplate 24 is a Printer-Head-in-Motion signal (PIM). All of the foregoing signals are fed as input signals to the keyboard interface logic 50 (FIGS. 3 and 4). In addition to the foregoing signals received directly from the baseplate, other simple signals may be supplied as inputs to the keyboard interface logic 50. Included are such signals as a Stop Code signal generated by depressing the shift key on the keyboard 23 of the printer and concurrently depressing Stop button 38 on the control console. The shift and stop signals produced are then gated in known manner to produce the Stop Code signal which is then encoded by keyboard interface logic 50 as shown in Table III.

Referring now to FIG. 4, the logic 50 includes an encoder which comprises a plurality of encoder gates 76 having input lines which carry the foregoing keyboard logic input signals. The keyboard inteface logic 50 also includes a plurality of enable gates 78, a parity generator 80, and an enable line 82 connected to provide an enabling signal to enable input terminals of gates 78. Encoder gates 76 have data output lines connected to the input terminals of enable gates 78 and parity generator 80 has a plurality of input terminals connected to receive the signals being carried by the data output lines of encoder gates 76. The output of parity generator 80 is also connected as an input to enable gates 78.

To the extent shown in FIG. 4, the keyboard logic 50 performs a number of related functions. A basic function is to complete the encoding of characters generated by operation of the keyboard so that each informational character is now coded as a unique combination of eight bits as earlier identified in Table I. This is accomplished by adding a parity bit and a case bit to the partial code produced by the informational character signals appearing on the six output data lines of the base plate. Another function is to encode as other unique combinations of eight bits, as identified in Table II, the various machine keyboard controlled functions that appear as direct base plate outputs — namely Tab, Tab Set, Tab Clear, Space, Backspace, Carrier Return and Carrier Index (i.e., Line Feed).

A third function is to encode as still other unique combinations of eight bits other logic inputs that do not arise directly or solely from that baseplate — namely, the Stop Code, and certain special or required functions. The preferred coding for the Stop Code is shown in Table III together with the coding for Blank Cell.

A fourth function is to provide three other outputs, an SH signal, a PIM signal and a signal identified, for convenience, as Function from Keyboard. This latter signal appears whenever any one of several signals indicative of keyboard function (specifically Tab, Tab Set, Tab Clear, Space, Backspace, Carrier Index and Carrier Return) appear at the inputs to encoder gates 76. These encoding functions are performed by encoder gates 76 and by parity generator 80, with the case (S), parity bit signal (P) and information character signals appearing as outputs of enable gates 78. Enable gates 78 produce outputs in response to signals appearing in the output data lines of encoder gates 76 and parity generator 80 only when an enable signal appears on enable line 82. Parity generator 80 is of a known type which generates a 1 bit along an output line to provide a parity signal P according to whether the parity of the signals appearing on its seven output lines is even or odd. The system herein disclosed uses odd parity so that a 1 bit is generated by parity generator 80 only when it determines that its input data signals have even parity. Parity signal P is passed to an appropriate output terminal of gates 78 when the latter are enabled.

Figure 5:
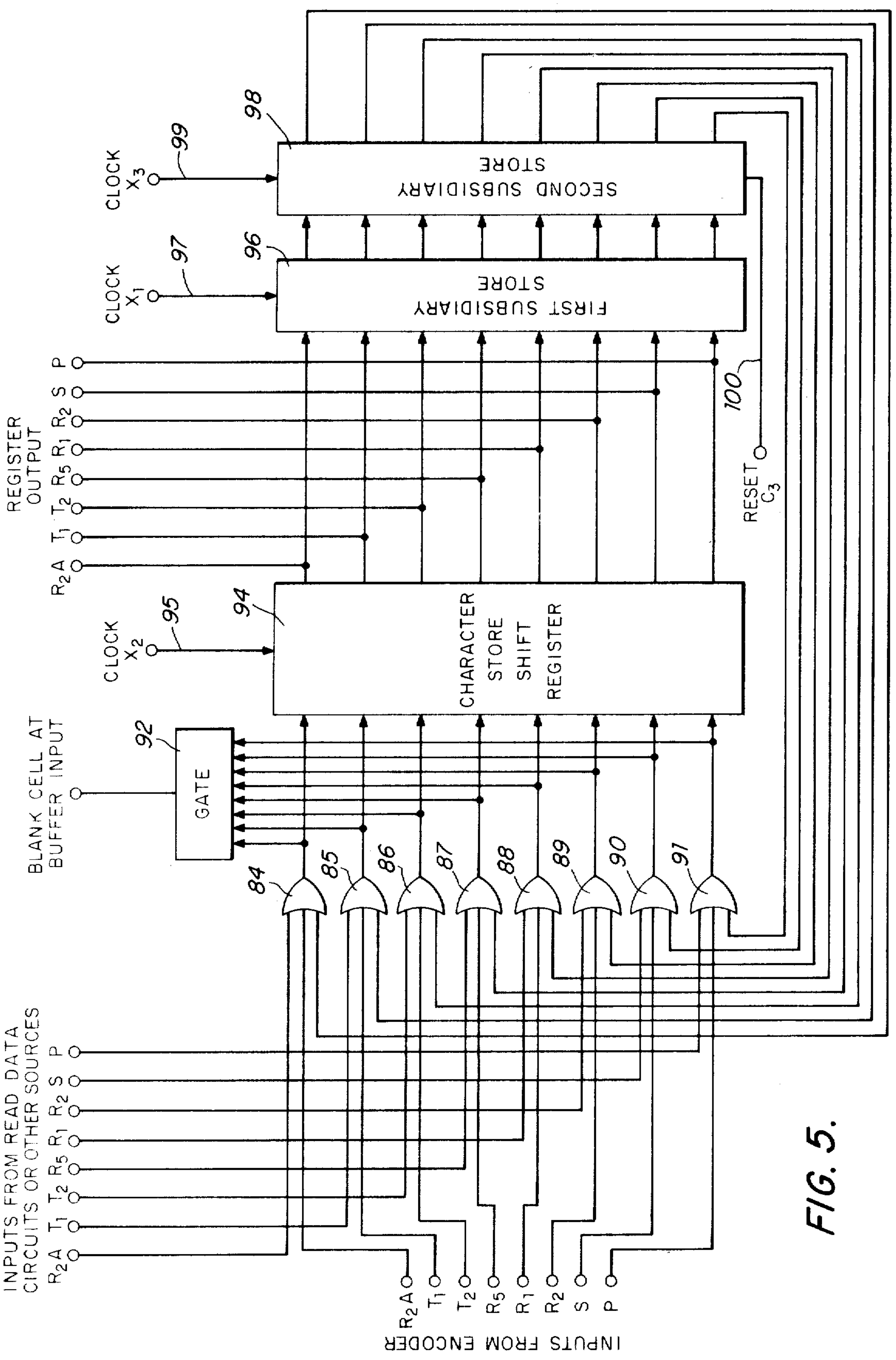
FIG. 5 is a block digram showing details of the buffer memory of FIG. 3.

The encoder output shown in FIG. 4 from enable gates 78 and from encoder gates 76, as previously indicated in FIG. 3, are applied to buffer memory 52. The latter is shown in FIG. 5 as comprising eight input OR gates 84, 85, 86, 87, 88, 89, 90 and 91. The outputs from enable gates 78 are respectively connected to gates 84 through 91 inclusive. The latter are also connected to eight other input terminals, each identified by the corresponding code bit, to which are applied information character, case and parity signal inputs derived from the Read Data Circuits or other sources. The output from gates 84–91 inclusive are fed to a blank cell detector in the form of gate 92 which forms part of main control block 22A and are also fed in to the respective inputs of a main storage memory, preferably in the form of a static shift register 94 capable of storing 300 eight bit characters. Clock line 95 is provided for introducing a clocking signal $X_2$ for initiating storage or buffer shifting. The outputs of shift register 94, again eight lines which correspond to the inputs from enable gates 78 are connected to corresponding output terminals each identified by the appropriate corresponding code in the drawing. The eight output lines are also connected to the corresponding inputs of a first subsidiary storage register or device 96 which is prefer-

TABLE II

| BIT POSITION | 1<br>R1 | 2<br>R2 | 3<br>R2a | 4<br>R5 | 5<br>T1 | 6<br>T2 | PARITY | CASE |
|---|---|---|---|---|---|---|---|---|
| Functions: | | | | | | | | |
| Tab Set | 0 | 1 | 0 | 0 | 0 | 0 | 0 | 0 |
| Tab Clear | 0 | 1 | 0 | 0 | 0 | 1 | 1 | 0 |
| Tab | 0 | 1 | 0 | 1 | 0 | 1 | 0 | 0 |
| Space | 0 | 1 | 0 | 1 | 1 | 1 | 1 | 0 |
| Backspace | 0 | 1 | 0 | 1 | 0 | 0 | 1 | 0 |
| Carrier Index | 1 | 1 | 0 | 1 | 0 | 1 | 1 | 0 |
| Carrier Return | 1 | 1 | 0 | 1 | 1 | 0 | 1 | 0 |

TABLE III

| BIT POSITION | 1<br>R1 | 2<br>R2 | 3<br>R2a | 4<br>R5 | 5<br>T1 | 6<br>T2 | PARITY | CASE |
|---|---|---|---|---|---|---|---|---|
| Functions: | | | | | | | | |
| Stop Code | 1 | 1 | 0 | 0 | 0 | 0 | 1 | 0 |
| Blank Cell | 0 | 0 | 0 | 0 | 0 | 0 | 0 | 0 |

ably an eight-bit signal character register having an input clock line 97 at which clocking signal $X_1$ is intended to be applied. First subsidiary storage device 96 has eight output lines, each corresponding of course to one of the eight input lines thereto and each connected to a corresponding input of a second eight-bit single character register 98 which is clocked by a signal $X_3$ over line 99 and can be cleared by a reset-signal $C_3$ over a line 100. Register 98 again has eight output lines each corresponding to a respective input line to the register, the output lines from register 98 each being connected to a corresponding one of input gates 84–91 inclusive so that, for example, gate 91 which has an input connected to the parity bit line from parity generator 80 also has an input connected to the corresponding parity bit line from register 98. Similarly, all of the other input lines to the various OR gates 84–91 are matched. The path thus defined from the respective input OR gates through the main buffer storage register 94, through registers 96 and 98 and back to the input OR gate, will be seen to constitute a complete feedback path around the main register 94. In the embodiment shown, two subsidiary storage registers 96 and 98 are employed to minimize problems arising from possible differences in the operating speed of the main and subsidiary storages. However, the feedback loop may comprise but one single-character register if the latter is closely matched in terms of operating speed to the main register 94.

It is now important for an understanding of the invention to appreciate how data is passed through the buffer memory during the various operating modes heretofore described.

As previously noted, the main store is static shift register. Assuming that it is an eight-line 200 bit register 96 and 98, i.e., can store 200 eight bit characters, each time a clocking signal $X_2$ is applied over line 95, a new character will be entered at the left hand end of the register via gates 84–91 and whatever characters are already stored in the register will shift one cell, i.e., one bit position to the right. If a character is already stored in the two-hundredth cell, it will be ejected from the right hand of the cell when the register shifts in response to an $X_2$ clocking signal. The subsidiary stores also are static shift registers. Accordingly, occurrence of a clocking signal $X_1$ on line 97 will cause the first subsidiary storage register 96 to respond to and store the data signals that appear on the output lines of register 94. Occurrence of a clocking signal $X_3$ on line 99 will cause the second subsidiary storage register 98 to respond to and store the data signals appearing on the output lines of the first subsidiary storage register 96. Occurrence of a $C_3$ reset pulse on clear line 100 clears the second subsidiary storage register 98 to prevent a character previously stored therein from being circulated back to the register 94 via OR gates 84–91. Clearing the second subsidiary storage register 98 is performed when it is desired to clear the main register or to enter new data into the main register.

The clocking pulses for the buffer memory are derived from a four-phase clock pulse generator. As described hereinafter, the clock generator is gated to provide a series of four clock pulses or tetrads occurring at times $\phi_1$, $\phi_2$, $\phi_3$, $\phi_4$. The generator also is adapted to generate such tetrads as in four different clusters or groups characterized by a quantifier depending upon the operating mode of the system. The clock pulse generator is gated to provide a train of clock pulses each time a printer key is depressed or the printer prints a character or executes a function in response to an output from the buffer memory 52 or each time the system is caused to delete or skip a character as a result of depressing one of the delete/skip buttons 45, 39 and 40. The reason for slaving the clock pulse generator (and thus the buffer memory) to the printer when the system is set so that the typewriter will print out in accordance with the output from the buffer memory, is that the printer takes longer to execute some operations than others. Similar reasoning is the basis for adapting the clock pulse generator to generate pulse groups according to one of four different quantifiers depending upon the operating mode of the system. As will be seen, the quantifiers in the preferred embodiment are 1, 199, 200 and 201.

As herinafter described, provision is made for clocking the buffer memory so that it can be made to undergo a single shift cycle or a 201 shift cycle (assuming a 200 character main buffer). In the single shift cycle the main register 94 is shifted as a result of an $X_2$ clocking signal. In the 201 shift cycle, the second subsidiary register 98 is held clear during the main store shift to prevent circulation of old data from the second subsidiary register 98 back to the main register 94. When typing in a character from the keyboard in the Draft mode, there is no need to clock the subsidiary registers in order to effect a single shift whereby the typed character is entered into the left hand end of the main register 94; in practise however, all three registers 94, 96 and 98 are clocked according to a "$X_1X_3X_2$" sequence (i.e., clocking signals $X_1$, $X_3$, and $X_2$ occur in the order named at times $\phi_1$, $\phi_2$, and $\phi_3$ respectively). In a 201 shift cycle, the main register 94 is shifted 201 times, with all three registers 94, 96 and 98 being clocked according to the normal sequence "$X_1X_3X_2$," or a second special "$X_1X_2X_3$" sequence. In this latter sequence, the clocking signals $X_1$, $X_2$, and $X_3$ occur in the order named at times $\phi_1$, $\phi_2$, and $\phi_3$ respectively. Provision is also made for clocking the buffer memory so that it can undergo a 199 or 200 shift cycle (again assuming a 200 character main store). The 199 shift cycle is used to shift the contents of the main storage register to the left (backward) one cell while the 200 shift cycle is used to clear the main register and for other actions.

A large number of buffer memory clocking modes are employed in operation of the system. Some of these modes are described as follows:

Typing data into store in the Draft mode: In this case a single or a 201 shift cycle is used, with the clocking occurring in the $X_1X_3X_2$ sequence and the second subsidiary storage 98 being held clear during the single shift cycle and during the first of the 201 shifts to prevent ciculation of old data and to enable a new character to be entered into the main register 94. No reset signal is applied to clear line 100 during the remaining 200 shifts so that the contents of the main register 94 can be circulated and so that the new character sits at the left hand end of the main register 94 just as if a single shift cycle had been executed. The advantage of using the 201 shift cycle rather than the single shift cycle for this purpose is because the 201 shift cycle permits one to examine the buffer contents to detect a full buffer condition.

Printing out from the buffer memory: Single shifts are used in this mode, with the $X_1X_3X_2$ sequence providing normal circulation of data through the main and subsidiary storage registers 94, 96 and 98. Data signals from the typewriter sensors in the base plate 24 during the time that the typewriter is printing out are prevented from appearing on the input lines to OR gates 84–91.

Inserting data into store in the insert mode: This mode can be utilized when the machine has been set for Insert mode operation. It involves a 201 shift cycle. The clocking order is initially $X_1X_2X_3$, but is caused to revert to $X_1X_3X_2$ at a point in the 201 shift cycle when a blank cell is detected at a selected point in the buffer memory. Two variations are provided. In one case the clocking order will change to $X_1X_3X_2$ when a blank cell is first seen at the output of the second subsidiary register 98 (i.e., at the input of the main register 94) in $\phi_4$ time, i.e., immediately after completion of an $X_1X_2X_3$ clocking sequence. The second variation is when the system includes an insert overflow feature to be described hereinafter. If 199 cells of the avilable 200 in the main buffer register 94 are filled with stored characters, a potential insert overflow situation arises. Accordingly, any further insertions are made with the buffer memory 52 clocking order reverting to the $X_1X_3X_2$ sequence, when a blank cell is detected at the output of the main storage register 94 immediately after completion of an $X_1X_2X_3$ clocking sequence. A second blank cell detector, similar to gate 92, is connected to the output lines of the main storage register 94.

Delete Mode: This mode can be utilized only when the machine has been set for Draft Mode Operation. Deletion of a character is accomplished by a 201 shift cycle, initially in the normal $X_1X_3X_2$ clocking sequence but switching to the $X_1X_2X_3$ sequence when a blank cell is first detected at the output of the second subsidiary register 98 in $\phi_4$ time. Deletion of a group of characters is achieved by repetitive cycles of 201 shifts. Skip Mode: This mode can be used only when the system has been set for Final Mode Operation. It involves single shifts with the $X_1X_3X_2$ clocking sequence. The behavior of the system is the same as when printing out from the buffer memory, except that the printer 20 is prevented from typing out the skipped character.

Clearing Buffer: This mode involves a 200 shift cycle and may be conducted according to either clocking sequence. Preferably, however, it is conducted with the $X_1X_3X_2$ clocking sequence.

Examining the Buffer Memory Contents for Any Purpose: This mode involves a 200 shift cycle and may be conducted in the $X_1X_3X_2$ clocking sequence.

The effect of the clocking sequence on the buffer memory will now be described. In the normal $X_1X_3X_2$ clocking sequence, the first subsidiary register 96 is clocked first ($\phi_1$ time) to store the data signals appearing at the output of the main register 94, i.e., it assumes the state of the last cell of the main register 94. Then the second subsidiary register 98 is clocked ($\phi_2$ time) so that it will assume the state of the first subsidiary register 96. When this occurs the second subsidiary register 98 will have steady state output signals indicative of its new state and these output signals appear at the inputs of OR gates 84–91. Next the main register 94 is clocked ($\phi_3$ time) so that its contents will undergo a single shift to the right (forward) and its first cell will assume the state of the signals appearing at the input terminals of OR gates 84–91. However, if a $C_3$ reset signal is applied to clear line 100 at the time that the second subsidiary register 98 is clocked (or afterward) and before the main register 94 is clocked, the first cell of the main register will assume a clear state when the main register is clocked by the $X_2$ clock pulse. If however OR gates 84–91 have inputs from the keyboard 23 or other sources, then when clocked by the $X_2$ clock pulse the first cell assumes a state determined by such inputs. This procedure of using an $X_1X_3X_2$ clocking sequence accompanied by a $C_3$ reset signal is called the "non-circulate mode" and is used when entering characters from the keyboard 23. The procedure of using the $X_1X_3X_2$ clocking sequence without a $C_3$ reset signal is called the "normal circulate mode" and is used when it is desired merely to circulate data from one end to the other of the main register 94.

In the $X_1X_2X_3$ sequence, the first subsidiary register 96 again assumes the state of the last cell in the main register 94 when the $X_1$ clock pulse occurs. Then the main register 94 is clocked to execute a single step shift. When this occurs the first cell of the main register 94 assumes the state of the second subsidiary register 98. Next the second subsidiary register 98 is clocked to store the signals appearing at the output of the first subsidiary register 96. As just described, this $X_1X_2X_3$clocking sequence permits circulation of data from one end to the other of the main storage register 94. If a $C_3$ reset signal is applied to the second subsidiary register 98 before the main store is clocked ($\phi_2$ time), the first cell of the main register 94 will not be able to assume the state of the second sub sidiary register 98 when it shifts, and thus will be blank or will assume a state determined by whatever other signals are present at the inputs of OR gates 84–91. However, when the second subsidiary register 98 is clocked at $\phi_3$ time, it will assume the state of the first subsidiary register 96. This procedure of using an $X_1X_2X_3$ clocking sequence is called the "enhanced circulation mode" since its net result is to increase the buffer memory capacity by one character. More explicitly, it permits circulation of a group of stored characters without loss while permitting a new character to be inserted into that group. Essentially this enhanced circulation mode delays transfer of a character from the output of the main register 94 back to the input of the main store so as to permit a character to be inserted from the keyboard 23 during an insert cycle. In other words, it serves to increase temporarily the effective size of the main register 94 by a single character. It also permits a character to be deleted during a delete cycle, as explained hereinafter.

FIG. 6 illustrates the four-phase clock generator and the associated logic circuit for changing the clocking order. FIG. 6 and other logic diagrams hereinafter will be described in terms of positive logic for clarity in exposition, but it is to be understood that negative logic can also be used. Essentially the four phase clock generator is a self-correcting twisted ring counter comprising four JK master-slave flip-flops 102, 104, 106 and 108 interconnected so that the Q and $\overline{Q}$ output terminals of flip-flop 102 are connected to the K and J terminals of flip-flop 104, while the Q and $\overline{Q}$ terminals of flip-flop 104 are connected to the J and K terminals of flip-flop 106 and the Q and $\overline{Q}$ terminals of the latter are connected to the J and K terminals of flip-flop 108. The Q terminal of flip-flop 102 and the $\overline{Q}$ terminals of flip-flops 104 and 106 are connected to the input terminal of AND gate 112 whose output terminal is coupled directly to the K terminal of flip-flop 102 and also to the input of inverter 114. The output of inverter 114 is applied to the J terminal of flip-flop 102. The generator also includes clock 116 whose output is applied e.g. at 455 KHz, on line 120 to one input terminal of AND gate 122. The latter is enabled by an enable generator signal that is applied to gate 122 on line 124. This enable generator signal also is applied on line 126 to the clear terminals of flip-flops 102 to 108 inclusive. The output terminal of AND gate 122 is connected to the clocking input terminal C of all four flip-flops 102 to 108 inclusive. As hereinafter described, the four flip-flops operate sequentially to produce corresponding output clock signals denoted $\phi_1$, $\phi_2$, $\phi_3$ and $\phi_4$. These latter signals are derived from the $\overline{Q}$ terminal of flip-flop 102 and the respective Q terminal of each of flip-flops 104, 106 and 108 and are applied to the input terminals of four AND gates 128, 130, 132 and 134. These latter gates have second input terminals that are each connected to the output terminal of AND gate 122. The Q terminal of flip-flop 108 is connected, as will be shown later, to control the duration of the enable generator signal so that the four phase clock generator can operate for 1, 199, 200 or 201 cycles of tetrads as required.

Typically, the clock signals from clock 116 and enable generator signals on line 124 are positive pulses. The leading edge of the enable generator signal is immediately preceded by the trailing edge of a clock pulse.

Assume for purposes of discussion that gate 122 is enabled with an enable generator signal so that the gate will pass clock pulses from clock 116. The enable generator signal appearing also on line 126 will enable the four flip-flops 102 to 108 to be clocked. As a consequence, the output of gate 112 will initially be low, so that the J and K terminals of flip-flop 102 will be high and low respectively. At the same time the J and K terminals of flip-flop 104 will be high and low respectively while the J and K terminals of each of flip-flops 106 and 108 will be low and high respectively. The first flip-flop clocking pulse produced by gate 122 will cause the Q and $\overline{Q}$ terminals of flip-flops 102 and 104 to go high and low respectively but will not cause any change in the signal level appearing at the $\overline{Q}$ terminals of flip-flops 106 and 108. The second or next flip-flop clocking pulse will cause the $\overline{Q}$ terminals of flip-flops 104 and 106 to go high and low respectively but will not cause any change in the signal level appearing at the Q and $\overline{Q}$ terminals of flip-flops 102 and 108 respectively. On the third flip-flop clocking pulse, the $\overline{Q}$ terminals of flip-flops 106 and 108 will become high and low respectively while no change in signal level will occur at the Q and $\overline{Q}$ terminals of flip-flops 102 and 104. The fourth flip-flop clocking pulse will cause the signals appearing at the Q and $\overline{Q}$ terminals of flip-flops 102 and 108 to go low and high respectively, while the signal levels at the $\overline{Q}$ terminal of flip-flops 104 and 106 remain unchanged. At this point the four flip-flops are in the same state as when held clear by the absence of the enable generator signal appearing on line 126. A fifth flip-flop clocking pulse will cause the signals appearing at the Q and $\overline{Q}$ of flip-flops 102 and 104 to change as on the first clocking pulse, while leaving the output at the $\overline{Q}$ terminals of flip-flops 106 and 108 unchanged. At the end of this fifth clocking pulse, the four flip-flops have the same states as after the first clock pulse. The next three flip-flop clocking pulses will cause the flip-flops to assume successively the same states produced by the second, third and fourth clocking pulses. This mode will continue to be repeated so long as clocking pulses are applied to the four flip-flops.

As previously noted, the clock signal from gate 122 is applied to gates 128 to 134 inclusive. The timing arrangement is such that (a) when the first clock signal arrives at gates 128 to 134, the $\overline{Q}$ terminal of flip-flop 102 is high and the Q terminals of flip-flops 104, 106 and 108 are low, with the result that only gate 128 produces an output pulse; (b) when the next clock signal arrives at gates 128 to 134, the $\overline{Q}$ terminal of flip-flop 102 and the Q terminals of flip-flops 106 and 108 are low and the Q terminal of flip-flop 102 is high so that only gate 130 produces an output pulse; (c) on the third clock signal, the Q terminal of flip-flop 106 is high and the $\overline{Q}$ terminal of flip-flop 102 and the Q terminals of flip-flops 104 and 108 are low, so that only gate 132 produces an output pulse; (d) on the fourth clock signal, the $\overline{Q}$ terminal of flip-flop 102 and the Q terminal of flip-flops 102 and 106 are low while the Q terminal of flip-flop 108 is high, so that only gate 134 produces an output signal; and (*e*) on the fifth clock signal the $\overline{Q}$ terminal of flip-flop 102 is high and the Q terminals of flip-flops 104, 106 and 108 are low so that only gate 128 produces an output signal. The next three clock pulses will cause gates 130, 132 and 134 to pass pulses sequentially as occurred on the second, third and fourth clock pulses. Essentially flip-flops 102 to 108 inclusive act as a commutator so that pulses are passed sequentially by gates 128 to 134 inclusive repetitively as long as these gates are enabled and clock 116 operates. The sequential outputs from gates 128, 130 132 and 134 identified as $\phi_1$, $\phi_2$, $\phi_3$ and $\phi_4$ respectively obviously will occur at the same repetition rate as the clock pulses. Resetting of the flip-flops by the absence of an enable generator signal on line 126 assures that the flip-flops will always be in the correct state when the clock generator is required to produce one or more tetrads of $\phi_1 - \phi_4$ clocking pulses.

The enable generator signal is provided by another portion of the circuit shown in FIG. 6. This latter portion of the circuit comprises four JK flip-flops 136, 138, 140 and 142 whose reset terminals are all connected to input terminal 143 at which a negative reset signal is applied when the machine is turned on. Each J terminal of flip-flops 136 to 142 is connected to a respective corresponding input terminal 144, 145, 146 and 147 at which are applied different signals identified as "1 shift," "199 Shift," "200 Shift," and "201 Shift" respectively. The C or clocking terminals of all four flip-flops are connected by common line 148 to the output of clock 116. The Q terminals of all of flip-flops 136, 138, 140 and 142 are connected to separate input terminals of OR gate 150 whose output is connected by line 124 to input AND gate 122 of the 4-phase clock generator. The K terminal of flip-flop 136 is connected by line 152 from the Q terminal of of the fourth flip-flop 108 of the 4-phase clock generator, and is also connected to one input terminal of AND gate 154. The latter has a second input terminal to which is applied, by line 156, a Terminate Shift signal or pulse derived from counter 190 of the circuit hereinafter described for counting the number of times the buffer shifts or is clocked. The output of AND gate 154 is applied to the K terminals of flip-flops 138, 140 and 142. Operation of the above described circuit for controlling the clock generator control signal will now be described. The "1 Shift," "199 Shift," "200 Shift," and "201 Shift" signals are positive pulses which are respectively and selectively applied to the corresponding J input of flip-flops 136, 138, 140 and 142 coincidentally with a clock pulse on line 148. The four flip-flops 136 to 142 are cleared by the reset signal at terminal 143 and are clocked by the pulses on line 148. In the cleared condition the Q terminals of the four flip-flops are all low. Assuming that one of the flip-flops has a shift signal applied to its J terminal, when a clock pulse is applied on common line 148 the flip-flop will change states so that its Q terminal goes high. Because of other logic in the system only one shift signal can be present at any one time. Thus only one flip-flop can change state when a clock pulse occurs. For example, if the "1 Shift" signal is present, the Q terminal of flip-flop 136 will go high and the corresponding Q terminals of the other three flip-flops will remain low. Assuming for purposes of discussion that the "199 Shift" signal is applied at terminal 145, OR gate 150 will have one high and three low inputs; accordingly its output will be a generator enable signal which will cause the clock generator to produce tetrads of $\phi_1 - \phi_4$ timing pulses as above described. The generator enable signal will continue until coincidence of the terminate shift signal on line 156 and of the input signal on line 152 applied through gate 154 cause the K terminal of flip-flop 138 to go high whereupon the Q terminal of that flip-flop will go low on the next clock pulse on line 148. With all four inputs to gate 150 then low, the latter will now produce a low output, thus terminating the enable generator pulse on line 126.

Similarly, it will be seen that the application of any of the shift signals to its corresponding flip-flop will initiate a generator enable signal at the output of gate 150, and that the 4-phase generator will continue to run until the generator enable signal terminates due to coincidence of signals on lines 152 and 156.

FIG. 6 also includes the logic for changing the clocking order of the buffer memory, which logic comprises JK flip-flop 158 whose J terminal is connected to the output of OR gate 159 from which is provided a Change Order signal hereinafter described. The C or clocking terminal of flip-flop 158 is connected to the output terminal of gate 134. The reset terminal of flip-flop 158 is connected to a line 160 on which may be applied a reset signal from the Q output terminal of flip-flop 142. The Q terminal of flip-flop 158 is connected to one input terminal of an exclusive OR gate 162. Gate 162 has a second input terminal which is connected to the output of OR gate 163 which provides an Insert signal derived as hereinafter described. The output terminal of gate 162 is connected through inverter 164 to input terminals of two AND gates 165 and 166. The output terminal of gate 162 is also connected to input terminals of two more AND gates 167 and 168. A second input terminals of each of gates 165 and 168 are connected to the output terminal of gate 130, while the second input terminals of each of gates 166 and 167 are connected to the output terminal of gate 132. The output terminals of gates 134 and 128 are simply connected respectively to output line 169 and terminal 170. The output terminals of gates 165 and 167 are connected to respective input terminals of OR gate 172 and the output terminals of gates 166 and 168 are connected to different input terminals of OR gate 174. The output terminals of gates 172 and 174 are connected to output lines 176 and 178 respectively.

Gate 163 has a pair of input terminals respectively connected to terminal 182 and 187 to which are applied respectively an Overflow Insert Cycle signal and a Normal Insert Cycle signal.

Gate 159 has a pair of inputs respectively connected to the outputs of AND gates 180 and 181. AND gate 180 has a pair of inputs connected to terminals 182 and 183. Terminal 183 is intended to have applied thereto a Blank Cell Detected at Main Buffer Output signal. The latter signal typically is derived from gating which is preferably connected to the output of main register 94 of FIG. 5. AND gate 181 has a pair of input terminals one of which is connected to input terminal 184 at which may appear a Blank Cell at Buffer Input signal from gate 92 shown in FIG. 5. The other input terminal of AND gate 181 is connected to the output of OR gate 185 which also has two input terminals 186 and 187. Terminal 186 has applied thereto respectively a Delete Cycle Signal.

Operation of the logic circuit for changing the clocking order of the buffer memory will now be described. The Change Order signal applied to the J terminal of flip-flop 158 will occur by operation of gates 159, 180, 181 and 185 whenever (1) a blank cell is detected at the output of the second subsidiary storage register 98 of the buffer memory and the machine is ordered to insert a character into the buffer memory without an overflow, or to delete a character, or (2) a blank cell is detected at the output of the main storage register 94 and the machine is ordered to insert with overflow a character into the buffer. The Insert signal applied to one of the inputs of exclusive OR gate 162 will occur, by operation of OR gate 163 whenever the machine is ordered to insert a character into the buffer memory, with or without overflow. According to the logical operation of gate 162, the latter will provide a high output when either input signal is high but not when both input signals are simultaneously high or simultaneously low.

Flip-flop 158 is closed by the $\phi_4$ output signal from gate 134. If a Change Order Signal is present on the J terminal of flip-flop 158 when the $\phi_4$ signal occurs, the Q terminal of that flip-flop will go high. If a high Insert signal from gate 163 is applied to gate 162, the latter will provide an output signal only when the Q terminal of flip-flop 158 is low. As noted, a Change Order signal can occur only during an Insert Cycle or a Delete cycle is accordance with the buffer memory Insert and Delete Clocking modes previously described.

If the output of gate 162 is high, it enables AND gates 167 and 168; if it is low, it enables AND gates 165 and 166. Accordingly, if for example it is $\phi_2$ time and the output of gate 162 is high, gate 168 will pass the $\phi_2$ signal to OR gate 174. Since at that time both inputs of AND gate 166 are low, the other input to OR gate 174 will be low, the $\phi_2$ signal will appear on line 178. At the same time the output of gates 167 and 165 will also be low because $\phi_2$ is a low input to gate 167 and the output of inverter 164 is a low input to gate 165. Accordingly, the output of OR gate 172 will also be low. If now the output of gate 162 goes low, the $\phi_2$ signal will appear instead at the output of OR gate 172 and the other OR gate 174 will have a logical zero at its output. It is to be noted that lines 170, 178, 176, 169 are connected to terminals identified as $X_1$, $X_2$, $X_3$, and $\phi_4$. The signals appearing at terminals $X_1$, $X_2$, and $X_3$ are the clocking signals for the buffer memory. Hence the buffer will be clocked in the $X_1X_3X_2$ mode if the output of gate 162 is low and in the $X_1X_2X_3$ mode if the output of gate 162 is high. That is, the $\phi_2$ and $\phi_3$ signals appear at the $X_3$ and $X_2$ terminals only when both the Insert signals and Change Order signal are either present together or absent toget her, and the $\phi_2$ and $\phi_3$ signals appear respectively at the $X_2$ and $X_3$ terminals only when one of the Insert and Change Order signals is present and the other absent. In essence, the gating scheme of gates 162, 165, 166, 167, 168, 172 and 174 together with inverter 164 is the equivalent of a double-pole, double-throw switch automatically actuated by a set of circumstances.

The circuit of FIG. 6 includes means for counting the number of times the buffer is clocked, and to this end the circuit of FIG. 6 includes a counter 190 for generating an output signal after counting 200 pulses, and input logic for adding or deleting a pulse as will be hereinafter explained. The logic here includes OR gate 192 having a pair of input terminals connected to the Q terminals of flip-flops 138 and 140. The output of gate 192 is connected to an input of OR gate 194 and also to an input of OR gate 195. The Q terminal of flip-flop 142 is connected to the other input of OR gate 194. A three-input AND gate 196 has two of its inputs connected respectively to the output of gate 128 and the Q terminal of flip-flop 138. Another J-K flip-flop 198 is provided, having its J and Q terminals tied together and connected to the third input of AND gate 196. Flipflop 198 has its clock terminal connected to the output of gate 132 so as to be clocked by the $\phi_3$ pulses from the latter. The clear terminal of flip-flop 198 is connected to the output of gate 194.

The Q terminal of flip-flop 198 and the Q terminal of flip-flop 142 are connected as inputs to AND gate 199. The output of gate 199 is connected as an input to gate 195. The output of gate 195 and the output of gate 130 are connected as inputs to AND gate 200. The outputs of AND gate 200 and of AND gate 196 are connected as inputs to OR gate 202 and the output of the latter is connected as the count input to counter 190. Counter 190 is preferably any of a large number of digital counters well known in the art having a clear terminal at which application of a low signal will reset or clear the counter to its initial state, and, in a preferred embodiment will provide an output signal when it has counted two hundred input pulses. The clear terminal of counter 190 is connected also to the output of gate 194. The output terminal of counter 190 is connected as the terminate shift line input to gate 154 and to terminate shift terminal 193.

In operation, it will be seen that when the signal from gate 194 goes high, it serves to enable both flip-flop 198 and counter 190 so that both can be clocked. This will occur when according to gates 192 and 194 any of the 199 shift, 200 shift or 201 shift signals are applied to the J terminals of flip-flops 138, 140 and 142 respectively. Counter 190 will count $\phi_2$ pulses passed by gates 200 and 202 when gate 200 is enabled. Gate 200 is enabled immediately if the Q terminal of either of flip-flops 138 and 140 goes high. However, gate 196 when enabled provides an alternative pulse source, being connected to gate 128 which provides $\phi_1$ pulses. This enablement only occurs when flip-flop 198 is off, i.e., its $\overline{Q}$ terminal is high and when the 199 shift signal has turned flip-flop 138 on, i.e., its Q terminal is high. But, if the $\overline{Q}$ terminal of flip-flop 198 is high because it is connected to the J terminal, when a $\phi_3$ clock pulse clocks flip-flop 198, the latter turns on and its $\overline{Q}$ terminal goes low. This operation thus provides a single pulse to counter 190 prior to any counting of $\phi_2$ pulses by the latter. Because gate 200 is enabled by the output of flip-flop 138 counter 190 will then count $\phi_2$ pulses. When the counter has counted a single $\phi_1$ pulse and 199 $\phi_2$ pulses, it yields a terminate shift signal on line 156. Effectively then it has counted only 199 shifts in the buffer.

When the Q terminal of flip-flop 142 goes high due to the 201 shift signal, flip-flop 158, flip-flop 198 and counter 190 are enabled and the first $\phi_2$ pulse is not counted by counter 190 because gate 200 is disabled by the absence of a high signal at the output of gate 195. However the first $\phi_3$ pulse clock flip-flop 198 so that its Q terminal goes high, gate 199 is enabled and gate 195 passes the signal from gate 195 to enable gate 200. Counter 190 then counts the next 200 $\phi_2$ pulses and yields the output signal on line 156. Effectively however, because it was forced to skip counting an initial $\phi_2$ pulse, the counter 190 has counted through 201 shifts of the buffer.

Obviously when flip-flop 140 is triggered, counter 190 will simply count up to the full 200 shifts and then will provide a Terminate Shift signal on line 156 to gate 154.

Lastly, the remainder of FIG. 6 includes logic for generating the $C_3$ signal which is to be applied to line 100 (FIG. 5) and also for generating the Enable Keyboard to Storage signal which is to be applied to line 82 (FIG. 4). To this end, the circuit of FIG. 6 includes NOR gate 204 having one input connected to the output from OR gate 163, and another input connected to terminal 186. The output of NOR gate 204 is connected as one input to OR gate 204. Another input to OR gate 205 is connected to the output of gate 128.

Yet another OR gate 206 is provided, having one input connected to the Q output terminal of flip-flop 142 and another input connected to terminal 207. The output of OR gate 206 is connected to the one input of AND gate 208. A second input to AND gate 208 is connected to the $\overline{Q}$ terminal of flip-flop 198. The output of AND gate 208 is shown connected to line 82, inasmuch as the signal from gate 208 is the desired Enable Keyboard to Storage signal. The output of gate 205 and line 82 are also connected as respective inputs to AND gate 209. The output of the latter is shown as line 100 along which the requisite $C_3$ signal can be provided.

Gates 209 and 205 define the length of the $C_3$ pulse. As indicated, a relatively long $C_3$ pulse is used when overwriting a character in the buffer and a relatively short $C_3$ pulse is employed when inserting or deleting a character. If the output of gate 204 is low, the only high input signal to gate 205 will be the $\phi_1$ pulse from gate 128 so the output signal from gate 205 will be quite short. The output of gate 204 will be low if there is an insert or delete signal present at any of terminals 182, 186 or 187. The output from gate 205 will then enable gate 205 only for the duration of the $\phi_1$ pulse.

On the other hand, if the system is not in a Delete or Insert mode, the output from gate 205 will stay high and the duration of any high output from gate 209 will depend on the output from gate 208. Gate 202 will provide a high output when the buffer is undergoing a 201 shift (i.e., the Q output from flipflop 142 is high) or a Dead Time One Shift signal, derived as hereinafter noted, is present at terminal 207. Gate 603 will be enabled by the "off" condition of flip-flop 198 wherein the $\bar{Q}$ output of the latter is high. It will be remembered that the $\bar{Q}$ output goes low after the $\phi_3$ pulse from gate 132 clocks flip-flop 198, so that gate 208 is enabled for the time from the beginning of a $\phi_1$ pulse (or when flip-flop 198 is enabled) to the end of the following $\phi_3$ pulse. This "long" output pulse from gate 208 is applied on line 82 to provide the Enable Keyboard to Storage Signal described in conjunction with FIG. 4, and is also applied to gate 209.

When the output pulse from gate 205 is the "short" pulse, the output from gate 209 will be similarly "short." When there are no insert or delete commands to gate 204, the output from gate 205 will be "long," hence the $C_3$ output pulse from gate 209 will then also be "long."

The use of long and short $C_3$ pulses in cycling the buffer can be readily seen with reference to the timing diagrams of FIGS. 6A, 6B, 6C and 6D. As shown on a common time axis in these Figures there are several idealized pulse trains identified as CLOCK, $X_1$, $X_2$, $X_3$, and $C_3$. The CLOCK, $X_1$, $X_2$, and $X_3$ trains respectively represent the output from clock 116 (FIG. 6), and the inputs to lines 97, 95 and 99 respectively (FIG. 5), the $C_3$ train represents the output of gate 209 in FIG. 6.

In interpreting the timing diagrams, one can for the sake of simplicity, assume a six-character main register and two single-character subsidiary registers. Hence, shown below the pulse trains on the same time scale are the states of the input and output cells of the main register and of the two subsidiary buffers, with appropriate legends. When it is desired to type data into the buffer in the Draft made, as noted a 201 shift cycle is used. The clocking is in the normal $X_1X_3X_2$ sequence with the second subsidiary storage being held clear during the first of the 201 shifts. As noted also, the 201 shift condition, in the absence of any insert or delete command, results in a long $C_3$ pulse.

Figure 6A:
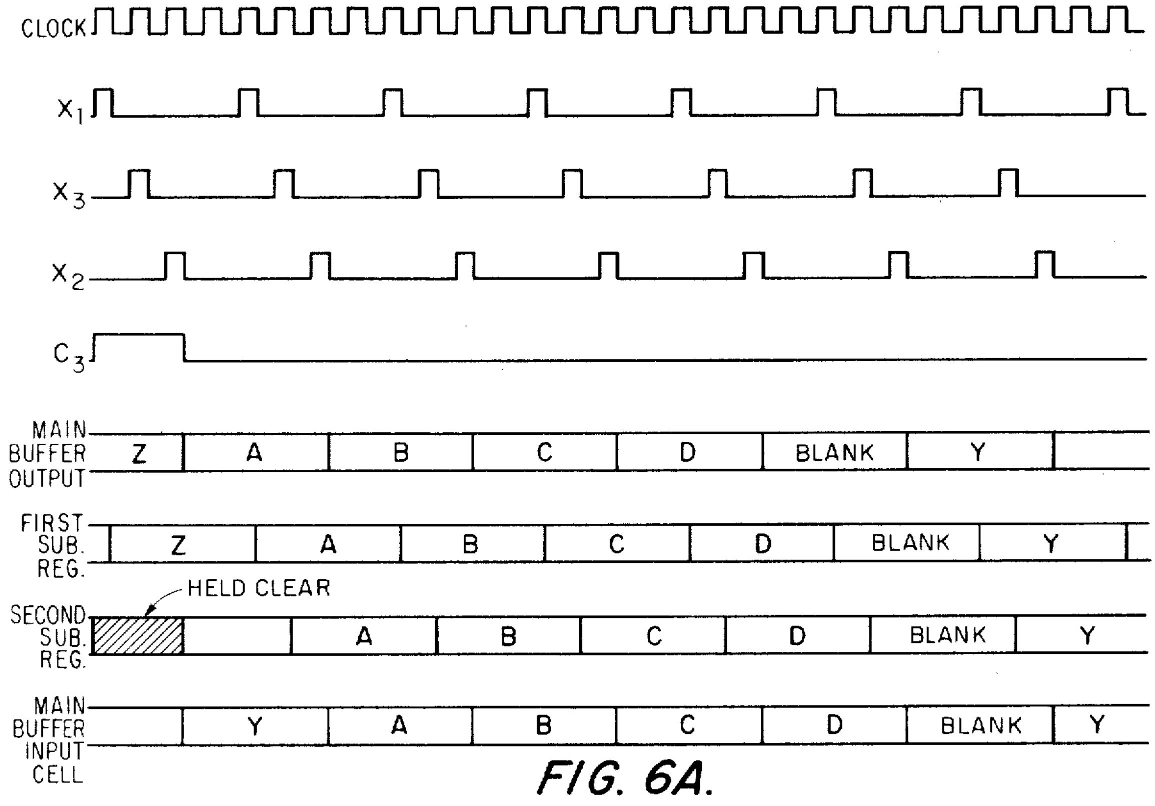

To overwrite when typing in, as shown in FIG. 6A, there are initially data, denoted A, at the main buffer output. On the trailing edge of first $\phi_1$ pulse on the $X_1$ line, the data Z are transferred to the first subsidiary buffer as shown. However, on the trailing edge of the $\phi_2$ pulse which is applied to clock the second subsidiary buffer, data Z are not transferred from the first subsidiary buffer to the second subsidiary buffer because the $C_3$ pulse holds the second subsidiary buffer clear for the entire duration of a single cycle of successive $\phi_1$, $\phi_2$ and $\phi_3$ pulses. Thus, at the end of the first $\phi_3$ pulse, the main register shifts and the buffer input accepts, for example, new data Y from the keyboard instead of data from the second subsidiary buffer. At that time too, the remainder of the data in the main buffer are shifted toward the buffer output by one cell, bringing for example the data A to the buffer output. On the next successive cycle, the $\phi_1$ pulse shifts the data A then from the buffer output to the first subsidiary register and the $\phi_2$ pulse shifts the data A from the first to the second subsidiary register. When, on the following $\phi_3$ pulse, the main register is clocked, the data A are shifted from the second subsidiary register to the buffer input because the $C_3$ pulse now no longer holds the second subsidiary storage clear. By this technique, the data Y has been used to overwrite or replace data Z.

Figure 6B:
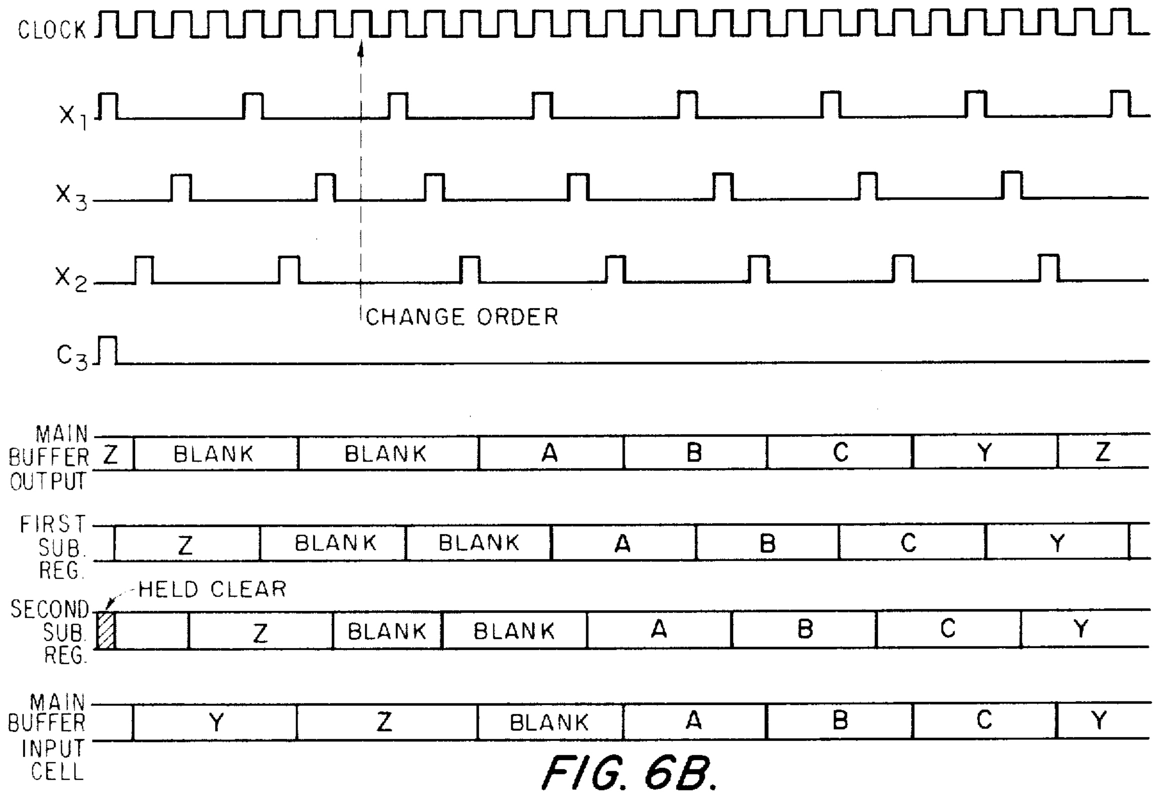

A similar type of diagram of FIG. 6B shows the use of a series of shift cycles to insert characters into the main buffer. Here, as noted, the $C_3$ pulse has the same duration and phase as the $\phi_1$ pulse. To effect insertion, the clocking order is initially $X_1X_2X_3$ at the end of the second shift cycle. One can assume initially data denoted Z at the main buffer output and blank cells in both subsidiary storages. On the trailing edge of first $\phi_1$ pulse of the first cycle, those data Z are shifted to the first subsidiary buffer. Simultaneously, the short $C_3$ pulse, in phase with the first $\phi_1$, makes certain that the second subidiary buffer is clear so that it contains a blank cell. On the ensuing $\phi_2$ pulse which is applied according to the special clocking sequence to clock the main register, the latter shifts and the data Y, presented for insertion by the keyboard, are shifted into the first cell of the main buffer. When the $\phi_3$ pulse occurs, it now shifts the data Z from the first to the second subsidiary buffer. For convenience here, it can be assumed that at this point the first of a number of successive blank cells has been shifted on the $\phi_2$ pulse to the main buffer output.

On the next cycle, the $\phi_1$ pulse causes the blank cell at the buffer output to be shifted into the first subsidiary storage. The $\phi_2$ pulse causes the main register to shift, bringing the output data Z from the second subsidiary buffer to the main reigster input cell. On the $\phi_3$ pulse, the blank cell in the first subsidiary buffer is shifted to the second subsidiary buffer. At this point, a blank cell being detected at $\phi_4$ time (not shown as a separate train) at the output of the second subsidiary storage, the clocking order reverts to the normal $X_1X_3X_2$ sequence. Hence the next $\phi_1$ pulse clocks the first subsidiary storage and transfer thereto the blank cell from the main buffer output. The next $\phi_2$ pulse clocks the second subsidiary buffer, transferring thereto the blank cell from the first subsidiary storage. The $\phi_3$ pulse then clocks the main register transferring the blank cell from the second store to the input cell of the main register. It can readily be seen that the operation allows the memory to accept data and insert it into a sequence of data without causing the loss of stored data, and without otherwise changing the order of the stored data. Simply, the insertion shifts all of the ensuing information until the last of the stored data are shifted into a blank cell.

Figure 6C:
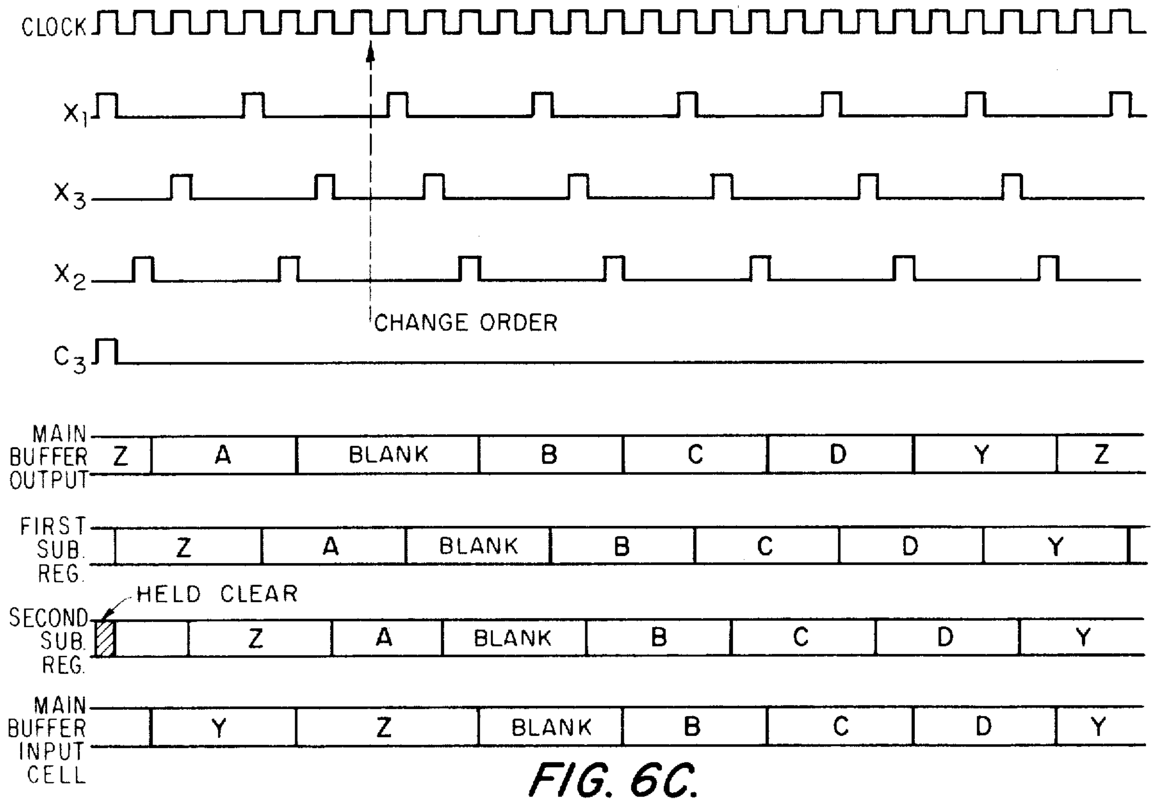
Figure 6D:
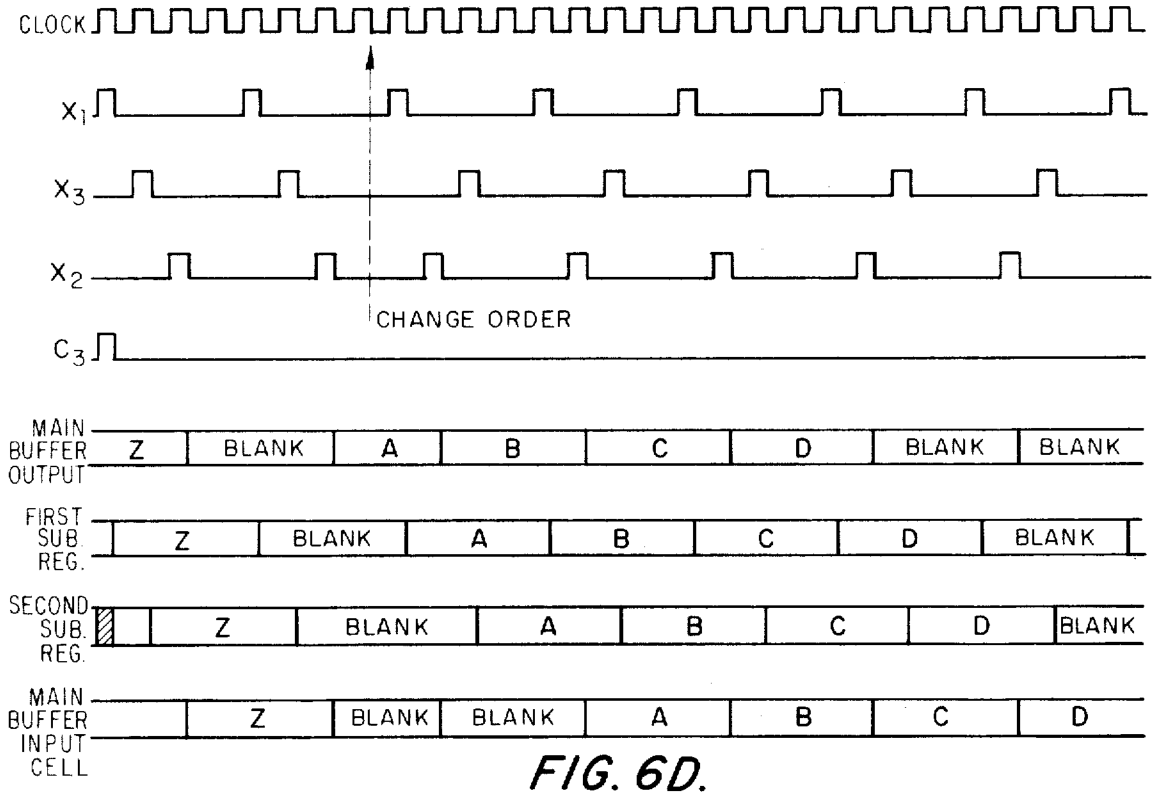

Examination of FIG. 6C will show the sequence of events for insertion of a character with overflow. Here, the operation is quite similar to that described in conjunction with FIG. 6B except that there are no blank cells left into which the last of the stored data can be shifted. In such case only one, unavailable blank cell remains in the combined storage of the registers. As previously noted, the change in clocking sequence occurs herewith detection of the blank cell at $\phi_4$ time at the output of the main register. The operation will result in insertion of a character with attendant dropping of the last character (identified as data A in FIG. 6C) in the sequence in the full register.

To delete, one employs the normal clocking sequence $X_1X_3X_2$ and changes to the special sequence on detection at $\phi_4$ time of a blank cell at the output of the second subsidiary buffer as previously noted. This is shown graphically in FIG. 6D. Here the shift sequence results in the data (Z) in the last cell in the main buffer, being dropped or deleted from the sequence. As shown, a blank cell is inserted and at the end of a complete shift cycle it will be seen that the blank cell has taken the place of data Z.

A Carrier Return signal provided from the baseplate 24 will ordinarily cause the buffer memory to empty into magnetic storage through repetitive one-shift cycles as heretofore noted. The emptying process for a completely full 200 character buffer memory requires about the amount of time needed for the print head 16 on the printer 20 to return from a typical right margin position to a typical left margin position. However, if the data stored in the buffer is only a portion of a line, the print head 16 would be expected to return to its left margin position well before the entire buffer memory could be emptied of meaningful and blank or empty characters. Hence, the invention includes means for making the buffer memory available for input thereto of new data immediately after the meaningful data has been transferred out.

Thus, as shown in FIG. 7 the invention includes means for transferring the contents of the buffer memory into magnetic storage and for releasing the buffer memory for further entry there immediately following transfer of the meaningful contents into magnetic storage. The foregoing means preferably comprises multiplexer 210 (shown earlier at block 54 in FIG. 3) having a plurality of parallel inputs respectively connected to the eight output lines of shift register 94 (FIG. 5). Multiplexer 210 is an eight-input channel digital multiplexer well known in the art for coverting eight parallel input bits to a serial chain on a single output channel. Lastly, the remainder of FIG. 6 includes logic for generating the $C_3$ signal which is to be applied to line 100 (FIG. 5) and also for generating the Enable Keyboard to Storage signal which is to be applied to line 82 (FIG. 4). To this end, the circuit of FIG. 6 includes NOR gate 204 having one input connected to the output from OR gate 163, and another input connected to terminal 186. The output of NOR gate 204 is connected as one input to OR gate 205. Another input to OR gate 205 is connected to the output of gate 128.

Yet another OR gate 206 is provided, having one input connected to the Q output terminal of flip-flop 142 and another input connected to terminal 207. The output of OR gate 206 is connected to the one input of AND gate 208. A second input to AND gate 208 is connected to the $\overline{Q}$ terminal of flip-flop 198. The output of AND gate 208 is shown connected to line 82, inasmuch as the signal from gate 208 is the desired Enable Keyboard to Storage signal. The output of gate 205 and line 82 are also connected as respective inputs to AND gate 209. The output of the latter is shown as line 100 along which the requisite $C_3$ signal can be provided.

Gates 209 and 205 define the length of the $C_3$ pulse. As indicated, a relatively long $C_3$ pulse is used when overwriting a character in the buffer and a relatively short $C_3$ pulse is employed when inserting or deleting a character. If the output of gate 204 is low, the only high input signal to gate 205 will be the $\phi_1$ pulse from gate 128 so the output signal from gate 205 will be quite short. The output of gate 204 will be low if there is an insert or delete signal present at any of terminals 182, 186 or 187. The output from gate 205 will then enable gate 209 only for the duration of the $\phi_1$ pulse.

On the other hand, if the system is not in a Delete or Insert mode, the output from gate 205 will stay high and the duration of any high output from gate 209 will depend on the output from gate 208. Gate 206 will provide a high output where the buffer register is undergoing a 201 shift (i.e., the Q output from flip-flop 142 is high) or where an appropriate signal is present at terminal 207. Gate 208 will be enabled by the "off" condition of flip-flop 198 wherein the $\overline{Q}$ output of the latter is high. It will be remembered that the $\overline{Q}$ output goes low after the $\phi_3$ pulse from gate 132 clocks flip-flop 198, so that gate 208 is enabled for the time from the beginning of a $\phi_1$ pulse (or when flip-flop 198 is enabled) to the end of the following $\phi_3$ pulse. This "long" output pulse from gate 208 is applied on line 82 to provide the Enable Keyboard to Storage Signal described in conjunction with FIG. 4, and is also applied to gate 209.

When the output pulse from gate 205 is the "short" pulse, the output from gate 209 will be similarly "short." When there are no insert or delete commands to gate 204, the output from gate 205 will be "long," hence the $C_3$ output pulse from gate 209 will then also be "long."

A decade counter 212 is provided for counting pulses in modulo ten and having an input terminal connected to a source of timing pulses (such as divider 264 which in turn has an input from line 211 to clock 116 (FIG. 6)). Counter 212 is of the type having an inverting disable terminal 213 so that an appropriate signal at terminal 213 will hold the counter to an initial state, usually zero or nine. Counter 212 typically is an arrangement of interconnected bistable stages such as flip-flops having output lines 214, 215, 216 and 217, as from the Q terminals of the flip-flops, for providing signals corresponding to counts of 1, 2, 4 and 8. Only the first three output lines 214, 215 and 216 from counter 212 need be connected to multiplexer 210 in known manner for controlling the sequencing of the signals on the input lines from register 94 into a serial signal at the multiplexer output. In order, for reasons adduced hereinafter, to determine each time a count of 8 is reached by counter 212, a "state 8" detector is provided and comprises AND gate 218 having one input connected to the count of 8 line 217 and another input connected through inverter 219 to the count of 1 line 214.

Means, such as AND gate 220, is provided for determining if a blank cell is present at the output of the buffer memory or register 94. Gate 220 as shown, has eight inverting inputs respectively connected to the eight output lines from register 94.

It is preferred to phase encode the output of the multiplexer and to this end there is provided a control flip-flop 222 which is preferably a J–K type device having its clock input connected by line 223 to the output of gate 134 (FIG. 6), its J input connected to the output of blank cell detector or AND gate 220, and its K input grounded. The $\overline{Q}$ output of flip-flop 222 is connected as one input to AND gate 224. The other input of AND gate 224 is connected to the output of multiplexer 210. The outputs of AND gate 224 and clock line 221 from divider 264 are connected as inputs to exclusive OR gate 226.

The output of exclusive OR gate 226 is connected as one input to AND gate 228. Another input to AND gate 228 is connected through inverter 229 to line 217 from counter 212. Counter output lines 214, 217 and clock line 221 are connected as inputs to AND gate 232. The outputs of the latter and from gate 228 are connected as respective inputs to OR gate 234. The output from the latter is connected through amplifier 236 to magnetic read/write head 238.

The system shown in FIG. 7 as thus described, functions as follows: A Carrier Return signal starts a series of one shifts in the buffer memory, until the bits representing the first character of a line are shifted to the eight output lines of the multiplexer which converts the eight parallel bits to eight serial bits in sequence and with a timing determined by the output from decade counter 212. The latter starts counting clock pulses on line 221 from a count of nine as soon as an enable write signal at terminal 213 enables the counter.

From the zero to seventh count by decade counter 212, the eight input lines are sequenced to provide a serial input to gate 224. Because in the absence of a high signal at the J input to flip-flop 222, the $\overline{Q}$ terminal of the latter is high, gate 224 is enabled to pass the serial bits of each character thus multiplexed. Exclusive OR gate 226, clocked by the signals on line 221 converts the output of multiplexer 210 into Ferranti coded signals wherein the value of a bit is indicated by its transition direction as explained hereinafter. When counter 212 provides the eighth and ninth counts by high signals on line 217 and line 214, no corresponding bits are provided at that time by the encoding logic. Instead, on the eighth count, the high signal on line 217, being inverted by inverter 229, disables gate 228. On the ninth count, the high signals on lines 214 and 217 together with the clock pulse on line 211 enable gate 232 which provides a regular pulse or bit to gate 234. Thus the eighth and ninth counts by decade counter 212 yield respectively no signal at all and one regular clock pulse at the input to amplifier 236. The eighth count space or lack of signal (hereinafter referred to as an intercharacter gap or ICG) is intended to provide spacing between serially recorded sets of character bits, whilst the ninth count pulse is intended to indicate the beginning of a character and is hereinafter referred to as the start bit. The output of amplifier 236 is applied to read/write head 238 so that as a magnetic storage medium such as a tape 18 in cassette 240 is transported past head 238 as by tape-transport motor 242, the serial phase-encoded characters, the ICG and the start bit are all recorded on the tape 18. The output from gate 218 is applied as hereinafter described to cause the buffer memory to execute another one shift. The foregoing will continue until a blank cell (which as noted in Table III is characterized as a sequence of eight zero bits) appears at the output of register 94. The blank cell will be detected by AND gate 220 which causes the J terminal of flip-flop 222 to go high and the $\overline{Q}$ terminal to go low. Thus, as soon as the meaningful data in register 94 has been transferred, the output of flip-flop 222 disables gate 224, effectively freeing the register, i.e. making it available for further entry of data from encoder gates 76.

The output of gate 218 is also preferably connected as through another input to OR gate 202, to counter 190 (FIG. 6) so that each character written on tape is counted by counter 190. At the two-hundredth count of 8, as recorded by counter 190, the latter will provide a signal on line 156 which resets the Enable Write line 244.

As noted below, the same signal, directed along control line 244, serves to stop motor 242. Line 244 is also connected to terminal 213 of counter 212 and to the clear terminal of flip-flop 222 to stop or disable counter 212 and to clear flip-flop 222 so that gate 224 is no longer disabled.

In the event, however that for example register 94 only had ten characters recorded therein, upon depression of the Carrier Return key by the operator, the print head 16 would quickly return to its left hand margin position. By the time the print head 16 so returned, gate 220 would have detected the blank cell on the eleventh shift and inasmuch as register 94 would then have been cleared, gate 224 would have been disabled. However, counter 190 would only have counted eleven pulses, hence decade counter would continue to operate and clock pulses along line 221 would be phase encoded by gate 226 as simply all zero bits. Of course, every eighth and ninth count would be recorded as proper ICG and start bits by operation of gates 232, 228 and 234. In this manner, null characters or sequences of eight zero bits will continue to be generated and recorded, until counter 190 reaches the count of two hundred, whereupon counter 212 and motor 242 will become disabled and the zero character generation and recording ceases.

The recording or data storage system 58 exemplified by motor 242, read/write head 238 and cassette 240, is preferably a dual capstan, bidirectional machine with a read and write tape speed typically of 10 inches per second. Such recording system, well known in the art, is capable of driving a tape 18 in a cassette 240 at its writing and reading speed and also at some higher rate of speed for search purposes. Read/write head 238 is preferably a known two-track digital type as heretofore noted.

The data are recorded on tape 18 in blocks 19 of 200 characters each block corresponding then to a complete buffer load, each character, as noted before, having eight bits corresponding to the bits of a character stored in the main register 94, an additional start bit and an ICG. These bits are Ferranti or phase-encoded which is a known system of encoding wherein the first half of each bit is recorded as the true sense of the bit (i.e., either a high or low level) and the second half is recorded as the bit complement. Thus, as noted, the direction of the transition from first to second half identifies the bit.

An example of a character which might appear at the output of register 94 is shown in FIG. 8A wherein the sequence of signals as shown is S, $R_1$, $R_2$, $R_2$A, $R_5$, $T_1$, $T_2$ and P. The foregoing signals then form a character with the sequence of bits 11010010. It is recognized that this character has even parity but is merely used in this description for the sake of simplicity. A sequence of clock pulses, shown in FIG. 8B, synchronize the operation of multiplexer 210 and gate 226 to produce the phase encoded signals shown in FIG. 8C. It should be noted in FIG. 8C that in accordance with the logical exclusive OR function of gate 226, the signal is high if and only if either the signal in FIG. 8A is high or the signal in FIG. 8B is high but not when both the signals in FIG. 8A and FIG. 8B are high. It will also be recognized as noted that the first transition of the signal in FIG. 8C constitutes a "start" bit or transition and, corresponding to the last "bit" of the signal is a low level or ICG. As shown in FIG. 3 and FIG. 7 the system also includes read data circuits 60 for reading the phase-encoded data from tape 18 and for converting or demultiplexing in demultiplexer 62 the decoded data back into eight parallel bit characters suitable for insertion into the buffer memory for ultimate writing out by the printer 20 or for editing or revision. The remainder of the circuit of FIG. 7 thus includes read amplifier 246 connected to the output from read/write head 238. The output of amplifier 246 is connected to means such as rectifier/shaper 248 for half-wave rectifying the signal from amplifier 246 to provide an output train of, for example, positive rectangular pulses representing only the positive signal in the output of amplifier 246. Similarly the output of amplifier 246 is connected through inverting amplifier 249 to means, such as rectifier/shaper 250 for half-wave rectifying the signal from amplifier 246 to provide another output train, of, for example, positive rectangular pulses which however represent only the negative signals in the output of amplifier 246. The output of rectifier/shaper 248 is connected as one input to AND gate 252, as one input also to OR gate 254 and is connected to the set (S) terminal of RS type flip-flop called Control flip-flop 256. Similarly the output of rectifier/shaper 250 is connected as one input to AND gate 258 and also as another input to OR gate 254. The outputs of gates 252 and 258 respectively are connected to the set (S) and reset (R) inputs of another RS type flip-flop called data flip-flop 260. The $\overline{Q}$ output terminal of data flip-flop 260 is connected to the data input terminal of demultiplexer 62 which is shown preferably as an eight-bit shift register demultiplexer 262.

Means are provided for clocking the decoding of the signals from head 238, and to this end clock line 211 is connected to digital scaler or divider 264 which has an output pulse train which is a sub-multiple of the input clock frequency. An output of digital divider 264 (at a frequency four times greater than is provided to counter 212) is connected to counter 265, which is typically a simple binary counter formed of three cascaded flip-flop stages. The three outputs from counter 265, typically the Q terminals of the respective flip-flop stages, are connected as inputs to a binary-to-octal converter 266. The latter is a known system of gates which simply converts the binary output of counter 265 (which runs from zero to 7) to individual signals appearing in eight output lines each representing respectively the zero to seventh count or state of counter 265. Thus, for example, the first output line from converter 266 will be high if and only if the counter has counted a first input pulse and has not counted the next pulse. The zero, third and fourth state output lines from converter 266 are all connected as inputs to OR gate 267. The output of the latter in turn is connected to input terminals of AND gates 252 and 258. The second state or count output line of converter 266 is connected to the clocking input terminal of shift register 262. The fifth state or count line from converter 266 is connected to output line 268 and also as one input to AND gate 269. Clock line 211 is also connected as input to AND gate 269. The output of AND gate 269 is connected to the reset (R) terminal of control flip-flop 256.

The output of OR gate 254 is connected to the input of a monostable multivibrator 270, the enable input terminal of multivibrator 270 being connected to the output of OR gate 267. The output of monostable multivibrator 270 is connected through inverter 271 as one input terminal to AND gate 272. The Q terminal of flip-flop 256 is connected as the other input to AND gate 272. The output of AND gate 272 is connected to the clear input terminal of counter 265 and to an input of OR gate 273. Another input to gate 273 is connected to line 244. The output of gate 273 is connected to the clear input terminal of divider 264. Lastly, there is provided an Enable Read line 274 over which an enabling signal can be propagated to initiate reading and phase decoding a record. Line 274 is connected through OR gate 276 to control the starting of motor 242. Similarly, Enable Write line 244 is connected to motor 242 through gate 276.

In operation of the phase decoding portion of FIG. 7, reference should be had also the timing diagram of FIG. 8. When it is desired to read data which has been stored in the tape 18 in cassette 240, an Enable Read signal on line 274 starts motor 242 so that the tape in cassette 240 is moved past read/write head 238. This produces a bipolar output shown typically at FIG. 8D, where each pulse or peak represents the location and sense of a transition in the phase-encoded signal stored on tape and shown in FIG. 8C.

The read/write head output is amplified in amplifier 246 and is rectified and shaped by rectifier/shaper 248 to produce a train, typically of positive, shaped output pulses, as shown in FIG. 8E. By inversion of the output of read/write head 238 in inverter 249 and by operation of rectifier/shaper 250, a similar train of positive, shaped pulses, such as are shown in FIG. 8F, is produced representing however only the negative peaks of the original output train of FIG. 8D. It will be apparent then that the two trains of pulses applied as inputs respectively to gates 252 and 258 represent respectively all of the positive-going transitions in the original phase encoded signal of FIG. 8C and all of the negative-going transitions of FIG. 8C, and that some of these transition are "midbit" while some are "interbit". The phase decoder system is intended to reconstruct the original sequence of bits (as shown in FIG. 8A), from the information provided by the midbit transitions only. Thus it is intended to reject the signals corresponding to the interbit transitions and this is accomplished by establishing a gating signal or time "window" after each detected midbit transition and during an interval when the next midbit transition can be expected to occur. This window, shown as the pulse train of FIG. 8G is produced as the output signal from gate 267 which is applied as an enabling or window signal to gates 252 and 258 and monostable multivibrator 270.

Divider 264 is arranged so that counter 265 counts four pulses during each bit time of the original signal of FIG. 8A. Thus, when the counter sequences to count the first pulse, the count zero output line from converter 266 goes down and the first count output line, which is not used here, goes high. Thus, gate 267 has no output and there is no enabling window present at AND gates 252 and 258. Any pulse appearing during that time in the inputs of AND gates 252 and 258 from the shapers will be discarded. This is also true when the counter sequences to the next or second count. However, the leading edge of the pulse appearing on the second count line from converter 266 is used to clock shift register 262 and shifts the data in the latter along one bit. When the third pulse from divider 264 is counted by counter 265 the third count line from converter 266 brings the output of gate 267 high and enables gates 252 and 258. As will be seen, the window provided by gate 267 continues high during the fourth count and then goes low at the beginning of the fifth count.

Although converter 266 is an octal converter, only five of the eight output lines are used. It should be noted that all pulses in the outputs of both rectifier/-shapers 248 and 250 are applied as inputs to gate 254, and that monostable multivibrator 270 is enabled by each window because the output of gate 267 is connected to the enable input of the multivibrator. Thus, if a pulse appears at either input to gate 254 at any other time than during a window, that pulse will neither trigger multivibrator 270 nor be passed by gates 252 or 258. On the other hand, when a pulse does appear during the third and fourth count in counter 265, that input pulse to gate 254 will also be passed by either gate 252 or 258, and because multivibrator 270 is enabled during that time, that pulse will also trigger the multivibrator. The output of the latter, then serves to disable gate 272 so that counter 265 is reset and held in its reset state until the pulse from multivibrator 270 disappears, whereupon the counter resumes counting. Thus, as soon as a transition from gate 254 appears during the third or fourth count, counter 265 is reset and the zero count line then goes up and the window signal in the output of gate 267 stays up. In this manner all of the interbit transitions are effectively rejected because they cannot pass AND gates 252 and 258 and the counter is reset after each detection of a midbit to thereby provide another window signal. For each of the eight data bits in the original signal there will be a corresponding mid pulse transition which will appear either at the input of gate 252 or at the input of gate 258. All of the midbit transitions appearing at the input of gate 252, as shown in FIG. 8J of course are applied to the set terminal of flip-flop 260 and all of the midbit transitions pulses appearing at the input of gate 258 will similarly be applied to the reset terminal of flip-flop 260. Thus the output of flip-flop 260 at its $\overline{Q}$ terminal will be a rectangular wave form which has positive-going transitions corresponding to the negative polarity midbit signals in the read/write head output, and will have negative-going transitions corresponding to the polarity midbit transitions in the read/write head output. This provides a wave form shown in FIG. 8K which is a reconstruction of the original wave form shown in FIG. 8A, phase-displaced ideally by one half of a bit.

If during the window time no midbit transition is detected, it is apparent that an intercharacter gap (ICG) instead has been found. At that point multivibrator 270 is enabled, but there will be no output from the latter to reset counter 265 back to zero because gate 254 has provided no triggering pulse. Instead, counter 265 will count a fifth count and consequently a signal will appear on the fifth count line of converter 266. This latter signal, indicative of the detection of an ICG, enables gate 269 so that the next clock pulse can be applied to the reset terminal of control flip-flop 256. The Q terminal of the latter then goes low, the output of gate 272 goes low and counter 265 is thus reset and held in its zero count state. Also, when an ICG appears, the signal on line 268 is also applied to terminal 144 (FIG. 6) to actuate flip-flop 136 and sequence the main register 94 by a single shift, transferring the output signals at the eight outputs of demultiplexer 262 to the main register 94.

Because the counter is then at zero count state, the zero count line from converter 266 is high and the output of gate 267 is high and thus enables gates 252 and 258. The midbit transition then seen by the gates is the start transition corresponding to the positive-going transition in the original clock pulse used in the phase-encoding of the next character of the original signal. The pulse corresponding to that start transition is applied to the $\underline{S}$ terminal of flip-flop 260 through gate 252 so that the $\overline{Q}$ terminal of the latter goes low if it is not already low. Also, the output of gate 267, being high, sets control flip-flop 256 so that the latter provides a high input signal to gate 272. This output of gate 267 also triggers multivibrator 270 which thus keeps gate 272 disabled despite the setting of flip-flop 256, but gate 272 is disabled only until the signal from multivibrator 270 subsides. At that point gate 272 enables counter 265 which starts to count from zero again, so that on the first count, gate 267 is disabled and the sequence described above reoccurs.

It is apparent from the nature of phase-encoding and the details of the read logic used that data can be decoded reliably despite considerable timing errors such as might be due to tape speed variation and the like.

The decoded signals, appearing at respective lines on the output of demultiplexer 262 are then the respective R1, R2, R2A, R5, T1, T2, S and P signals. These output lines from demultiplexer 262 are connected to the respective terminals identified as Inputs From Read Data Circuits shown in FIG. 5 and thereby can be introduced back into the main memory register 94.

All 8 lines at the output of the main memory register are also connected as inputs to print control logic 68 as noted in FIG. 3. As shown particularly in FIG. 9, the R1, R2, R2A, R5, T1, and T2 lines from register 94 are connected to respective input terminals of a like plurality of enable gates 280. All of the output lines from register 94 are also connected to respective input terminals of parity checking circuit 282.

In order to decode the characters which represent operator functions, there is provided operator decoding circuit or decoder 284 having six input terminals respectively connected to the R1, R2, R2A, R5, T1, and T2 outputs from register 94. The decoder, well known in the art, is merely a group of gates connected so as to decode the operator function signals shown in Table II and provide an output signal on a corresponding operator line when the requisite input operator signal has been detected or decoded. Thus, decoder 284 has output lines respectively identified as SP (Space), CR (Carrier Return), BSP (Back Space), CI (Carrier Index), TAB, TABS (Tab Set) and TABCL (Tab Clear). These latter output lines are connected as inputs to a plurality of enable gates 286. Decoder 284 also includes gating which will provide an output on line 287 whenever the decoder determines it has decoded an operator code, i.e., whenever an output signal appears on any other line from decoder 284. Typically a simple OR gate will serve this function. If the signal at the input to decoder 284 is not an operator function signal but instead is an information character signal then decoder 284 provides an output signal on line 288. In addition decoder 284 includes gating for detecting the presence of a hyphen code (Table I) at the output of register 94 and for providing responsively thereto an output signal on line H to terminal 289.

It is desirable to inhibit transfer of information from the print control logic to the printer 20 when the latter is performing a function or is otherwise busy. To this end, there is provided Print-Busy OR gate 290 having a plurality of inputs thereto. One of the inputs is a $\overline{\text{Print Mode}}$ signal simply derived as the inverse of a signal generated by depression of Print Buttons 33,34,35 or 36 indicating that the device is not in the Print Mode and that the printer 20 is therefore available for operation of the keyboard by the operator. Another of the inputs to OR gate 290 is a CIM (carrier-in-motion) signal indicating that the print head 16 of the output printer 20 is being transported from right to left; such signal is derived from a carrier-in-motion sensor in baseplate 24. Yet another input line to OR gate 290 is a PIM line for carrying a signal indicating that the print head 16 is in motion or that some character is being printed out by the print head 16 and the latter is not ready to print another character. The PIM signal also is provided by an appropriate sensor in baseplate 24. Another input line to OR gate 290 identified as Function From Keyboard from encoder gates 76 in FIG. 4 is intended to carry signals from any sensor in baseplate 24 which provides a signal that an operator function such as space, carrier index or the like, is occurring. Yet another input to gate 290 is a line for carrying a CR or carrier return signal from an appropriate sensor in baseplate 24. An additional line to OR gate 290 is intended to carry, in a preferred embodiment of the invention, delay pulses which are related to typewriter dynamics and which are intended to adjust the operation of the print control logic to match the timing peculiarities or other operating idiosyncracies of the type of printer 20 being used with the system. The output of OR gate 290 is connected as one input to NOR gate 292, another input to gate 292 being the output of parity checking circuit 282. The output of NOR gate 292 is applied as an input to both AND gate 294 and AND gate 293. Another input to gate 294 is line 288, and the output of gate 294 is connected to the enabling input terminal of enabling gates 280.

The output of gate 294 is also connected to provide a signal (CC) to enable a cycle clutch in the printer 20, in known manner, to permit the print mechanism to be driven. Similarly, the other input to gate 293 is line 287 and the output of gate 293 is connected to the enabling input terminal of enable gates 286. The outputs of enable gates 286 are thus four lines, each connected to appropriate mechanisms in baseplate 24, for carrying signals representing the functions CI, TABS, TABCL and TAB, and three other lines for respectively carrying signals representing the functions SP, BSP and CR.

The outputs of enable gates 280 are the six lines R1, R2, R2A, R5, T1 and T2, connected to the baseplate 24 through a data selector or switching mechanism that will permit selectively the print out of data from the buffer or addresses in one embodiment. The schematic of FIG. 9 also includes three more input terminals, one marked Force SP, one marked Force BSP and the last marked Force CR. The input signals at Force SP and Force BSP terminals are derived from operation of the Step Right and Step Left Buttons 41 and 42 and are intended to provide a compulsory Space signal and a compulsory Backspace signal to the baseplate. Similarly, the input signal at Force CR terminal is derived from logic used for Right-Hand Margin Adjust and is intended to provide a compulsory Carrier Return signal to the baseplate. Force CR, Force BSP and Force SP terminals are thus connected to appropriate input terminals of enable gates 295, the latter having an inverting enabling terminal connected to the output of gate 290. Gates 295 thus have three output lines 296, 283 and 297 respectively connectable to the Force SP, Force BSP, and Force CR inputs according as gates 295 are enabled or disabled. Line 296 and the SP output line of gates 286 are connected as inputs to OR gate 298, the output of the latter then being connected as the SP input line to baseplate 24. Line 283 and the BSP output line of gates 286 are inputs to OR gate 285 which has its output connected as the BSP input to the baseplate. Similarly line 297 and the CR output line from gates 286 are connected as inputs or OR gate 299, the output from gate 299 in turn being connected as the CR input line to baseplate 24. Input Force SP, Force BSP and Force CR lines are all connected as inputs to OR gate 300. The output of the latter is connected as an additional input of NOR gate 292.

In operation of the system shown in FIG. 9, as register 94 shifts, the 8-bit parallel signals appear in sequence at the register output and all eight bits are applied to parity check logic 282. The latter, in known manner, sums the bits. Because the present system requires odd parity, logic 282 provides a high output signal to gate 292 only if the sum of the bits is even. If any of the signals at the input of gate 290 are high then a high output signal is also applied to gate 292. Because the latter inverts, a high input signal to gate 292 disables gates 293 and 294. Similarly the output of gate 290 when high serves to disable gates 295. Lastly, the output of gate 300, when high, is applied as an input to gate 292. Thus, in the event that (1) a "wrong" or even parity signal is at the output of register 94, or (2) signals indicate that the Printer is busy, i.e., PIM, CIM, CR or Function from Keyboard, or (3) delay pulses are at the input of gate 290, or (4) the system is not in the Print Mode of operation, or (5) a Force SP, Force BSP or Force CR signal is present, gates 280 and 286 will be disabled and thereby prevent initiation of any action of the printer 20 by any output of register 94.

When the operator depresses Step Right button 41, data in storage is shifted by one character and it is then necessary to command a corresponding step of one space by the carrier or print head 16 in the printer 20. Hence, Force SP signal is generated by depression of button 41 and is coupled through gates 295 and 298 to the appropriate input terminal of baseplate 24 to initiate such print head stepping.

In certain instances when printing out the register contents, it will be necessary for the system to initiate a Carrier Return signal to the printer although no CR signal is recorded in the register at that point. Hence, the system includes a source of the Force CR signal. Such source is typically a flip-flop activated responsively to appropriate logic covering a number of situations where a CR signal must be initiated. the proper input terminal of the baseplate to compel a Carrier Return function by the print carrier or head. In case of either a Force SP, Force BSP or Force CR signal being produced, these signals will serve to disable gates 286 and 280 so that the contents of register 94 cannot be used to activate the baseplate.

As previously noted, when typing data into the register when the system is in the Draft Mode, a single or a 201 shift cycle is used and the clocking of register 94 and the subsidiary registers occurs in the $X_1X_3X_2$ sequence. Similarly, inserting data from the keyboard into the memory when the system is in the Insert Mode involves a 201 shift cycle where the clocking order is initially $X_1X_2X_3$ but changes to $X_1X_3X_2$ during the 201 shift cycle when a blank cell is detected in the memory. Similarly, the operation of deletion of a character is accomplished by a 201 shift cycle. As noted single shifts of register 94 are used along with the $X_1X_3X_2$ clocking sequence when in the Print Mode, i.e., to print out from the memory.

To effect the foregoing operations, the system includes logic in buffer control originally shown in block in FIG. 3 at 70 which, in a simplified version is illustrated in FIG. 10 and includes four D-type flip-flops 301, 302, 303 and 304. Flip-flop 304 is intended to provide signals controlling the single shifts when in the Print Mode. Thus, the D input terminal of flip-flop 304 is connected to terminal 305 at which a Print Mode signal, derived by operation of any of the print buttons 33, 34, 35, or 36 is intended to be applied. The Q terminal of flip-flop 304 is connected to terminal 144 of flip-flop 136 (FIG. 6). The C or clock input terminal of flip-flop 304 is connected to the output of OR gate 306. The latter has a pair of input terminals, which are respectively connected to the outputs from encoder gates 76 shown in FIG. 4 as PIM and Function from Keyboard. The output of gate 306 is also connected to the C input terminals respectively of flip-flops 301, 302, 303 and 304.

The logic diagram of FIG. 10 also includes input terminal 169 which is at the output of gate 134 (FIG. 6). Terminal 169 is connected to th clear input terminal 307 of flip-flop 304. Terminal 169 is also connected as an input to AND gate 308, the other input to which is terminal 310 which is connected to output line 156 of counter 190 (FIG. 6). The output of gate 308 is connected to clear input terminals 311, 312 and 313 of flip-flops 301, 302, and 303 respectively. A group of logic gates are provided for operating flip-flops 301, 302 and 303, and include AND gate 314 having its output connected to the D input terminal of flip-flop 301 and having four input terminals, one of which is connected to terminal 305 through inverter 315. Another of the input terminals to gate 314 is connected through inverter 316 to terminal 317 which is the CR line output of decoder 284 (FIG. 9). A third input to gate 314 is through inverter 318 from input terminal 319. The last input terminal of gate 314 is connected to the output terminal of NAND gate 320. The inputs to gate 320 are respectively connected to terminal 322 and line 324 from RS flip-flop 344. The D input terminal of flip-flop 302 is connected to the output of second AND gate 326 which has three input terminals of one which is connected to the output of inverter 315, a second of which is connected through inverter 327 to line 324 and the last of which is connected to the output of OR gate 328. OR gate 328 has one input connected to terminal 319 and the other input connected to terminal 317.

The third AND gate 329 has its output connected to the D input terminal of flip-flop 303. Gate 329 has four input terminals, one connected to the output of gate 328, another connected to the output of inverter 315, a third connected to line 324 and a fourth connected through inverter 330 to terminal 322. Lastly, the Q output terminals of flip-flops 301, 302 and 303 are all connected as inputs to OR gate 332, the output of the latter being connected in turn to terminal 147 (FIG. 6).

The buffer control logic shown in FIG. 10 controls the buffer in accordance with the following operation. As previously noted, the signal intended to be applied at terminal 305 is derived from operation of any of the four print buttons. The Q terminal of flip-flop 304, as is typical of D-type flip-flops, will go high when simultaneously both the signal at input D is high and the signal at C terminal goes high. Thus, when the signal at terminal 305 is high and there is PIM or Function from K/B signal, then the Q terminal of flip-flop 304 will go high. When signal at terminal 144 goes high, as previously described in connection with FIG. 6, the Q terminal of flip-flop 136 goes high and the data in register 94 is shifted one cell. The first $\phi_4$ pulse at terminal 169 will clear flip-flop 304 so that its Q terminal goes low. Thus each time a character is printed or a function is executed on the printer, the buffer is shifted one place so that the next stored character is available.

If however, the device is not in the Print Mode and the signal at terminal 305 is therefore not high, the output of inverter 315 will however apply a high signal to each of AND gates 314, 326 and 329. As noted, terminal 317 is connected to the CR output line from decoder 284 in FIG. 9 and therefore is intended to carry a signal indicative that a carrier return function signal has been noted at the buffer memory output. Similarly, terminal 322 is connected to the output of gate 220 (FIG. 7) and this is intended to provide a signal indicative of detection of blank cell at the buffer memory output. Line 324 is intended to have applied thereto a signal derived as hereinafter explained indicating that the buffer is full. Lastly, at terminal 319 there is intended to be applied a signal indicating that insert button 32 has been depressed and that the system is therefore to operate in the Insert Mode. It will be seen then that the output signal from the gate 314 goes high only when (1) the system is not in the Print Mode, (2) there is no carrier return signal at the buffer output, (3) the device is not in the Insert Mode and (4) the buffer is not full with a blank cell at the buffer output. All of these negative requirements therefore indicate that the device is to operate in its "normal mode." Hence, flip-flop 301 provides at its Q output a normal shift signal for typing in data from the keyboard when the output of gate 314 is high and if either a PIM or Function from K/B signal is present.

Similarly, there will be high output from gate 326 when (1) the system is in an Insert Mode or a carrier return signal appears at the buffer output, (2) the system is not in the Print Mode and (3) the buffer memory is not full. This output from gate 326 causes flip-flop 302 to also provide an output signal which indicates that a Normal Insert Cycle is to operate and which is fed both as in input to gate 332 and to terminal 187 (FIG. 6).

Gate 329 will provide a high output only when (1) the system is either in an Insert Mode or a carrier return signal appears at the buffer output, (2) a blank cell is not at the buffer output (3) the buffer is full and (4) the system is not in the Print Mode. In such case, the resulting output signal from flip-flop 303, applied as an input to gate 332, also is applied at terminal 182 to control buffer clocking for the Insert Cycle with Overflow operation.

Resetting of flip-flops 301, 302 and 303 occurs when both a terminate shift signal is present at the output of counter 190 (FIG. 6) and a $\phi_4$ signal is present at terminal 169. The output of gate 332 is applied to terminal 147 to bring the J input of flip-flop 142 (FIG. 6) high and therefore initiate a 201 shift as previously described. It should be noted that D type flip-flops are used particularly because it is desired to do a 201 shift on the leading edge of the pulse from gate 306.

Included in the circuit of FIG. 10 are means for detecting when its memory is "full." The foregoing means comprises AND gate 336 having one input connected to terminal 322 and the other input connected to terminal 338. The latter is preferably connected to $X_1$ line 97 (FIG. 5) so that normal $X_1$ clocking signals applied to single-bit register 96, will also be applied at terminal 338. The output of gate 336 is connected to the input of counter 339. The latter has an enable input terminal which is connected to terminal 147. Counter 339 is a counter, which after being enabled, counts the first three input pulses from gate 336 and then provides a high output signal indicating that three pulses have been counted, whereupon the counter stops counting. Such counter can be readily formed of a pair of flip-flops as is well known in the art. The output of counter 339 is connected through inverter 340 as one input to AND gate 341. Gate 341 also has as inputs thereto a line connected to terminal 310, another line connected to terminal 147, and a fourth input connected to terminal 342. Terminal 342 is connected to $X_2$ line 95 (FIG. 5) so t at any signals applied for clocking shift register 94 (FIG. 5) will also be applied at terminal 342.

The output of gate 341 is connected to the S input terminal of an RS type flip-flop 344. The Q output terminal of the latter is connected to line 324. Lastly, OR gate 345 is provided, having its output connected to the R terminal of flip-flop 344 and having a pair of input lines respectively connected to terminals 346 and 347. At terminal 346, there is intended to be applied a signal indicating that a Delete function is being performed, which signal is derived hereinafter described. The signal to be applied at terminal 347 is a signal which will cause a clearing of the buffer memory and for example may be derived from Enable Write line 244 (FIG. 7).

The portion of FIG. 10 just described detects the "full" buffer in accordance with the following operation. A signal at the output of gate 332 will, as previously noted, initiate a 201 shift by being applied at terminal 147. The same signal enables counter 339. During the 201 shift, every $X_1$ pulse, being applied at terminal 338, will serve to enable gate 336. However, the output of the latter goes high only when a blank cell is detected at the output of the register 94 and a corresponding pulse is therefore applied at terminal 322. Counter 339 then counts, for example, the first three blank cells detected during that 201 shift, then stops counting as the output of the counter goes high. Simultaneously, the input to gate 341 from gate 332 will remain high during the 201 shift, as will the periodic timing signals applied to gate 341 from terminal 342. When the terminate shift input signal, indicating that the 201 shift has been completed, is applied at terminal 310, gate 341 is then interrogated to see if less than three blank cells were counted.

If counter 339 has counted at least three blank cells, its output signal will be high and thus inverter 340 will apply a low signal to gate 341, disabling the latter. If however, counter 339 has counted less than three blank cells, gate 341 then, when interrogated by the signal at terminal 310 and if all of its other inputs are high, will provide a set pulse to the S terminal of flip-flop 344 at $X_2$ time.

In other words, flip-flop 344 will be set when a 201 shift as been executed and less than three blank cells have been seen at the output of register 94 in $X_1$ time during that shift. Setting of flip-flop 344 provides an output signal on the Q terminal thereof which is applied to line 324 and which indicates that the buffer memory is full. Flip-flop 344 will be reset by the output of gate 345 if anything is deleted from the buffer as indicated by a Delete signal at terminal 346 or if a record is written on to tape 18 as indicated as by a Write Enable signal which will clear register 94 and which is applied to terminal 347.

It should be noted that if less than three blank cells are seen one may infer that only two or less are seen by counter 339. This implies that if only two cells are seen, only one will be left when the 201 shift cycle is complete. Because for proper operation of the system at least one blank cell must be left at all times, it is apparent that a "full" buffer can be defined as one in which, during the 201 shift, counter 339 counts less than three blank cells at the of output register 94. AS shown in FIG. 11, which is a simplified version of the tape control circuitry, the address display logic and read address circuits include shift register demultiplexer 262 (FIG. 7). The inputs shown to the latter are the same as in FIG. 7: line 274 along which an Enable Read signal can be sent, line 350 which is the data line coupled to the $\overline{Q}$ output of flip-flop 260, and line 352 which connects the second count output line of converter 266 to the clocking input terminal of shift register demultiplexer 262. The decoded signals, appearing at respective lines at the output of demultiplexer 262 are of course the respective R1, R2, R2A, R5, T1, T2, S and P lines. Four of these lines are connected to the preset inputs of counter 354.

Counter 354 is preferably an up-down, presettable, clocked counter, well known in the art, capable of counting in a binary coded decimal mode. The counter has a load pin or terminal 356 which is preferably connected to line 268 (FIG. 7) so that the inter-character gap (CG) signal can be applied to preset counter 354. Counter 354 also includes an input decrement line 358 and an input increment line 359. The output of counter 354 is connected to code converter 360 which is adapted to convert the count in counter 354 to a proper format for display in address display unit 28. Counter 354, converter 360 and display 28 are all shown, for the sake of simplicity as a single decimal digit unit, but it is to be understood that these elements are preferably multi-digit devices. FIG. 11 also includes, in schematic form, Tape Forward button 46 and Tape Back button 47, connected to respective double-poled switches 362 and 364, the switch armature in each case being centrally spring-biased and coupled to a source of voltage +V. The up or fast forward terminal 365 of switch 362 is connected as an input to both motor drive circuits 366 and to AND gate 368. The down or slow forward terminal 370 of switch 362 is also connected as an input to motor drive circuits 366. Both the up or fast reverse terminal 372 and the down or slow reverse terminal 373 of switch 364 are connected as respective inputs to motor drive circuits 366 and also as inputs to OR gate 374. The output of OR gate 374 is connected as input to AND gate 376.

Motor drive circuits 366 are connected in known manner for controlling the direction and speed of motor or motors 242. Motor 242 is mechanically coupled to control the movement of tape 18 in casette 240 past read/write head 238, and the output of the latter is amplified in amplifier 377. The output of amplifier 377 is connected an an input to data-block monostable multivibrator or one-shot 378. The output of the latter is connected to respective inputs to AND gates 368 and 376. The output of AND gate 376 is connected to input decrement line 358, and the output of AND gate 368 is connected to increment line 359. The operation of the device of FIG. 11 to identify and display the address of a block of data on tape in casette 240 can be described as follows. It will be appreciated that, as previously noted in connection with FIG. 2A, the data addresses 48 are typically prerecorded on a second track 29 on the casette tape 18 and are read from the tape preferably by one of the dual read/write heads 238. The output of both heads will however be applied through the decoding circuitry of FIG. 7, so that both the data on track 25 of the tape and the address information on track 29 will appear on line 350 to shift register demultiplexer 262. To avoid the simultaneous appearance of information from both tracks 25 and 29, it is of course necessary to insure that the data recorded on track 25 is not positioned adjacent an address, so that the two tracks can only be read out in a mutually exclusive fashion. Alternatively, one can record addresses and other data in sequence on a signle track. The addresses are preferably read out into demultiplexer 262 in binary coded decimal form to appear on the four output lines of the demultiplexer that are connected as the BCD preset inputs of counter 354. The latter os preset at each intercharacter gap associated with the recorded addresses so that no data can be transferred from the shift register demultiplexer 262 to counter 354, except address information.

The output of counter 354 is converted in converter 360 to a form suitable for display in display device 28. The nature of converter 360 is dictated by the type of display desired. For example, if each display device 28 is a seven-segment display then the converter 360 will be a BCD-to-seven-segment converter. Similarly, if display device 28 is a Nixie tube display, then converter 360 would be a BCD-to-decimal converter. Such converters are, of course, well known in the art and need be described no further here.

If button 46 is displaced so that the armature of switch 362 contacts slow forward terminal 370, motor drive circuits 366 will control motor 242 to drive the tape 18 in cassette 240 at a slow speed. As the address is then read from the tape 18, it is demultiplexed and sets the state of counter 354. The state of the counter is converted by converter 360 to a visible display in device 28.

If however, button 46 is manipulated so that the armature of switch 362 contacts fast forward terminal 365, the resulting signal is applied both to gate 368 and to motor circuits 366 which then control motor 242 so that the tape in cassette 240 is driven at comparatively high speed past read/write head 238, and ordinarily at a speed which is too fast for the circuit of FIG. 7 to decode the address. In such case, the output of amplifier 246, while it may be indecipherable, nevertheless is used to trigger the monostable multivibrator 378 so that its output is a pulse representing the envelope of the address signals read from the tape 18. Each such pulse, when applied to the then enabled gate 368, will be transferred to increment line 359 of counter 354 and hence change or increment the state of the counter by one added count. In a similar fashion, it will be recognized that in neither the fast reverse nor slow reverse modes of movement of the tape in cassette 240, can a readily decipherable signal be obtained by demultiplexer 262. Hence signals from both the fast reverse and slow reverse terminals 372 and 373 of switch 364 are used to cause the counter to be decremented and are applied through OR gate 374 to enable gate 376. When the tape is moving in reverse, detection of an address will trigger one-shot 378 and the resulting pulse is fed through gate 376 to line 358 to reduce the state of counter 354 by one count.

It will be appreciated that one-shot 378 will provide a pulse corresponding to every address seen, whether in the slow or fast, forward or backward motion of the tape. However, the output of the one-shot will not be passed by either gate 368 or 376 unless those gates are enabled by appropriate signals indicating appropriate positions of the tape move buttons 46 and 47.

Communication between the operator of the device and the system, to control the operation of the latter, is effected, of course, through both the printer keyboard and control unit 22. The schematics showing the details of the control unit connected with the operation of the various control buttons, are shown particularly in FIGS. 12 and 13. Referring particularly to FIG. 12, there will be seen eight of the control buttons identified by name and specifically shown as switch 380 which is connected to be controlled by Draft Mode button 30, switch 382 which is connected to be controlled by Final Mode button 31, and switch 384 which is connected to be controlled by Insert Mode button 32. All of switches 380, 382 and 384 have armatures which are each connected to the common source of voltage, such as +V, and which are moveable between a corresponding pair of positions.

The armature of switch 380 is moveable between a first position at which the switch is inoperative or has no effect, and a second position wherein the armature contacts a terminal connected to the S input terminal of RS type flip-flop 386. Similarly, switch 382 has a first or inoperative position and a second position wherein the armature is in contact with a terminal which is connected directly to the R or reset terminal of flip-flop 386. The Q output terminal of flip-flop 386 is connected to terminal 387 and the $\overline{Q}$ output terminal of flip-flop 386 is connected to output terminal 388.

Switch 384 has a first position wherein the armature thereof contacts the S input terminal of RS type flip-flop 390. In the second position of switch 384, the armature of the latter is connected to the R input terminal of flip-flop 390. The Q output terminal of flip-flop 390 is in turn connected to the C input terminal of J–K type flip-flop 392. The $\overline{Q}$ output terminal of the latter is connected to the J input terminal and the Q output terminal is connected to the K input terminal. The Q output terminal of flip-flop 392 is also connected to output terminal of flip-flop 392 is also connected to output terminal 394. The reset input terminal of flip-flop 392 is connected to the output line of NOR gate 395. One input of the latter is connected to terminal 388 and another input is connected to the output of OR gate 396.

It will be appreciated that switches 380, 382 and 384 respectively constitute the Draft, Final and Insert button control switches. Upon operation of button 30, flip-flop 386, being set, provides a high signal at its Q terminal and therefore at terminal 387. This high signal then indicates that the device is to operate in the Draft mode. Similarly, when button 31 is pressed, it serves to reset flip-flop 386 and produce a high output signal at terminal 388. This latter high output signal is of course indicative that the operation of the device is to be in the Final mode. It should be noted that the signals at terminals 387 and 388 are mutually exclusive signals so that the system can only operate in either the Draft or the Final mode, but not in both.

Similarly, Insert button 32 controls the operation of switch 384. The armature of switch 384 is normally spring biased into the position whereby flip-flop 390 is held in a reset state. When insert button 32 is depressed, an input signal is applied to the S input terminal of flip-flop 390 and serves to provide a high signal at the Q output terminal of the latter. When the insert button is released, the armature of switch 384 will return to the reset position and the signal at the Q output terminal of flip-flop 390 will then again go low. It will be recognized that because flip-flop 392 is wired so that its input and output terminals are cross-coupled to one another, flip-flop 392 essentially constitutes a divide-by-two device. Thus, as the Q terminal of flip-flop 390 goes high, assuming that the $\overline{Q}$ terminal of flip-flop 392 is initially high, upon the trailing edge of the signal from flip-flop 390 due to the resetting of the latter, the Q output terminal of flip-flop 392 will go high, and provide an Insert Mode signal at terminal 394. This signal will persist until Insert button 32 is again depressed and an input signal is provided to the clock input terminal of flip-flop 392. On the trailing edge of such signal, terminal 394 will then go low.

Gate 395 provides an output which will automatically reset flip-flop 392 so that if terminal 394 has a high signal, that signal will then go low. It will be seen that one of the signals which will serve to reset flip-flop 392 is a high signal at terminal 388 indicating that the system is in the Final Mode of operation and that no inserts can be made. Other resetting signals to flip-flop 392 are derived from gate 396. Gate 396 has a plurality of inputs thereto. Typically, one input to gate 396 is a Delete signal, which is derived as hereinafter explained in connection with FIG. 13. Another input signal to gate 396 is a Tape Move signal indicating that one of the Tape Forward or Tape Back buttons are being operated, as for example, a signal on one of the input lines to motor drive circuits 366 in FIG. 11.

Yet another input to gate 396 can be a line carrying a Step Right or Step Left signal derived from operation of buttons 41 or 42 as hereinafter described. Probably the most common signal which will serve to reset flip-flop 392 is an indication that the device is in the Print Mode and the derivation of that signal will be described hereinafter. It will be appreciated that the inputs shown to OR gate 396 are merely exemplary and that many other inputs from elsewhere in the system can be applied at corresponding inputs to either of gates 396 or 395 when it is desirable to take the system out of the Insert Mode of operation. It will also be seen that flip-flop 390 essentially serves to debounce switch 384 and that flip-flop 392 serves as a memory to remember when the system is or is not in the Insert Mode.

FIG. 12 also includes a number of the other buttons of the system and there associated switches. For example, there is shows Print Character button 33, Print Word button 34, Print Line button 35, Automatic Print button 36 and Stop button 38 respectively associated with switches 398, 399, 400, 401, and 402 so that the armature of each switch is operated by manipulation of the respective button. The armature of each of these switches is connected to a source of potential such as +V, and is moveable between one of two positions. In each case, the armature is normally biased to be in contact with the R or rest terminal of a respective R–S type debouncing flip-flop, and is moveable to the second position wherein the armature applies the potential +V to the S or Set terminal of the corresponding flip-flop. Thus, switches 398-402 inclusive have associated therewith flip-flops 404, 405, 406, 407 and 408 respectively. The Q output terminals of flip-flops 404, 405, 406 and 407 are respectively connected to the C input terminals of D type flip-flops 410, 411, 412, and 413. All of the D terminals of flip-flops 410, 411, 412 and 413 are respectively connected to Enable Print input terminal 414. All of the Q output terminals of flip-flops 410-413 inclusive are connected as respective inputs to OR gate 416. The output of the latter is connected to terminal 418 and also, as previously described, as an input to gate 396. The reset terminals of flip-flops 410, 411, 412 and 413 are connected to the respective outputs of NOR gates, 422, 424, 426 and 420. The Q output terminal of flip-flop 408 is connected as an input to each of gates 420, 422, 424 and 426. Depending on the complexity of the system, the latter NOR gates will have many other inputs. Typically, for example, one of the inputs to NOR gate 420 is connected to input terminal 428 at which there is intended to be applied a signal indicating that anticipatory margin control logic has determined that the printing should stop because no return opportunity has been found upon examination of a particular part of the buffer contents, as will be described hereinafter. Any other condition determined by logic in the system which requires that automatic printing be arrested, such as the appearance of a stop code signal at the output of the buffer memory during printing, or some like condition, can be applied as an input to gate 420 to reset flip-flop 413 and therefore arrest automatic printing.

Similarly, terminal 429 of gate 426 is preferably connected to the output of gate 299 (FIG. 9) so that a signal indicating that a carrier return signal has been detected at the output of the buffer memory can be applied to gate 426. Again clearly, one can provide additional inputs to gate 426 as shown by the unmarked terminal, from logic which determines that a condition exists in the system whereby it is desired to arrest the printing of a line.

Terminal 430 of gate 424 therefore is connected to the output of gate 298 (FIG. 9) so that an input signal indicating that a space signal has been detected at the output of the buffer can be applied to gate 424 and therefore that a word has terminated. As with OR gates 420 and 426, other inputs can be provided to gate 424 from logic which determines when it is desirable to arrest the printing of the word.

Lastly, as an input to terminal 431 of gate 422, there is provided a connection to the Q terminal of flip-flop 304 (FIG. 10) so that flip-flop 410 can be reset on a condition indicating that a one-shift has been completed by the buffer and therefore a character has been printed out. Similarly other inputs can be provided to gate 422 which indicate that it is desirable to stop a print condition where the system has been ordered to print out but one character.

In operation, when it is desired to place the system in a Print Mode of operation, it is only necessary to depress any of Print buttons 33–36 inclusive to effect printing respectively of a character, word, line or to effect automatic continual printing as earlier described. The depression of one of the Print buttons will provide an appropriate signal at the input of gate 416 and therefore a Print Mode signal at the terminal 418. It will be remembered that terminal 418, is connected to terminal 305 (FIG. 10) so that flip-flop 304 thereby provides a signal which triggers the one-shift flip-flop 136 (FIG. 6) to clock the buffer memory so that the latter shifts only a single cell. As soon as the shift is initiated, the Q terminal of flip-flop 304 goes high, and the latter signal will then, being applied through gate 422, reset flip-flop 410 terminating the Print Character mode. In like manner, the output of flip-flop 411, being applied through gate 416, will cause flip-flop 136 to be triggered through a series of single shifts until a Space signal is detected at the output of the buffer memory and flip-flop 411 is reset, thereby terminating that printing operation. Similarly, signals provided at terminal 418 from flip-flops 412 or 413 will insure that a series of single shift operations of the buffer memory will occur until terminated by conditions which indicated that a line has been completed (such as the occurrence of a carrier return signal at the output of the buffer memory) or, when it is desired to terminate automatic printing, (as by the occurrence of a stop code at the output of the buffer memory.)

Referring now to FIG. 13, there will be shown the remainder of the control buttons from the control console, together with the switching and logic immediately associated therewith. As shown in FIG. 13, there are Step Right button 41 and Step Left button 42 each coupled for controlling the armature of a respective one of a pair of two-position switches 434 and 435. The two terminals of switch 435 are respectively connected to the set and reset input terminals of RS type flip-flop 436. Similarly, the S and R terminals respectively of flip-flop 437 are connected to the output terminals of switch 434. The Q output terminal of flip-flop 436 is connected to the C input terminal of D type flip-flop 438. In like manner, the Q output terminal of flip-flop 437 is connected to the C input terminal of flip-flop 439. Both D input terminals of flip-flops 438 and 439 are connected to the source of voltage $V_{cc}$ at terminal 440.

The Q output terminal of flip-flop 438 is connected to output terminal 442 and is also connected to the S input terminal RS type flip-flop 444. The Q output terminal of flip-flop 444 is connected to output terminal 445. The R input terminal of flip-flop 444 is connected to input terminal 446 at which there is intended to be applied a signal BSP/S from a sensor in the baseplate 24 indicating that a backspace has been executed in the printer 20.

The Q output terminal of flip-flop 439 is connected to the S input terminal of RS type flip-flop 448. The R input terminal of flip-flop 448 is connected to input terminal 449 at which there is intended to be a signal SP/S applied which has been derived from a sensor in the baseplate 24 indicating that a spacing operation has been executed in the printer 20.

The Q output terminal of flip-flop 448 is connected to output terminal 450. The clear input terminal of flip-flop 438 is connected to the output of AND gate 452. The latter has two inputs, one terminal 453 which is connected to the output of counter 190 (FIG. 4) and the other from terminal 169 (FIG. 6). The clear input terminal of flip-flop 439 is also connected to terminal 169. Lastly, the armatures of switches 434 and 435 are connected to some voltage source such as +V at terminal 454.

In the operation of buttons 41 and 42, it will be seen that the following sequence of events will typically occur: For example, if button 42 is manually manipulated, it applies a positive voltage at the set input terminal of flip-flop 436 bringing the Q output terminal of the latter high. This triggers flip-flop 438 so as to produce a high signal at terminal 442. The latter is preferably connected to terminal 145 of flip-flop 138 (FIG. 6) and therefore initiates a 199-shift. In addition, the same signal which is applied then to the J input terminal of flip-flop 138 (FIG. 6) is also applied at the set input terminal of flip-flop 444 and produces a high signal on the Q output terminal of the latter at terminal 445. This latter signal is then a Force Backspace signal which, as previously noted in connection with FIG. 9, is applied to Enable Gates 295 and forces the carrier or print head 16 in the printer 20 to backspace in synchronism with the effective reversal of the movement of data in the buffer memory due to the 199 shift.

Release of button 42 will permit the armature to then contact the reset terminal of flip-flop 436 and the Q terminal of the latter then goes low. On the first $\phi_4$ pulse after counter 190 has completed the 199-shift, flip-flop 438 will be reset and the Q terminal of the latter will go low. The execution of the Force Backspace signal, as determined by the sensor in the baseplate, provides a signal at terminal 446 which then resets flip-flop 444.

In like manner, if button 41 is manipulated so that a signal is applied at the set input terminal of flip-flop 437, it serves to trigger 439 which provides an output to the S input terminal of flip-flop 448 and thus brings terminal 450 high. This latter signal constitutes a Force Space signal which, as shown in FIG. 9, is also applied to Enable Gates 295 in order to compel the print head 16 in the printer to space one unit. The Q output of flip-flop 439 is also used, as will be described hereinafter, as an input signal to flip-flop 136 (FIG. 6) to initiate a one-shift in the buffer memory. Flip-flop 439, of course, is cleared by the first $\phi_4$ pulse applied at terminal 169 and flip-flop 448 is reset immediately upon the execution of a Space operation by the printer 20 as determined by the sensor in the baseplate 24.

It will be apparent that the operation of either of the Step buttons will result in either the buffer contents alternatively being shifted forward, or, in effect backward, with a synchronized attendant movement of the print head 16. The logic for controlling the buffer can be made considerably more complex to cover a number of special relations between the buffer contents and printer operation that may occur while stepping the print head 16 either as a series of spaces or as a series of backspaces.

Also included in FIG. 13 are three additional switches 456, 457 and 458 respectively associated with and operated by the Skip/Delete buttons 45, 39 and 40 which are intended respectively to control the skipping or deleting, as the case may be, of characters, words and lines. Each of the switches 456, 457 and 458 are two position switches wherein the armature is normally spring biased into one position. The respective contacts of each switch are connected to a corresponding pair of set and reset terminals of one of RS type flip-flops 460, 462, and 464. The Q output terminals of flip-flop 460 is connected to the C input terminals of first and second D type flip-flops 466 and 467. Similarly, the Q output terminal of flip-flop 462 is connected as an input to the C input terminals of both flip-flops 468 and 469, and the Q output terminal of flip-flop 464 is connected to the C input terminals of flip-flops 470 and 471. The D input terminals of flip-flops 466, 468 and 470 are connected to terminal 388. The D input terminals of flip-flops 467, 469 and 471 are connected to input terminal 387. The Q output terminals of flip-flops 466, 468 and 470 are all connected together with the Q output terminal of flip-flop 439 as inputs to OR gate 474. The output of the latter is connected to input terminal 144 (FIG. 6). The Q output terminals of flip-flops 467, 469 and 471 are all connected as inputs to OR gate 476. The output of the latter is in turn connected to terminal 147 (FIG. 6) and also to terminal 478. Lastly, the armatures of switches 456, 457 and 458 are all connected to terminal 454.

In operation of the Skip/Delete buttons of FIG. 13, the operation of Word button 39 will be described as being exemplary of the others. Manipulation of button 39 will apply the voltage at terminal 454 to the S input terminal of flip-flop 462 so that the Q output terminal of the latter then goes high. This high signal is then applied to the C input terminals of flip-flops 468 and 469. One of the two latter flip-flops will then be triggered, depending upon which of the flip-flops has a high signal applied to its D input terminal. It will be appreciated that the signal applied at terminal 388 is indicative that the system is in the Final mode of operation because terminal 388 is connected to the $\bar{Q}$ output of flip-flop 386 (FIG. 12). Similarly, if the signal at terminal 387 is high, it is indicative of that the system is in the Draft Mode of operation because terminal 387 is connected of course to the Q output of flip-flop 386 (FIG. 12). Thus, depending upon whether the system is in the Final Mode or Draft Mode (as determined by the state of flip-flop 386) either flip-flop 468 or 469 will provide an output. If the Q output of flip-flop 468 goes high because the system is in Final Mode then the signal is applied to terminal 144 and will initiate a one-shift cycle in the buffer memory. If on the other hand the system is in the Draft Mode of operation, flip-flop 469 will be triggered and a signal will be applied at terminal 147 to initiate a 201 shift, and the same signal is applied at terminal 478 to provide a Delete signal which, among other things, is applied as an input to OR gate 396 (FIG. 12), at terminal 346 (FIG. 10) and at terminal 186 (FIG. 6). In similar manner, the operation of line button 40 will trigger either flip-flop 470 or 471 depending upon whether the system is in the Final or Draft modes of operation and provides similar output signals either to terminals 144 or 147. A similar situation would also be created by operation of character button 45.

In any case, the various signals, either at terminal 144 which serves to initiate one-shift cycles or at terminal 147 which serves to initiate 201 shift cycles, will persist for variable lengths of time depending upon the resetting or clearing of the particular operative one of flip-flops 466–471 inclusive. The various flip-flops are reset by a number of signals which are derived through flip-flop reset gating logic shown only generally at 479. Logic 479 is quite similar to the reset logic shown in FIG. 12, for example as gates 420, 422, 424 and 426 and have a plurality of inputs thereto, only a few of which are shown as exemplary as, for example, terminal 428 at which a signal indicative that there has been no Return Opportunity detected, or terminal 429 which indicates that a Carrier Return has been detected and therefore the line has terminated, or terminal 430 at which a Space signal is indicated as having been detected at the buffer output. The simple logic needed to reset flip-flops 466–471 according as character, word or line termination condition have been detected, is not shown inasmuch as it would unduly serve to complicate the drawing without enlarging the understanding of the operation of the system.

A better understanding of the capability of the system thus described can perhaps be better appreciated by comtemplating the operation of the device where inserting a character in an existing line. As previously noted, this involves a 201 shift cycle where the change in clocking order from $X_1X_2X_3$ to $X_1X_3X_2$ is seen to give an insert capability. The order is changed when a blank cell is seen in the buffer input at $\phi_4$ time. Thus, when the insert button 32 is depressed, flip-flop 392 is triggered to produce an output at terminal 394. The signal is then applied at input terminal 319 (FIG. 10) to the change order gating, and starts the cycle of operation described in connection with the logic of FIG. 10 which provides that the clocking order will change during the 201 shift cycle when a blank cell is detected in the memory. During the first part of the cycle the buffer size is effectively increased by one character and changing the clocking order returns the buffer to its original size and causes the blank cell to be lost from the buffer contents.

The procedure for deleting a character is similar to that for inserting except that as previously noted, the clocking order is initially $X_1X_3X_2$ and switches to $X_1X_2X_3$. Again, the order is changed when a blank cell is seen at the buffer input in $\phi_4$ time. In this way a blank cell is added to the buffer contents at the expense of the deleted character. It will also be apparent that whether a delete or slip function occurs, depends on whether the system is respectively in Draft or Final mode.

Referring now to FIG. 14, there will be seen a schematic diagram detailing elements of right-hand margin adjust logic 66. As shown, the schematic of FIG. 14 includes a plurality of input terminals, at least three of which, 480, 482 and 484 are respectively connected to the SP (Space) output line from decoder 284, the H (Hyphen) line from decoder 284 and the CR (Carrier Return) output line from decoder 284 all shown in FIG. 9. To provide clocking for the system of FIG. 14, there are three input terminals, 485, 486, and 487 which are respectively connected to the outputs of gates 128, 130 and 134 (FIG. 6). Input terminal 488 is connected to a sensor on the baseplate which provides a signal (RM/S) when the carrier or print head has arrived at the beginning of a return zone, i.e., a predetermined distance from whatever righthand margin as may have been set by an operator of the printer. Similarly, terminal 490 is connected to a sensor in the baseplate which gives a signal (CR/S) indicating that a Carrier Return is being executed. Lastly there are two more input terminals, terminal 492 which is connected to the output of counter 190 (FIG. 6) and terminal 494 which is typically connected to a source of a Draft Mode signal, indicating that the system is not in the Final mode of operation, such as terminal 387 (FIG. 12).

Terminals 488 and 487 are respectively connected to the J and clock terminals of J–K type flip-flop 496. The Q output terminal of flip-flop 496 is connected to the C input terminal of D-type flip-flop 498. The D terminal of the latter is clamped at some positive voltage $V_{cc}$. The Q output terminal of flip-flop 498 is connected to output terminal 146 (FIG. 6). Terminals 492 and 487 are connected as inputs to AND gate 500. The output of the latter is connected as one input to OR gate 501. Another input to OR gate 501 is connected to terminal 494. The output of gate 501 is connected to a disabling input terminal of flip-flop 498.

Terminal 494 is also connected as an input to NOR gate 502 and another input to NOR gate 502 is connected to terminal 490. The output of NOR gate 502 is connected to a disabling input terminal of flip-flop 496.

Terminals 480 and 482 are connected as inputs to OR gate 504. The output of the latter and terminal 484 are both connected as respective inputs to OR gate 506. The output of gate 506 and terminal 485 are both connected as inputs to AND gate 507. Terminal 485 is also connected, together with the $\overline{Q}$ output of flip-flop 498 as inputs to AND gate 508. The output of gate 508 is connected to the C input terminal of D-type flip-flop 510. The D input terminal of flip-flop 510 is connected to the output of gate 504.

The output of gate 507 is connected to the C input terminal of another D-type flip-flop 512. The D terminal of the latter is clamped at voltage $V_{cc}$. An enabling input terminal of flip-flop 510 is connected to the Q output terminal of flip-flop 496. Similarly, an inverting enabling input terminal of flip-flop 512 is connected to the Q output terminal of flip-flop 498. The Q terminal of flip-flop 510, the Q terminal of flip-flop 496 and the $\overline{Q}$ terminal of flip-flop 498 are all connected as inputs to AND gate 514. The output of the latter is connected to the S input terminal of a RS type flip-flop 516. The R input terminal of flip-flop 516 is connected to terminal 490. The Q output terminal of flip-flop 516 is connected to terminal 517.

A second RS type flip-flop 518 is provided, and its R terminal is connected to the $\overline{Q}$ terminal of flip-flop 496. An in-modulo-8 counter 520 is also included and has its input connected to terminal 486. An enable input terminal of counter 520 is connected to the Q output terminal of flip-flop 498. The output of counter 520 is connected as one input to AND gate 522. The $\overline{Q}$ terminal of flip-flop 512 and the Q terminal of flip-flop 498 are also connected as inputs to gate 522. The output of gate 522 is connected to both terminals 524 and the S input terminal of flip-flop 518.

The operation of the circuit shown in FIG. 14 is intended primarily to provide an anticipatory margin control, i.e., to sense when the return zone has been entered and to return the print carrier or print head to the lefthand margin if and when an opportunity to do so exists, or if no such opportunity exists then to indicate that hyphenation is going to be required, and to cause printing to halt at the beginning of the return zone. In order to do so, the circuit takes advantage of the fact that cycling the buffer memory through a 200-shift by triggering flip-flop 140 (FIG. 6) can be done in an extremely short period of time and will permit a search through the buffer memory contents to indicate whether an opportunity exists to return the carrier or printhead before printing the first character in the return zone. These opportunities to return the print carrier or printhead exist when a space, a carrier return, or a hyphen is found to occur among data stored in the buffer memory corresponding to characters to be printed or operations to be carried out while the carrier or printhead is in the return zone. If no return opportunity is found, then the system is intended to stop printing and provide some indication, visually, or audibly or otherwise, that the operator must intervene and hyphenate. It has been found that the optimum return zone, at least for ordinary text in the English language, should be between about four and about 10 spaces, and preferably is eight spaces long to afford a reasonable minimum of intervention by the operator. Thus the right margin sensor in the baseplate is positioned so that it will provide a signal when the carrier or printhead is at the beginning of or entering the return zone. In the example shown in FIG. 14, the return zone is intended to be eight spaces long.

Flip-flops 496 and 498 are not enabled unless the system is in the Final Mode, because of the signal applied at terminal 494 and passed by gates 501 and 502. When so enabled, and when the beginning of return zone is reach so that the baseplate sensor provides a signal at terminal 488, flip-flop 496 will be triggered by the next $\phi_4$ clock pulse at terminal 487, and the Q and $\overline{Q}$ terminals of flip-flop 496 respectively go high and low. The Q output of terminal 496 then triggers flip-flop 498 so that its Q terminal goes high and a signal is therefore applied at terminal 146 to initiate a 200 shift in the buffer memory. The same signal from flip-flop 498 enables counter 520 which starts counting $\phi_2$ pulses at terminal 486. The capacity of counter 520 should be matched to the number of spaces in the return zone, and therefore, in the example shown, counter 520 is an in-modulo-8 counter. When counter 520 has counted eight input $\phi_2$ pulses, it provides an output signal to gate 522. The Q terminal of flip-flop 498 which of course remains high during the execution of the 200 shift, is also connected as an input to gate 522.

Gates 504 and 506, together constitute a three input OR gate which examines the signals at terminals 480, 482, and 484, so that as the buffer memory is shifted, at least during the first eight shifts counted by counter 520, the buffer contents are monitored for the three return opportunities of a carrier return, hyphen or space. If no return opportunity is seen, the output of gate 507 remains low and the $\overline{Q}$ output terminal of flip-flop 512 therefore stays high. Thus if counter 520 has completed its count, gate 522 will provide an output signal only if no return opportunity existed within the time period during which counter 520 was counting. This output signal from gate 522, then applied to terminal 524, is used to reset the appropriate print mode flip-flop, e.g. 413, so that the printing operation of the printer is stopped. Simultaneously, the same output of gate 522 being applied to the set input terminal of flip-flop 518, brings the Q output terminal of the latter up. The Q output terminal of flip-flop 518 is connected to some indicator such as a light, buzzer or the like which is identified by the operator as indicating that the printing has stopped, and that the operator should then continue to print out one character at a time until an opportunity to hyphenate occurs, whereupon the operator should add a hyphen by striking the hyphen key on the keyboard. Then, by striking the carrier return key, which of course will not be recorded, the printhead or carrier will be brought back to the left margin and the carriage indexed.

If however, while counter 520 is counting, gate 504 detects either the presence of a Hyphen, a Carrier Return, or a Space signal at the output of the buffer memory, flip-flop 512 will be triggered on the next $\phi_1$ pulse. The output of the Q terminal of flip-flop 512 will then be driven low. Thus, no high signal will appear at terminal 524 to stop the printing operation, nor will flip-flop 518 be triggered to indicate that a need for hyphenation exists.

As soon as the 200-shift has been completed, a Terminate Shift signal from counter 190 is applied to gate 500, and on the ensuing $\phi_4$ pulse flip-flop 498 is reset, bringing the $\bar{Q}$ terminal of the latter high. The high signal at the $\bar{Q}$ terminal of flip-flop 498 serves to enable gate 508 and also provides an input to gate 514.

Because the system is still in the Final Mode of operation, the buffer memory will continue being shifted one shift at a time to bring up at its output the successive characters or operators stored in the memory. Ultimately, the return opportunity (or the first of several) earlier detected will be present at the output of the buffer memory. If that return opportunity is a Carrier Return signal then it will simply be executed by the printer, and its execution will cause a signal at terminal 490 to reset flip-flops 496 and 516. The $\bar{Q}$ terminal of the latter goes high and forces the Q terminal of flip-flop 518 to go low, essentially resetting the latter.

If however the return opportunity takes the form of a Space or Hyphen signal, then flip-flop 510 will be triggered on the $\phi_1$ pulse associated with printing the Space or Hyphen. The Q terminal of flip-flop 510 then goes high and is applied to gate 514. Because gate 514 now will have all of its inputs high, the Q terminal of flip-flop 516 goes high. The high signal on terminal 516 is intended to force a Carrier Return by being applied as the Force CR signal to gate 295, (FIG. 9). Thus the occurrence of a Space or Hyphen signal in the return zone will result in such a signal being executed, and immediately thereafter a Carrier Return signal being created to force the printer to return to the lefthand margin and index. It will be seen (referring particularly to FIG. 9) that a high signal at terminal 517 will constitute an input to gates 295 and thus be applied through gates 300 and 292 to disable gates 280 and 286. This serves to prevent printing of any operator of character then at the buffer memory output until the forced Carrier Return function has been completed.

While counter 520 preferably counts the same number of spaces as the return zone contains, the counter need not be so limited and may be provided as an adjustable counter which can be set to count any arbitrary number. Thus, by simply adjusting the counter, one can effectively change the length of the return zone for any given system, without mechanical alteration of the printer. As previously described in connection with the system shown in FIG. 11, there is included means for identifying and displaying the address of each block of data contained on the tape cassette 240. In a preferred embodiment, as shown in FIG. 15, the invention also includes means for printing out that address with any selected line of data printed or about to be printed or otherwise composed by printer 20.

To this end, as shown in FIG. 15, the device also includes Notate button 530 which typically can be mounted either on console 22 or on the printer keyboard, and is connected for controlling switch 532. The latter is a two-position switch having an armature connected to a source of positive voltage +V and moveable with button 530 between first and second positions wherein the armature contacts the S and R terminals respectively of R–S type flip-flop 534. Switch 532 is normally spring-biased into the second position.

The Q output terminal of flip-flop 534 is connected to the Clock input terminal of J–K type flip-flop 536. The latter has its J and K input terminals respectively connected to its $\bar{Q}$ and Q output terminals so as to constitute a simple divide-by-two device. The Q output terminal of flip-flop 536 is also connected to terminal 538 which preferably is coupled to a light, or other visual or audio display, indicating, when energized, that the system is in a Notate mode. The reset input terminal of flip-flop 536 is connected to terminal 387 (FIG. 12). The Q output terminal of flip-flop 536 is connected to the J input terminal of J–K flip-flop 540. The K input terminal of the latter is grounded. The clock input terminal of flip-flop 540 is connected to the output of OR gate 541. The inputs to the gate 541 include lines for carrying commands which cause an address to be printed. Any of a number of such commands can be used. Typically, one input to OR gate 541 is to terminal 429 (FIG. 12) at which a CR signal from a sensor in baseplate 24 is applied.

The reset input terminal of flip-flop 540 is connected to input line 542 which is intended to carry a PIM signal, derived from an appropriate sensor in baseplate 24, indicating that the print head is in motion, as previously described. The Q output terminal of flip-flop 540 is connected to output terminal 544 which is connected through an appropriate buffer to the CC or cycle clutch control line (FIG. 9) to baseplate 24.

The system shown in FIG. 15 includes decade or BCD counter 354, converter 360 and display 28, all previously described in connection with FIG. 11. However, in FIG. 15 the output of counter 354 is shown as also connected as the input to code converter 546. The input to the latter is shown as four lines exemplary of a BCD input needed to represent a single decimal digit, but it should be remembered that a single digit display is assumed only for simplicity, and in practice, a three-decimal-digit display is preferred. Converter 546 is a known type of code converter which merely converts a BCD digit into a code suitable for driving a printer of the Palmer type.

Also included is a data-switching or selector circuit 548, of known type, which alternatively couples either one or another set of input lines to a single set of output lines according to a switching or control signal applied at control terminal 549. Hence, the output lines from converter 546 are connected as one set of input lines to data selector 548, while the other set of input lines to selector 548 are the output lines R1, R2, R2A, R5, T1 and T2 from enable gates 280 (FIG. 9). The output lines from selector 548, also designated $R_1$, $R_2$, $R_2A$, $R_5$, $T_1$, and $T_2$, are connected to appropriate input terminals on baseplate 24. Lastly, control terminal 549 is connected to the Q output terminal of flip-flop 540.

To enter the Notate mode, the operator manipulates button 530 to cause the armature of switch 532 to contact the S input terminal of flip-flop 543. The latter and flip-flop 536 operate in a manner similar to that described previously in connection with flip-flops 390 and 392 (FIG. 12) associated with the Insert mode. Hence, the first manipulation of switch 532 causes the system to enter the Notate mode, the next manipulation of switch 532 causing the system to be reset or switched out of the Notate mode. Note that the system cannot operate in the Notate mode unless it is also in the Draft mode as evidenced by an appropriate signal at terminal 387. When the Q terminal of flip-flop 536 goes high, the signal at terminal 538 excites a display indicating that the system is in the Notate mode and also enables flip-flop 540 so that it can be triggered if an appropriate command signal occurs as an input to gate 541. For example, if printing of a line has been completed, as indicated by a signal from a carrier return sensor in the baseplate, if the Q output terminal of flip-flop 536 is high, and if there is no PIM signal at the reset input terminal of flip-flop 540, then the Q output terminal of flip-flop 540 will go high. This provides a signal (Force CC) at terminal 544 which serves to control the cycle clutch of the printer and also switches selector 548 so that the latter connects its output to the output of converter 546. The output signals from selector 548 then drive the code bails in a printer of the Palmer type so that the digit displayed in display 28 is also printed out at the beginning of a line of print. When the digit is printed, a PIM signal at terminal 542 will reset flip-flop 540 and complete the line rotation cycle.

Expansion of the circuit in FIG. 15 to accomodate a plurality of digits would be readily carried out by those expert in the art. Such expansion would entail an additional data selector to connect each BCD digit in turn to the converter 546, and would entail a counter to assure that flip-flop 540 is not reset until all required digits are printed. Preferably the expanded system would force one or more spaces on the printer, after printing the required digits, so that a gap is created between the column of printed address numbers and the body of typed or printed text.

While a preferred embodiment of the invention is illustrated in the drawings and has been described herein, modifications which do not depart from the essence of the invention may be made and will be apparent to those skilled in the art. Therefore, it is intended that the invention not be limited by the precise structures shown and described, but rather that the full scope of the invention be construed in accordance with the appended claims.

What is claimed is:

1. Apparatus for processing data in conjunction with formation of characters by a printing device and performance of certain functions during operation of said printing device, said printing device including means for interconverting formation of said characters with corresponding coded character signals and means for performing said functions responsively to corresponding coded function signals, said apparatus comprising in combination:

signal recording-and-playback means;

a main memory means for storing a plurality of said coded character and function signals, a subsidiary memory means having an input connected to the output of said main memory means, gating means for selectively coupling to the input of said main memory means (a) the output of said subsidiary memory means (b) the output of said signal recording-and-playback means, and (c) the output from said interconverting means; and means for selectively coupling the output of said main memory means to the inputs of said signal recording-and-playback means or said interconverting means.

2. Apparatus according to claim 1 wherein said main memory means is a main shift register.

3. Apparatus according to claim 2 wherein said register is characterized in having storage capability of at least 200 coded signals each formed of at least eight bits.

4. Apparatus according to claim 1 wherein said subsidiary memory means comprises a shift register.

5. Apparatus according to claim 4 wherein said shift register has a storage capability of one coded signal formed of at least eight bits.

6. Apparatus according to claim 2 wherein said subsidiary memory means comprises a pair of subsidiary shift registers, means for connecting the input of the first of said subsidiary shift registers to the output of said main shift register, means for connecting the input of the second subsidiary register to the output of said first subsidiary register and means for connecting the output of said second subsidiary register to the input of said main shift register.

7. Apparatus according to claim 2 further including means for operating said main register so that the coded signals stored in said main register are sequentially coupled to the input of said subsidiary memory means, and means for operating said gating means so that only selected codes appearing at the output of said subsidiary memory means are applied at the input of said main register for storage in the latter.

8. Apparatus according to claim 1 wherein said means for selectively coupling is operable to couple to said signal recording means and to said interconverting means, only selected coded signals appearing at the output of said main memory means.

9. Apparatus according to claim 6 including means for clocking the operation of said main register and said first and second subsidiary registers according to a plurality of different sequences.

10. Apparatus according to claim 9 wherein said means for clocking comprises clock generator means for providing *m* groups of *n* clock pulses, *m* and *n* being integers, and means for selectively varying the value of *m*.

11. Apparatus according to claim 10 wherein $n = 3$ and *m* is an integer selected from the integers 1, Y, Y + 1 and Y − 1 where Y is the number of storage cells in said main shift register.

12. Apparatus according to claim 9 wherein said means for clocking comprises:

individual clocking lines each connected for controlling the shifting of data in respective ones of said main register and first and second subsidiary registers.
a source of clock pulses,
means for separating a train of pulses from said source into at least three secondary pulse trains, each having pulses which are not coincident with the pulses of all of the other of said secondary pulse trains, and
means for selectively connecting each of said clocking lines to accept a corresponding one of said secondary pulse trains.

13. Data recording and printing apparatus comprising:
a printer having a plurality of informational character and function keys including a return key;
means in said printer responsive to operation of any informational character key for printing the related character;
means in said printer responsive to operation of any function key for performing the related function;
code generating means for generating coded multi-bit signals representative of said informational characters and functions substantially concurrently with the printing and performance of said characters and functions respectively;
recording apparatus interconnected with said printer, said recording apparatus having means for recording said coded signals on and reading said coded signals from a recording media;
a buffer memory for controlling the transfer of said coded signals between said printer and said recording apparatus, said buffer memory comprising storage means for storing a plurality of said coded signals in the order in which said coded signals are received, first transfer means for transferring said coded signals alternatively in either direction between said printer and said storage means, and second transfer means for transferring said coded signals alternatively in either direction between said recording apparatus and said storage means,
control means for operating said buffer memory in one of several modes including a first mode wherein said first transfer means is enabled by said control means so as to transfer coded signals from said printer to said storage means in the order that said coded signals are generated by said printer, a second mode wherein said second transfer means is enabled by said control means so as to transfer all of the coded signals stored in said storage means to said recording apparatus in the order that said coded signals are transferred from said printer to said storage means, a third mode wherein said second transfer means is enabled by said control means so as to transfer coded signals from said recording apparatus to said storage means in the order that said coded signals were recorded in said recording apparatus, a fourth mode wherein said first transfer means is enabled by said control means so as to transfer all of the coded signals stored in said storage means to said printer in the order that said coded signals are transferred from said recording apparatus to said storage means, a fifth mode in which said buffer memory is inactive, and a sixth mode in which signals stored in said storage means are recirculated in said storage means; and
means in said printer responsive to coded signals transferred thereto from said storage means for causing said printer to print the characters and perform the functions represented by said coded signals substantially concurrently as said coded signals are received by said printer from said storage means.

14. Data recording and printing apparatus according to claim 13 further including means for disabling said printer during the time that said buffer memory is in either said second or third mode.

15. Data recording and printing apparatus according to claim 13 wherein said printer generates a Return Code in the form of coded multi-bit signals representative of a Return function upon each depression of said return key, and further wherein said control means is responsive to generation of a Return Code by said printer for shifting operation of said buffer memory from said first mode to said second mode, and responsive to transfer in order of both a Return Code and a Blank Code comprising a multibit signal indicative of the absence of any informational character or function for shifting operation of said buffer memory from said third mode to said fourth mode.

16. Data processing and printing apparatus comprising:
a printer;
a recording apparatus; and
a buffer memory for controlling the transfer of data between said printer and said recording apparatus;

said printer including printing means, a plurality of informational character and function keys, means responsive to depression of any of said informational character keys for operating said printing means to print selected characters in lines of characters, means responsive to depression of any of said function keys for performing the function corresponding to the key depressed; means responsive to depression of any of said keys for generating digital codes representative of the characters or functions corresponding to the keys depressed; and playback printer operating means responsive to previously generated digital codes for causing said printer to print the characters and to perform the functions represented by said previously generated digital codes;
said recording apparatus having read-write means for reading and recording digital codes in a revisable record medium, means for holding a revisable record medium, drive means for providing relative movement between said read-write means and said record medium in order sequentially to read or record said digital codes in said medium, and selectively operable drive control means for initiating and terminating operation of said drive means;
said buffer comprising a multi-cell storage register for storing a plurality of said digital codes in a sequence in the order in which codes are fed to said register, first code transferring means for transferring digital codes in either direction between said printer and said register, and second code transferring means for transferring codes in either direction between said recording apparatus and said register; and buffer memory control means for placing said register and said code transferring means in one of four modes including a first mode enabling transfer of codes generated in response to operation of said keys from said printer to said register, a second mode enabling transfer of codes stored in said register to a record media in said recording apparatus via said read-write means, a third mode enabling transfer of codes from a record media in said recording apparatus to said register via said read-write means, and a fourth mode enabling transfer of codes stored in said register to said printer via said playback printer operating means, said buffer memory control means having means responsive to predetermined digital codes received by said register from said printer for shifting said buffer memory from said first mode to said second mode and means responsive to predetermined digital codes received by said register from said recording apparatus for shifting said buffer memory from said third mode to said fourth mode.

17. Apparatus according to claim 16 further including means for automatically operating said drive control means so as to effect relative movement between said read-write means and said record media when said buffer memory is in either of said second or third modes and to terminate said relative movement when said buffer memory is in either of said first and fourth modes.

18. Apparatus according to claim 16 wherein said buffer memory includes an auxiliary code storing means, means for transferring codes from said register to said auxiliary code storing means in the order in which they are stored in said register, means for transferring codes in said auxiliary storing means back to said register in the order in which said codes are received by said auxiliary storing means; and said buffer memory control means includes first selectively operable means for deleting a code stored in said buffer memory, and second selectively operable means for skipping a code stored in said buffer memory so that a character corresponding to the skipped code is not printed by said printer.

19. Apparatus according to claim 16 wherein said printer includes a carrier moveable one character position each time said printing means is operated, said apparatus further including code delete means for deleting a selected code from said buffer memory, and means for preventing movement of said carrier when a selected code is being deleted from said buffer memory.

20. Apparatus according to claim 16 wherein said printer includes a carrier moveable one character position each time said printing means is operated, and further including code skip means for selectively preventing transfer of codes to said printer from said buffer memory, and means for preventing movement of said carrier when said code skip means is operative.

21. Data recording and printing apparatus comprising:

a printer having a plurality of informational character and function keys and including a Return key;

means in said printer responsive to operation of any informational character key for printing the related character;

means in said printer responsive to operation of any function key for performing the related function;

means in said printer for generating digital coded signals representative of said informational characters and functions substantially concurrently with printing and performance of said characters and functions respectively;

recording apparatus having means for recording said coded signals on and reading said coded signals from a recording media;

a buffer memory for controlling transfer of said coded signals between said printer and said recording apparatus, said buffer comprsing a main shift register for storing a plurality of said signals in a sequence in the order in which said signals are received, means for transferring said signals in either direction between said printer and said main shift register, means for transferring said signals in either direction between said recording apparatus and said main shift register, a subsidiary storage register for storing at least one of said signals, means coupling the input of said subsidiary storage register to the output of said main shift register, means coupling the output of said subsidiary storage register to the input of said main storage register, and means for circulating successive signals in said main register through said subsidiary register back to said main register.

22. Apparatus according to claim 21 further including means for inserting additional coded signals one at a time into said main register between a selected pair of said coded signals.

23. Apparatus according to claim 21 wherein said main register comprises $n$ cells each adapted to store one of said coded signals, $n$ being an integer, and further including means for moving said sequence of coded signals through said main and subsidiary registers and back into said main register in a time interval less than the minimum time in which two discrete coded signals can be generated by said printer and transferred to said main register, and means for gating a code into said main register from said printer after the previously stored signal has been moved in said main register through either 1 or $n + 1$ positions.

24. Apparatus according to claim 23 further including means for indexing codes stored in said main register one cell position for each digital code transferred to said buffer from said printer, and means for preventing transfer of codes from said buffer memory to said recording apparatus while codes are being transferred into said main register from said printer.

25. Apparatus according to claim 23 further including means for indexing codes stored in said main register one cell position for each digital code transferred to said buffer from said printer, and means for preventing transfer of codes into said main register from said printer while codes are being transferred from said buffer memory to said recording apparatus.

26. Apparatus according to claim 21 wherein said printer includes a carrier capable of forward and backward movement, and, further including register operating means for shifting the coded signals in said storage register by single steps in said sequence so as to effect a net forward or backward displacement of said sequence in said register, and means for effecting movement of said carrier in single character position increments in a direction corresponding to said net forward or backward displacement of said sequence in said register.

27. Apparatus according to claim 13 wherein said register has a code input at one end and a code output at the other end and circulating means for transferring coded signals from said code output to said code input, and further wherein said register operating means is adapted to shift said coded signals via said circulating means through a number of code-storing positions selected so as to effect a net backward or forward displacement.

28. Apparatus according to claim 13 wherein said signals are multi-bit parallel codes and said register is a multi-cell static shift register adapted to store said multi-bit parallel codes, and further including code conversion means for converting said multi-bit parallel signals to multi-bit serial signals when operating in said second mode and for converting said multi-bit serial codes to said multi-bit parallel codes when operating in said third mode.

29. Apparatus according to claim 13 wherein said recording apparatus includes read-write means adapted to magnetically record and magnetically read data on a magnetic recording medium.

30. Word processing and printing apparatus comprising:

a typewriter;

a recording apparatus; and a buffer memory for controlling the transfer of data between said typewriter and said recording apparatus;

said typewriter including printing means, a plurality of informational character and function keys including a Carrier Return key, means responsive to depression of any of said informational character keys for operating said printing means to print selected characters in lines of characters, means responsive to depression of any of said function keys for performing the function corresponding to the key depressed; means responsive to depression of any of said keys for generating digital codes representative of the characters or functions corresponding to the keys depressed; and playback printer operating means responsive to previously generated digital codes for causing said printer to print the characters and to perform the functions represented by said previously generated digital codes;

said recording apparatus having read-write means for reading and recording digital codes in a revisable record medium, means for holding a revisable record medium, drive means for providing relative movement between said read-write means and said record medium in order sequentially to read or record alternatively said digital codes in said medium, and selectively operable drive control means for initiating and terminating operation of said drive means;

said buffer comprising a multi-cell storage register for storing a plurality of said digital codes in a sequence in the order in which codes are fed to said register, first code transferring means for transferring digital codes in either direction between said printer and said register, and second code transferring means for transferring codes in either direction between said recording apparatus and said register; and buffer memory control means for placing said register and said code transferring means in one of four modes including a first mode enabling transfer of codes generated in response to operation of said keys from said printer to said register, a second mode enabling transfer of codes stored in said register to a record media in said recording apparatus via said read-write means, a third mode enabling transfer of codes from a record media in said recording apparatus to said register via said read-write means, and a fourth mode enabling transfer of codes stored in said register to said printer via said playback printer operating means, said buffer memory control means having means responsive to a predetermined digital code representing a Carrier Return function received by said register from said printer for shifting said buffer memory from said first mode to said second mode and means responsive to said predetermined digital code received by said register from said recording apparatus for shifting said buffer memory from said third mode to said fourth mode.

31. Apparatus according to claim 10 wherein said main shift register has Y storage cells, Y being an integer, and the signals stored in said main shift register undergo a one-cell shift each time said main shift register is clocked, and further comprising:

means for counting each one-cell shift of signals stored in said main shift register and for selectively providing an output signal when the number of one-cell shifts totals one of the following: Y, Y + 1, and Y − 1.

32. Apparatus according to claim 31 further including means responsive to the output signal of said counting means for terminating clocking of said main shift register.

33. Apparatus according to claim 10 wherein said counting means comprises a counter that provides an output signal when a total of Y input pulses have been applied thereto, gating means for applying a first selected one of said n clock pulses from each of said m groups to the input of said counter, first selectively operable means for inhibiting said gating means long enough to prevent application of one of said first selected clock pulses to said counter, and second selectively operable means for applying a second selected one of said *n* clock pulses from only one of said *m* groups to said counter, said first and second selectively operable means being mutually exclusively operable.

* * * * *